(12) United States Patent
Shi et al.

(10) Patent No.: US 12,574,056 B2
(45) Date of Patent: Mar. 10, 2026

(54) ANTENNA CONFIGURATION METHOD AND APPARATUS

(71) Applicant: Honor Device Co., Ltd., Shenzhen (CN)

(72) Inventors: Jiangwei Shi, Shenzhen (CN); Yun Wang, Shenzhen (CN); Chiyang Xiao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 512 days.

(21) Appl. No.: 18/250,314

(22) PCT Filed: Sep. 6, 2022

(86) PCT No.: PCT/CN2022/117190
§ 371 (c)(1),
(2) Date: Apr. 24, 2023

(87) PCT Pub. No.: WO2023/051186
PCT Pub. Date: Apr. 6, 2023

(65) Prior Publication Data
US 2023/0403036 A1 Dec. 14, 2023

(30) Foreign Application Priority Data
Sep. 30, 2021 (CN) .......................... 202111162791.4

(51) Int. Cl.
*H04B 1/00* (2006.01)
*H04B 1/401* (2015.01)
(Continued)

(52) U.S. Cl.
CPC .......... *H04B 1/0064* (2013.01); *H04B 1/401* (2013.01); *H04B 7/0404* (2013.01); *H04W 8/183* (2013.01); *H04W 88/06* (2013.01)

(58) Field of Classification Search
CPC .... H04B 1/0064; H04B 1/401; H04B 7/0404; H04W 8/183; H04W 88/06
See application file for complete search history.

(56) References Cited

U.S. PATENT DOCUMENTS 8,606,196 B2 * 12/2013 Alam ................... H04B 7/0877
455/132
10,517,003 B2 * 12/2019 Bhardwaj ......... H04W 72/0453
(Continued)

FOREIGN PATENT DOCUMENTS

CN 102427587 A 4/2012
CN 106341810 A 1/2017
(Continued)

*Primary Examiner* — Jinsong Hu
*Assistant Examiner* — Rui M Hu
(74) *Attorney, Agent, or Firm* — Slater Matsil, LLP

(57) ABSTRACT

A terminal determines a first band of a primary card and a second band of-a secondary card; if the secondary card does not support the first band, determines a first identifier and a second identifier of a first 2R path and a third identifier and a fourth identifier of a second 2R path based on the second band, and determines a fifth identifier and a sixth identifier of a third 2R path based on the first band, where the first identifier, the third identifier, and the fifth identifier are identifiers of primary receive paths, and the second identifier, the fourth identifier, and the sixth identifier are identifiers of diversity receive paths; and determines, based on those identifiers, and a selection condition stored in the terminal, to communicate with the second base station through the secondary card by using the first 2R path or the second 2R path.

20 Claims, 19 Drawing Sheets

(51) Int. Cl.
    *H04B 7/0404*        (2017.01)
    *H04W 8/18*          (2009.01)
    *H04W 88/06*       (2009.01)

(56) References Cited

U.S. PATENT DOCUMENTS

| | | | |
|---|---|---|---|
| 10,911,075 B2 * | 2/2021 | Leung | H04B 1/0053 |
| 11,444,673 B2 * | 9/2022 | Bremer | H04B 7/0686 |
| 2015/0188582 A1 * | 7/2015 | Kahrizi | H04B 1/0067 |
| | | | 455/77 |
| 2015/0373711 A1 * | 12/2015 | Narathong | H04B 1/0057 |
| | | | 370/280 |
| 2017/0310369 A1 * | 10/2017 | Oliver | H04B 7/0617 |
| 2018/0131478 A1 | 5/2018 | Song et al. | |
| 2020/0204981 A1 * | 6/2020 | Oh | H04W 8/183 |
| 2022/0124594 A1 | 4/2022 | Wang et al. | |
| 2022/0239450 A1 * | 7/2022 | Jain | H04L 5/001 |
| 2022/0248206 A1 * | 8/2022 | Gopal | H04W 8/18 |
| 2023/0117026 A1 * | 4/2023 | Gopal | H04W 12/45 |
| | | | 370/329 |
| 2023/0262811 A1 * | 8/2023 | Li | H04W 8/22 |
| | | | 370/329 |
| 2023/0370833 A1 * | 11/2023 | Zhang | H04B 1/401 |
| 2024/0031852 A1 * | 1/2024 | Jiang | H04W 24/04 |
| 2024/0113733 A1 * | 4/2024 | Leung | H04B 7/0404 |

FOREIGN PATENT DOCUMENTS

| | | |
|---|---|---|
| CN | 106452473 A | 2/2017 |
| CN | 109151807 A | 1/2019 |
| CN | 105940760 B | 3/2019 |
| CN | 110166074 A | 8/2019 |
| CN | 110166948 A | 8/2019 |
| CN | 112333772 A | 2/2021 |
| CN | 213152052 U | 5/2021 |
| CN | 113259925 A | 8/2021 |
| CN | 113612498 A | 11/2021 |
| JP | 2005260482 A | 9/2005 |
| WO | 2021003612 A1 | 1/2021 |

* cited by examiner

Low band (LB)
diversity antenna

Medium-high band
(MHB) diversity antenna

Low band (LB)
primary antenna

Medium-high band
(MHB) primary antenna

Direct state

Primary path ← DPDT → Primary antenna

Diversity path ← → Diversity antenna

Cross state

Primary path ← DPDT → Primary antenna

Diversity path ← → Diversity antenna

Primary path (configured with a primary tuner) ← DPDT → Primary antenna

Diversity path (configured with a diversity tuner) ← → Diversity antenna

ANTENNA CONFIGURATION METHOD AND APPARATUS

CROSS-REFERENCE TO RELATED APPLICATIONS

This application is a national stage of International Application No. PCT/CN2022/117190, filed on Sep. 6, 2022, which claims priority to Chinese Patent Application No. 202111162791.4, filed on Sep. 30, 2021. The disclosures of both of the aforementioned applications are hereby incorporated by reference in their entireties.

TECHNICAL FIELD

This application relates to the computer storage field, and in particular, to an antenna configuration method and an apparatus.

BACKGROUND

With development of terminal communication, many users expect to have or already have a plurality of mobile phone numbers, and the users expect that two cards can be used at the same time, for example, the two cards can receive call requests at the same time. Based on this market requirement, the dual-card dual-standby dual-pass technology emerges. For example, a dual-card dual-standby dual-pass terminal is provided with two sets of communications chips, two communication cards such as subscriber identification module (Subscriber Identification Module, SIM) cards may be placed in the terminal, and the two communication cards can exclusively use different communications chips at the same time.

However, in the dual-card dual-standby dual-pass terminal, due to a location limitation in internal space of the terminal, co-channel interference, and the like, the two cards usually share a same set of antennas. When communications chips corresponding to the two cards in the terminal simultaneously receive or send signals by using an antenna, signal receiving or sending performance of a communications chip corresponding to one card is affected by a communications chip corresponding to the other card.

Therefore, in a scenario in which the communications chips corresponding to the two cards in the terminal simultaneously receive or send signals by using an antenna, how to improve receiving performance or sending performance of the communications chips corresponding to the two cards in the terminal is an urgent problem to be resolved.

SUMMARY

This application provides an antenna configuration method and an apparatus, to improve receiving performance or sending performance of communications chips corresponding to two cards in a terminal in a scenario in which the communications chips corresponding to the two cards in the terminal simultaneously receive or send signals by using an antenna.

According to a first aspect, this application provides an antenna configuration method, applied to a terminal, where the terminal includes a primary card and a secondary card, at least two 2R paths are configured on each band supported by the secondary card, the 2R path includes an identifier of a primary receive path and an identifier of a diversity receive path, and the method includes: receiving configuration information of a first base station and a second base station, and determining a first band and a second band based on the configuration information of the first base station and the second base station, where the first band is a band configured by the first base station for the primary card, and the second band is a band configured by the second base station for the secondary card; if the secondary card does not support the first band, determining a first identifier and a second identifier of a first 2R path and a third identifier and a fourth identifier of a second 2R path based on the second band, and determining a fifth identifier and a sixth identifier of a third 2R path based on the first band, where the first identifier, the third identifier, and the fifth identifier are identifiers of primary receive paths, and the second identifier, the fourth identifier, and the sixth identifier are identifiers of diversity receive paths; and determining, based on the first identifier, the second identifier, the third identifier, the fourth identifier, the fifth identifier, the sixth identifier, and a selection condition stored in the terminal, to communicate with the second base station through the secondary card by using the first 2R path or the second 2R path, where the selection condition includes: the secondary card communicates with the second base station by using the first 2R path if both the first band and the second band are low bands or medium-high bands; or the secondary card communicates with the second base station by using the second 2R path if the first band is a low band and the second band is a medium-high band, or the first band is a medium-high band and the second band is a low band.

It may be understood that the secondary card described in this embodiment of this application communicates with the second base station by using the 2R path. This may be understood as that the terminal communicates with the second base station through the secondary card by using the 2R path.

It may be understood that the terminal includes a radio frequency circuit, a primary antenna, and a diversity antenna. The primary antenna includes a medium-high band primary antenna and a low band primary antenna, and the diversity antenna includes a medium-high band primary antenna and a low band primary antenna. The medium-high band primary antenna is coupled to the low band primary antenna. The radio frequency circuit includes a primary path and a diversity path, the primary path includes a primary receive path and a primary transmit path, and the diversity path includes a diversity receive path. The terminal may communicate with a base station through the primary antenna and/or the diversity antenna by using a communications chip corresponding to the primary card or the secondary card and a path in a corresponding radio frequency path.

In the following, the primary antenna and/or the diversity antenna are/is referred to as a primary-diversity antenna. It may be understood that a meaning of "a and/or b" in this specification is "a, b, or a and b".

It may be understood that, in a case in which the first band is a low band, the terminal communicates with the first base station by using a low band primary-diversity antenna through the primary card. In a case in which the first band is a medium-high band, the terminal communicates with the first base station by using a medium-high band primary-diversity antenna through the primary card (a case of the second band, the secondary card, and use of the primary-diversity antenna by the secondary card is consistent with this case). It may be understood that, in internal processing, the terminal processes, by using a corresponding communications chip, a service related to the primary card or the secondary card. For external processing of communication between the terminal and the base station, the terminal communicates with the base station by using the primary card or the secondary card. For example, when the terminal uses the primary-diversity antenna through the primary card, the communications chip corresponding to the primary card in the terminal processes an internal service by using the primary-diversity antenna to obtain an internal signal, and then transmits the internal signal to the first base station based on a communication connection between the primary card and the first base station.

It may be understood that when the terminal uses a same set of primary-diversity antennas through the primary card and the secondary card, a first communications chip corresponding to the primary card has a high priority for a diversity path, a second communications chip corresponding to the secondary card has a high priority for a primary path, and one path can be used through only the first communications chip or the second communications chip at the same time. That is, when the first communications chip and the second communications chip use a same set of primary-diversity antennas, the first communications chip may use a diversity path, and the second communications chip may use a primary path.

For example, a band whose band range is less than a first preset threshold is a low band, and a band whose band range is greater than or equal to the first preset threshold and less than a second preset threshold is a medium-high band. For example, the first preset threshold is 1 GHz (gigahertz), and the second preset threshold is 3 GHz. It may be understood that specific values of the first preset threshold and the second preset threshold change according to different communications standards. This embodiment of this application sets no limitation on the first preset threshold and the second preset threshold. It may be understood that the description in which both the first band and the second band are low bands or medium-high bands in this embodiment of this application may be used to indicate that the terminal uses a same set of primary-diversity antennas simultaneously through the primary card and the secondary card. When the first band is a low band and the second band is a medium-high band, or the first band is a medium-high band and the second band is a low band, it may indicate that the terminal uses different primary-diversity antennas through the primary card and the secondary card. Alternatively, another method may be used to determine that the primary card or the secondary card uses a same set of antennas or uses different sets of antennas. This is not limited in this embodiment of this application.

In this embodiment of this application, a 2R path is added to each secondary card-supported band, and at least two 2R paths are configured for the secondary card-supported band, so that the first 2R path and the second 2R path corresponding to the second band can be determined based on the second band.

It may be understood that the secondary card-supported band is a band supported by the secondary card. If the secondary card does not support the first band of the primary card, it indicates that no 2R path is added to the first band. At least one 2R path is configured for the first band. Therefore, the third 2R path corresponding to the first band can be determined based on the first band.

It may be understood that, in a case in which both the first band and the second band are low bands or medium-high bands, the terminal simultaneously uses a same set of primary-diversity antennas through the primary card and the secondary card. In a case in which the first band is a low band and the second band is medium-high band, or the first band is a medium-high band and the second band is a low band, a primary-diversity antenna used by the terminal through the primary card and a primary-diversity antenna used by the terminal through the secondary card are different primary-diversity antennas.

In this embodiment of this application, a 2R path is added to a secondary card-supported band, and it is specified that when a primary-secondary card (a primary card and a secondary card) uses a same set of primary-diversity antennas, the secondary card uses the first 2R path; and when a primary-secondary card uses different sets of primary-diversity antennas, the secondary card uses the second 2R path. Therefore, configuration information of the two 2R paths in the band supported by the secondary card may be flexibly designed based on a priority principle of the primary-secondary card for the primary receive path and the diversity receive path in different scenarios. In this way, when the primary-secondary card uses different 2R paths in different scenarios, an expected effect can be achieved, and performance of dual-card signal sending/receiving (receiving, sending, or receiving or sending) can be improved. For example, it is ensured that receiving of the secondary card does not affect sending performance of the primary card, or receiving performance of the secondary card is improved without affecting sending performance of the primary card.

With reference to the first aspect, in a possible implementation, antenna status configuration information of an antenna tuning switch of a primary antenna is configured on a primary receive path of the first 2R path and a primary receive path of the second 2R path, antenna status configuration information of an antenna tuning switch of a diversity antenna is configured on the primary receive path of the first 2R path and a diversity receive path of the second 2R path, no antenna status configuration information is configured on a diversity receive path of the first 2R path, and the antenna status configuration information is used to adjust a value of a tuning element of an antenna tuning switch on a corresponding antenna circuit.

It may be understood that in a radio frequency circuit, different bands correspond to values (for example, impedance values) of different paths for different tuning elements. A primary tuner is configured to adjust a configuration of an antenna tuning switch between a radio frequency circuit and a primary antenna circuit, so that a tuning element between the radio frequency circuit and the primary antenna circuit is matched (for example, impedance matching). A diversity tuner is configured to adjust a configuration of an antenna tuning switch between a radio frequency circuit and a diversity antenna circuit, so that the configuration of the antenna tuning switch between the radio frequency circuit and the diversity antenna circuit matches a tuning element between the radio frequency circuit and the diversity antenna circuit. It may be understood that when the primary path includes PRX and a primary transmit path, the PRX and the primary transmit path share a same tuner.

In the following, antenna status configuration information of an antenna tuning switch of a diversity antenna is briefly referred to as a diversity tuner, and antenna status configuration information of an antenna tuning switch of a primary antenna is briefly referred to as a primary tuner. A primary receive path is referred to as PRX, and a diversity receive path is referred to as DRX.

In this embodiment of this application, at least two 2R paths are configured for the secondary card-supported band, which are respectively the first 2R path and the second 2R path, a primary tuner and a diversity tuner are configured on PRX of the first 2R path, and no diversity tuner is configured on DRX. A primary tuner is configured on PRX of the second 2R path, and a diversity tuner is configured on DRX.

It may be understood that in a case in which the secondary card does not support the first band, the first band includes at least one 2R path (the third 2R path). In this embodiment of this application, a configuration of a primary tuner and a diversity tuner in the third 2R path is not limited. For example, a primary tuner and a diversity tuner may be configured on PRX of the third 2R path, and no primary tuner or diversity tuner is configured on DRX. For example, alternatively, a primary tuner may be configured on PRX of the third 2R path, and no diversity tuner is configured on DRX.

In this embodiment of this application, based on different combinations of using a primary antenna or a diversity antenna through a primary path and a diversity path, the antenna status may be divided into a direct state and a cross state. If a signal is received and/or sent through the primary antenna by using the primary path, and a signal is received through the diversity antenna by using the diversity path, the antenna status is the direct state. If a signal is received and/or sent through the diversity path by using the primary path, and a signal is received through the primary antenna by using the diversity path, the antenna status is the cross state.

Generally, when a decrease in signal strength of a signal sent by the primary antenna in the terminal is greater than a target threshold (for example, 3 dB (decibel)) or signal strength of a signal sent by the primary antenna is less than signal strength of a signal sent by the diversity antenna, an antenna switch module located between the radio frequency path and the antenna circuit in the terminal switches the antenna status to the cross state. In this embodiment of this application, because a third-party antenna tuning switch is used, only antenna status configuration information of the antenna tuning switch can be configured in the radio frequency circuit. Therefore, in a case in which the antenna switch module switches the antenna status to the cross state when the terminal uses an antenna through the primary card, the secondary card cannot perceive that the antenna status is switched to the cross state, and the secondary card still receives data by using the diversity antenna in the direct state.

In this embodiment of this application, if the secondary card does not support the first band, both the first band and the second band are low bands or medium-high bands, and the terminal simultaneously uses a same set of primary-diversity antennas by using the primary-secondary card, the terminal communicates with the second base station through the secondary card by using the first 2R path. It may be understood that if the primary-secondary uses a same set of primary-diversity antennas, the terminal may use the DRX by using the secondary card, and may use the PRX by using the primary card. It may be understood that a primary tuner and a diversity tuner are configured on the PRX of the first 2R path, and no primary tuner or diversity tuner is configured on the DRX. In this case, when the terminal sends a signal through the diversity antenna on the primary path by using the primary card in a case in which the antenna status is the cross state, the terminal uses the DRX (no diversity tuner is configured) in the first 2R path by using the secondary card. Because the secondary card has no permission to modify the configuration of the antenna tuning switch of the diversity antenna by using the diversity tuner on the PRX, it can be ensured that when the primary card uses the diversity antenna to send a signal, the secondary card does not modify the configuration of the antenna tuning switch of the diversity antenna when receiving a signal through the diversity antenna.

Therefore, in a case in which the terminal simultaneously uses a same set of primary-diversity antennas by using the primary card and the secondary card, it is ensured that signal receiving of the secondary card through the diversity antenna does not affect performance of sending a signal by the primary card by using the diversity antenna, and performance of sending a signal by the primary card is improved.

In this embodiment of this application, in a case in which the first band is a medium-high band and the second band is a low band, or the first band is a low band and the second band is a medium-high band, and the terminal uses different sets of primary-diversity antennas by using the primary card and the secondary card, the terminal communicates with the second base station through the secondary card by using the first 2R path. In addition, the primary card needs to receive and/or send a signal through the primary antenna by using the primary path, and a low band primary antenna is coupled to a medium-high band primary antenna. In this case, the terminal can receive a signal only through the secondary card by using the diversity antenna on the DRX of the second 2R path. Because a diversity tuner is configured on the DRX of the second 2R path, the terminal may modify the configuration of the antenna tuning switch of the diversity antenna to a configuration corresponding to the second band by using the secondary card.

Therefore, in a case in which the terminal uses different sets of primary-diversity antennas by using the primary-secondary card, signal receiving performance of the secondary card can be improved without affecting signal sending/receiving performance of the primary card.

With reference to the first aspect, in a possible implementation, the selection condition includes a whitelist, and the whitelist is pre-stored in the terminal; and the determining, based on the first identifier, the second identifier, the third identifier, the fourth identifier, the fifth identifier, the sixth identifier, and a selection condition stored in the terminal, to communicate with the second base station through the secondary card by using the first 2R path or the second 2R path specifically includes: when determining that the whitelist includes an association relationship between the first identifier and the second identifier and the fifth identifier and the sixth identifier, determining to communicate with the second base station through the secondary card by using the first 2R path.

For ease of description below, a band supported by the secondary card is referred to as a first supported band, a band supported by both the primary card and the secondary card is referred to as a target band, a band other than the target band in bands supported by the primary card is referred to as a second supported band, and a target band in the bands supported by the primary card is referred to as a third supported band. It may also be understood that a set of the second supported band and the third supported band is a band supported by the primary card, the third supported band is included in the first supported band, and the second supported band is not included in the first supported band.

In this embodiment of this application, the selection condition may include the whitelist, and the whitelist is pre-stored in the terminal. The whitelist is used to indicate that two 2R paths can be used at the same time. If the whitelist stores an association relationship between two 2R paths, the two 2R paths are used at the same time. For example, in an association relationship between the first 2R path (the first identifier and the second identifier) and the third 2R path (the fifth identifier and the sixth identifier), the terminal may communicate with the base station through the secondary card by using the first 2R path and through the primary card by using the third 2R path.

For ease of description below, a band supported by both the primary card and the secondary card is referred to as a target band, a band supported by the secondary card is referred to as a first supported band, a band other than the target band in bands supported by the primary card is referred to as a second supported band, and a target band in the bands supported by the primary card is referred to as a third supported band.

For example, generation of the whitelist in the terminal may include: determining a first 2R path (the first identifier and the second identifier) and a second 2R path of each low band in the first supported band, determining a third 2R path (the fifth identifier and the sixth identifier) of each low band in the second supported band, and storing an association relationship between the first 2R path and the third 2R path in the whitelist.

For example, generation of the whitelist in the terminal may alternatively include: determining a first 2R path and a second 2R path of each medium-high band in the first supported band, determining a third 2R path of each medium-high band in the second supported band, and storing an association relationship between the first 2R path and the third 2R path in the whitelist.

Therefore, it is specified that when the terminal communicates with the base station through the secondary card in the second band and through the primary card in the first band by using a same set of primary-diversity antennas, the secondary card uses the first 2R path, and the primary card uses the third 2R path.

With reference to the first aspect, in a possible implementation, the selection condition includes a blacklist, and the blacklist is pre-stored in the terminal; and the determining, based on the first identifier, the second identifier, the third identifier, the fourth identifier, the fifth identifier, the sixth identifier, and a selection condition stored in the terminal, to communicate with the second base station through the secondary card by using the first 2R path or the second 2R path specifically includes: when determining that the blacklist does not include an association relationship between the first identifier and the second identifier and the fifth identifier and the sixth identifier, determining to communicate with the second base station through the secondary card by using the first 2R path.

It may be understood that, when it is determined that the blacklist does not include the association relationship between the first identifier and the second identifier and the fifth identifier and the sixth identifier, it is determined to use the first 2R path to communicate with the second base station by using the secondary card. This may also be understood as that when it is determined that the blacklist does not include the association relationship between the first identifier and the second identifier and the fifth identifier and the sixth identifier, and the blacklist includes an association relationship between the third identifier and the fourth identifier and the fifth identifier and the sixth identifier, it is determined to use the first 2R path to communicate with the second base station by using the secondary card.

In this embodiment of this application, the selection condition may include the blacklist, and the blacklist is pre-stored in the terminal. The blacklist is used to indicate that two 2R paths cannot be used at the same time. If an association relationship between two 2R paths are stored in the blacklist, the two 2R paths cannot be used at the same time. For example, if the blacklist stores an association relationship between the second 2R path (the third identifier and the fourth identifier) and the third 2R path (the fifth identifier and the sixth identifier), the terminal cannot communicate with the base station simultaneously through the secondary card by using the second 2R path and through the primary card by using the third 2R path. If the blacklist does not store an association relationship between the first 2R path (the first identifier and the second identifier) and the third 2R path (the fifth identifier and the sixth identifier), the terminal may communicate with the base station through the secondary card by using the first 2R path and through the primary card by using the third 2R path.

For example, generation of the blacklist in the terminal may include: determining a first 2R path and a second 2R path of each low band in the first supported band, determining a third 2R path of each low band in the second supported band, and storing an association relationship between the second 2R path and the third 2R path in the blacklist.

For example, generation of the blacklist in the terminal may alternatively include: determining a first 2R path and a second 2R path of each medium-high band in the first supported band, determining a third 2R path of each medium-high band in the second supported band, and storing an association relationship between the second 2R path and the third 2R path in the blacklist.

Therefore, it is specified that when the terminal communicates with the base station through the secondary card in the second band and through the primary card in the first band by using a same set of primary-diversity antennas, the secondary card cannot use the second 2R path, but can use the first 2R path.

It may be understood that, in some cases, the whitelist may indicate that two 2R paths that meet a whitelist condition can be used at the same time (for example, the first 2R path and the third 2R path). The blacklist may indicate that two 2R paths that meet a blacklist condition cannot be used at the same time (for example, the second 2R path and the third 2R path). However, this does not necessarily indicate that the terminal can use the first 2R path and the third 2R path together only through the primary card and the secondary card.

Therefore, the selection condition may include only a blacklist or only a whitelist. This can avoid that in some burst cases (for example, the second 2R path is damaged and unavailable), the secondary card faces a case in which no 2R path is available, thereby reducing a program execution error rate.

With reference to the first aspect, in a possible implementation, the selection condition includes a blacklist and a whitelist, and the blacklist and the whitelist are pre-stored in the terminal; and the determining, based on the first identifier, the second identifier, the third identifier, the fourth identifier, the fifth identifier, the sixth identifier, and a selection condition stored in the terminal, to communicate with the second base station through the secondary card by using the first 2R path or the second 2R path specifically includes: when determining that the blacklist does not include an association relationship between the first identifier and the second identifier and the fifth identifier and the sixth identifier, and determining that the whitelist includes the association relationship between the first identifier and the second identifier and the fifth identifier and the sixth identifier, determining to communicate with the second base station through the secondary card by using the first 2R path.

In this embodiment of this application, the selection condition may include the blacklist and the whitelist, and the blacklist and the whitelist are pre-stored in the terminal. The whitelist is used to indicate that two 2R paths can be used at the same time. If the whitelist stores an association relationship between two 2R paths, the two 2R paths are used at the same time. For example, if the whitelist stores an association relationship between the first 2R path (the first identifier and the second identifier) and the third 2R path (the fifth identifier and the sixth identifier), the terminal may communicate with the base station through the secondary card by using the first 2R path and through the primary card by using the third 2R path. The blacklist is used to indicate that two 2R paths cannot be used at the same time. If an association relationship between two 2R paths are stored in the blacklist, the two 2R paths cannot be used at the same time. For example, in an association relationship between the second 2R path (the third identifier and the fourth identifier) and the third 2R path (the fifth identifier and the sixth identifier), the terminal cannot communicate with the base station simultaneously through the secondary card by using the second 2R path and through the primary card by using the third 2R path. If the blacklist does not store an association relationship between the first 2R path (the first identifier and the second identifier) and the third 2R path (the fifth identifier and the sixth identifier), the terminal may communicate with the base station through the secondary card by using the first 2R path and through the primary card by using the third 2R path.

For example, generation of the blacklist and the whitelist in the terminal may include: determining a first 2R path (the first identifier and the second identifier) and a second 2R path of each low band in the first supported band, determining a third 2R path (the fifth identifier and the sixth identifier) of each low band in the second supported band, storing an association relationship between the first 2R path and the third 2R path in the whitelist, and storing an association relationship between the second 2R path and the third 2R path in the blacklist.

For example, generation of the blacklist and the whitelist in the terminal may alternatively include: determining a first 2R path and a second 2R path of each medium-high band in the first supported band, determining a third 2R path of each medium-high band in the second supported band, storing an association relationship between the first 2R path and the third 2R path in the whitelist, and storing an association relationship between the second 2R path and the third 2R path in the blacklist.

It may be understood that, in some cases, the whitelist may indicate only that two 2R paths that meet a whitelist condition can be used at the same time (for example, the first 2R path and the third 2R path), and cannot absolutely indicate that the terminal necessarily uses both the first 2R path and the third 2R path by using the primary card and the secondary card. Although the second 2R path and the third 2 path are not in the whitelist, it cannot be absolutely ensured that the second 2R path and the third 2R path are not used simultaneously.

Therefore, the selection condition in this embodiment of this application may include both the blacklist and the whitelist, the second 2R path and the third 2R path are added to the blacklist, and the first 2R path and the third 2R path are added to the whitelist. When the second band includes only the first 2R path and the second 2R path, and the first band includes only the third 2R path, it is ensured that the second 2R path and the third 2R path are not used, and the first 2R path and the second 2R path are necessarily used, thereby improving accuracy of program execution.

With reference to the first aspect, in a possible implementation, the selection condition includes a whitelist, and the whitelist is pre-stored in the terminal; and the determining, based on the first identifier, the second identifier, the third identifier, the fourth identifier, the fifth identifier, the sixth identifier, and a selection condition stored in the terminal, to communicate with the second base station through the secondary card by using the first 2R path or the second 2R path specifically includes: when determining that the whitelist includes an association relationship between the third identifier and the fourth identifier and the fifth identifier and the sixth identifier, determining to communicate with the second base station through the secondary card by using the second 2R path.

In this embodiment of this application, the whitelist is used to indicate that two 2R paths can be used at the same time. If the whitelist stores an association relationship between two 2R paths, the two 2R paths are used at the same time. For example, if the whitelist stores an association relationship between the second 2R path (the third identifier and the fourth identifier) and the third 2R path (the fifth identifier and the sixth identifier), the terminal may communicate with the base station through the secondary card by using the second 2R path and through the primary card by using the third 2R path.

For example, generation of the whitelist in the terminal may include: determining a first 2R path and a second 2R path of each medium-high band in the first supported band, determining a third 2R path of each low band in the second supported band, and storing an association relationship between the second 2R path and the third 2R path in the whitelist.

For example, generation of the whitelist in the terminal may alternatively include: determining a first 2R path and a second 2R path of each low band in the first supported band, determining a third 2R path of each medium-high band in the second supported band, and storing an association relationship between the second 2R path and the third 2R path in the whitelist.

With reference to the first aspect, in a possible implementation, the selection condition includes a blacklist, and the blacklist is pre-stored in the terminal; and the determining, based on the first identifier, the second identifier, the third identifier, the fourth identifier, the fifth identifier, the sixth identifier, and a selection condition stored in the terminal, to communicate with the second base station through the secondary card by using the first 2R path or the second 2R path specifically includes: when determining that the blacklist does not include an association relationship between the third identifier and the fourth identifier and the fifth identifier and the sixth identifier, determining to communicate with the second base station through the secondary card by using the second 2R path.

It may be understood that, when it is determined that the blacklist does not include the association relationship between the third identifier and the fourth identifier and the fifth identifier and the sixth identifier, it is determined to use the second 2R path to communicate with the second base station by using the secondary card. This may also be understood as that when it is determined that the blacklist does not include the association relationship between the third identifier and the fourth identifier and the fifth identifier and the sixth identifier, and the blacklist includes an association relationship between the first identifier and the second identifier and the fifth identifier and the sixth identifier, it is determined to use the second 2R path to communicate with the second base station by using the secondary card.

In this embodiment of this application, the blacklist is used to indicate that two 2R paths cannot be used at the same time. If an association relationship between two 2R paths are stored in the blacklist, the two 2R paths cannot be used at the same time. For example, if the blacklist stores an association relationship between the first 2R path (the third identifier and the fourth identifier) and the third 2R path (the fifth identifier and the sixth identifier), the terminal cannot communicate with the base station simultaneously through the secondary card by using the first 2R path and through the primary card by using the third 2R path. If the blacklist does not store an association relationship between the second 2R path (the first identifier and the second identifier) and the third 2R path (the fifth identifier and the sixth identifier), the terminal may communicate with the base station through the secondary card by using the second 2R path and through the primary card by using the third 2R path.

For example, generation of the blacklist in the terminal may include: determining a first 2R path and a second 2R path of each medium-high band in the first supported band, determining a third 2R path of each low band in the second supported band, and storing an association relationship between the first 2R path and the third 2R path in the blacklist.

For example, generation of the blacklist in the terminal may alternatively include: determining a first 2R path and a second 2R path of each low band in the first supported band, determining a third 2R path of each medium-high band in the second supported band, and storing an association relationship between the first 2R path and the third 2R path in the blacklist.

With reference to the first aspect, in a possible implementation, the selection condition includes a blacklist and a whitelist, and the blacklist and the whitelist are pre-stored in the terminal; and the determining, based on the first identifier, the second identifier, the third identifier, the fourth identifier, the fifth identifier, the sixth identifier, and a selection condition stored in the terminal, to communicate with the second base station through the secondary card by using the first 2R path or the second 2R path specifically includes: when determining that the blacklist does not include an association relationship between the third identifier and the fourth identifier and the fifth identifier and the sixth identifier, and determining that the whitelist includes the association relationship between the third identifier and the fourth identifier and the fifth identifier and the sixth identifier, determining to communicate with the second base station through the secondary card by using the second 2R path.

It may be understood that, when it is determined that the blacklist does not include the association relationship between the third identifier and the fourth identifier and the fifth identifier and the sixth identifier, and the whitelist includes the association relationship between the third identifier and the fourth identifier and the fifth identifier and the sixth identifier, it is determined to use the second 2R path to communicate with the second base station by using the secondary card. This may also be understood as that when it is determined that the blacklist does not include the association relationship between the third identifier and the fourth identifier and the fifth identifier and the sixth identifier, the blacklist includes an association relationship between the first identifier and the second identifier and the fifth identifier and the sixth identifier, and the whitelist includes the association relationship between the third identifier and the fourth identifier and the fifth identifier and the sixth identifier, it is determined to use the second 2R path to communicate with the second base station by using the secondary card.

In this embodiment of this application, the whitelist is used to indicate that two 2R paths can be used at the same time. If the whitelist stores an association relationship between two 2R paths, the two 2R paths are used at the same time. For example, if the whitelist stores an association relationship between the second 2R path (the third identifier and the fourth identifier) and the third 2R path (the fifth identifier and the sixth identifier), the terminal may communicate with the base station through the secondary card by using the second 2R path and through the primary card by using the third 2R path. The blacklist is used to indicate that two 2R paths cannot be used at the same time. If an association relationship between two 2R paths are stored in the blacklist, the two 2R paths cannot be used at the same time. For example, if the blacklist stores an association relationship between the first 2R path (the third identifier and the fourth identifier) and the third 2R path (the fifth identifier and the sixth identifier), the terminal cannot communicate with the base station simultaneously through the secondary card by using the first 2R path and through the primary card by using the third 2R path. If the blacklist does not store an association relationship between the second 2R path (the first identifier and the second identifier) and the third 2R path (the fifth identifier and the sixth identifier), the terminal may communicate with the base station through the secondary card by using the second 2R path and through the primary card by using the third 2R path.

For example, generation of the blacklist and the whitelist in the terminal may include: determining a first 2R path and a second 2R path of each medium-high band in the first supported band, determining a third 2R path of each low band in the second supported band, storing an association relationship between the second 2R path and the third 2R path in the whitelist, and storing an association relationship between the first 2R path and the third 2R path in the blacklist.

For example, generation of the blacklist and the whitelist in the terminal may alternatively include: determining a first 2R path and a second 2R path of each low band in the first supported band, determining a third 2R path of each medium-high band in the second supported band, and storing an association relationship between the second 2R path and the third 2R path in the whitelist, and storing an association relationship between the first 2R path and the third 2R path in the blacklist.

With reference to the first aspect, in a possible implementation, the method further includes: when the secondary card supports the first band, determining the first identifier and the second identifier of the first 2R path and the third identifier and the fourth identifier of the second 2R path based on the second band, and determining a seventh identifier and an eighth identifier of a fourth 2R path and a ninth identifier and a tenth identifier of a fifth 2R path based on the first band, where the first identifier, the third identifier, the seventh identifier, and the ninth identifier are identifiers of primary receive paths, and the second identifier, the fourth identifier, the eighth identifier, and the tenth identifier are identifiers of diversity receive paths; and determining, based on the first identifier, the second identifier, the third identifier, the fourth identifier, the seventh identifier, the eighth identifier, the ninth identifier, the tenth identifier, and the selection condition stored in the terminal, to communicate with the second base station through the secondary card by using the first 2R path or the second 2R path.

It may be understood that if the secondary card supports the first band of the primary card, it indicates that a 2R path is added to the first band. At least two 2R paths are configured for the first band. Therefore, the fourth 2R path and the fifth 2R path corresponding to the first band can be determined based on the first band.

It may be understood that a manner in which a primary tuner and a diversity tuner are configured in the PRX and the DRX in the fourth 2R path and the fifth 2R path of the first band is consistent with a manner in which a primary tuner and a diversity tuner are configured in the PRX and the DRX in the first 2R path and the second 2R path of the second band. That is, the primary tuner and the diversity tuner are configured on the PRX of the fourth 2R path, and the primary tuner or the diversity tuner is not configured on the DRX of the fourth 2R path. The primary tuner is configured on the PRX of the fifth 2R path, and the diversity tuner is configured on the DRX of the fifth 2R path.

It may be understood that when a band range of the first band is the same as a band range of the second band, the first 2R path and the fourth 2R path are a same 2R path, and the second 2R path and the fifth 2R path are a same 2R path.

In this embodiment of this application, if the secondary card supports the first band, both the first band and the second band are low bands or medium-high bands, and the terminal simultaneously uses a same set of primary-diversity antennas by using the primary-secondary card, the terminal communicates with the second base station through the secondary card by using the first 2R path. It may be understood that if the primary-secondary uses a same set of primary-diversity antennas, the terminal may use the DRX by using the secondary card, and may use the PRX by using the primary card. It may be understood that a primary tuner and a diversity tuner are configured on the PRX of the first 2R path, and no primary tuner or diversity tuner is configured on the DRX. In this case, when the terminal sends a signal through the diversity antenna on the primary path by using the primary card in a case in which the antenna status is the cross state, the terminal uses the DRX (no diversity tuner is configured) in the first 2R path by using the secondary card. Because the secondary card has no permission to modify the configuration of the antenna tuning switch of the diversity antenna by using the diversity tuner on the PRX, it can be ensured that when the primary card uses the diversity antenna to send a signal, the secondary card does not modify the configuration of the antenna tuning switch of the diversity antenna when receiving a signal through the diversity antenna.

Therefore, in a case in which the terminal simultaneously uses a same set of primary-diversity antennas by using the primary card and the secondary card, it is ensured that signal receiving of the secondary card through the diversity antenna does not affect performance of sending a signal by the primary card by using the diversity antenna, and performance of sending a signal by the primary card is improved.

In this embodiment of this application, in a case in which the secondary card supports the first band, the first band is a medium-high band and the second band is a low band, or the first band is a low band and the second band is a medium-high band, and the terminal uses different sets of primary-diversity antennas by using the primary card and the secondary card, the terminal communicates with the second base station through the secondary card by using the first 2R path. In addition, the primary card needs to receive and/or send a signal through the primary antenna by using the primary path, and a low band primary antenna is coupled to a medium-high band primary antenna. In this case, the terminal can receive a signal only through the secondary card by using the diversity antenna on the DRX of the second 2R path. Because a diversity tuner is configured on the DRX of the second 2R path, the terminal may modify the configuration of the antenna tuning switch of the diversity antenna to a configuration corresponding to the second band by using the secondary card.

Therefore, in a case in which the terminal uses different sets of primary-diversity antennas by using the primary-secondary card, signal receiving performance of the secondary card can be improved without affecting signal sending/receiving performance of the primary card.

With reference to the first aspect, in a possible implementation, the selection condition includes a whitelist, and the whitelist is pre-stored in the terminal; and the determining, based on the first identifier, the second identifier, the third identifier, the fourth identifier, the seventh identifier, the eighth identifier, the ninth identifier, the tenth identifier, and the selection condition stored in the terminal, to communicate with the second base station through the secondary card by using the first 2R path or the second 2R path specifically includes: when determining that the whitelist includes an association relationship between the first identifier and the second identifier and the seventh identifier and the eighth identifier, or determining that the whitelist includes an association relationship between the first identifier and the second identifier and the ninth identifier and the tenth identifier, determining to communicate with the second base station through the secondary card by using the first 2R path.

In this embodiment of this application, the whitelist is used to indicate that two 2R paths can be used at the same time. If the whitelist stores an association relationship between two 2R paths, the two 2R paths are used at the same time. For example, if the whitelist stores an association relationship between the first 2R path (the first identifier and the second identifier) and the fourth 2R path (the seventh identifier and the eighth identifier), the terminal may communicate with the base station through the secondary card by using the first 2R path and through the primary card by using the fourth 2R path. Alternatively, if the whitelist stores an association relationship between the first 2R path (the first identifier and the second identifier) and the fifth 2R path (the ninth identifier and the tenth identifier), the terminal may communicate with the base station through the secondary card by using the first 2R path and through the primary card by using the fifth 2R path.

For example, generation of the whitelist in the terminal may include: determining a first 2R path and a second 2R path of each low band in the first supported band, determining a fourth 2R path and a fifth 2R path of each low band in the third supported band, and storing an association relationship between the first 2R path and the fourth 2R path in the whitelist, or storing an association relationship between the first 2R path and the fifth 2R path in the whitelist.

For example, generation of the whitelist in the terminal may alternatively include: determining a first 2R path and a second 2R path of each medium-high band in the first supported band, determining a fourth 2R path and a fifth 2R path of each medium-high band in the third supported band, and storing an association relationship between the first 2R path and the fourth 2R path in the whitelist, or storing an association relationship between the first 2R path and the fifth 2R path in the whitelist.

With reference to the first aspect, in a possible implementation, the determining to communicate with the second base station through the secondary card by using the first 2R path when determining that the whitelist includes an association relationship between the first identifier and the second identifier and the seventh identifier and the eighth identifier, or determining that the whitelist includes an association relationship between the first identifier and the second identifier and the ninth identifier and the tenth identifier specifically includes: when determining that the whitelist includes the association relationship between the first identifier and the second identifier and the seventh identifier and the eighth identifier, determining to communicate with the second base station through the secondary card by using the first 2R path, and determining to communicate with the first base station through the primary card by using the fourth 2R path; or when determining that the whitelist includes the association relationship between the first identifier and the second identifier and the ninth identifier and the tenth identifier, determining to communicate with the second base station through the secondary card by using the first 2R path, and determining to communicate with the first base station through the primary card by using the fifth 2R path.

It may be understood that the terminal may communicate with the first base station by using the fourth 2R path or the fifth 2R path through the primary card. If the whitelist stores the association relationship between the first 2R path and the fourth 2R path, the terminal communicates with the first base station by using the fourth 2R path through the primary card. If the whitelist stores the association relationship between the first 2R path and the fifth 2R path, the terminal communicates with the first base station by using the fifth 2R path through the primary card.

With reference to the first aspect, in a possible implementation, the selection condition includes a blacklist, and the blacklist is pre-stored in the terminal; and the determining, based on the first identifier, the second identifier, the third identifier, the fourth identifier, the seventh identifier, the eighth identifier, the ninth identifier, the tenth identifier, and the selection condition stored in the terminal, to communicate with the second base station through the secondary card by using the first 2R path or the second 2R path specifically includes: when determining that the blacklist does not include an association relationship between the first identifier and the second identifier and the seventh identifier and the eighth identifier, or determining that the blacklist does not include an association relationship between the first identifier and the second identifier and the ninth identifier and the tenth identifier, determining to communicate with the second base station through the secondary card by using the first 2R path.

It may be understood that, when it is determined that the blacklist does not include the association relationship between the first identifier and the second identifier and the seventh identifier and the eighth identifier, or it is determined that the blacklist does not include the association relationship between the first identifier and the second identifier and the ninth identifier and the tenth identifier, it is determined to communicate with the second base station through the secondary card by using the first 2R path. This may also be understood as that when it is determined that the blacklist does not include the association relationship between the first identifier and the second identifier and the seventh identifier and the eighth identifier, and the blacklist includes the association relationship between the third identifier and the fourth identifier and the ninth identifier and the tenth identifier, the association relationship between the third identifier and the fourth identifier and the seventh identifier and the eighth identifier, and the association relationship between the first identifier and the second identifier and the ninth identifier and the tenth identifier, or when it is determined that the blacklist does not include the association relationship between the first identifier and the second identifier and the ninth identifier and the tenth identifier, and the blacklist includes the association relationship between the third identifier and the fourth identifier and the seventh identifier and the eighth identifier, the association relationship between the first identifier and the second identifier and the seventh identifier and the eighth identifier, and the association relationship between the third identifier and the fourth identifier and the ninth identifier and the tenth identifier, it is determined to communicate with the second base station through the secondary card by using the first 2R path.

For example, generation of the blacklist in the terminal may include: determining a first 2R path and a second 2R path of each low band in the first supported band, determining a fourth 2R path and a fifth 2R path of each low band in the third supported band, and storing an association relationship between the first 2R path and the fifth 2R path, an association relationship between the second 2R path and the fourth 2R path, and an association relationship between the second 2R path and the fifth 2R path in the blacklist, or storing an association relationship between the first 2R path and the fourth 2R path, an association relationship between the second 2R path and the fourth 2R path, and an association relationship between the second 2R path and the fifth 2R path in the blacklist.

For example, generation of the blacklist in the terminal may alternatively include: determining a first 2R path and a second 2R path of each medium-high band in the first supported band, determining a fourth 2R path and a fifth 2R path of each medium-high band in the third supported band, and storing an association relationship between the first 2R path and the fifth 2R path, an association relationship between the second 2R path and the fourth 2R path, and an association relationship between the second 2R path and the fifth 2R path in the blacklist, or storing an association relationship between the first 2R path and the fourth 2R path, an association relationship between the second 2R path and the fourth 2R path, and an association relationship between the second 2R path and the fifth 2R path in the blacklist.

With reference to the first aspect, in a possible implementation, the determining to communicate with the second base station through the secondary card by using the first 2R path when determining that the blacklist does not include an association relationship between the first identifier and the second identifier and the seventh identifier and the eighth identifier, or determining that the blacklist does not include an association relationship between the first identifier and the second identifier and the ninth identifier and the tenth identifier specifically includes: when determining that the blacklist does not include the association relationship between the first identifier and the second identifier and the seventh identifier and the eighth identifier, determining to communicate with the second base station through the secondary card by using the first 2R path, and determining to communicate with the first base station through the primary card by using the fourth 2R path; or when determining that the blacklist does not include the association relationship between the first identifier and the second identifier and the ninth identifier and the tenth identifier, determining to communicate with the second base station through the secondary card by using the first 2R path, and determining to communicate with the first base station through the primary card by using the fifth 2R path.

It may be understood that, when it is determined that the blacklist does not include the association relationship between the first identifier and the second identifier and the seventh identifier and the eighth identifier, it is determined to communicate with the second base station through the secondary card by using the first 2R path, and it is determined to communicate with the first base station through the primary card by using the fourth 2R path; or when it is determined that the blacklist does not include the association relationship between the first identifier and the second identifier and the ninth identifier and the tenth identifier, it is determined to communicate with the second base station through the secondary card by using the first 2R path, and it is determined to communicate with the first base station through the primary card by using the fifth 2R path. This may also be understood as that when it is determined that the blacklist does not include the association relationship between the first identifier and the second identifier and the seventh identifier and the eighth identifier, and the blacklist includes the association relationship between the third identifier and the fourth identifier and the ninth identifier and the tenth identifier, the association relationship between the third identifier and the fourth identifier and the seventh identifier and the eighth identifier, and the association relationship between the first identifier and the second identifier and the ninth identifier and the tenth identifier, it is determined to communicate with the second base station through the secondary card by using the first 2R path, and it is determined to communicate with the first base station through the primary card by using the fourth 2R path; or when it is determined that the blacklist does not include the association relationship between the first identifier and the second identifier and the ninth identifier and the tenth identifier, and the blacklist includes the association relationship between the third identifier and the fourth identifier and the seventh identifier and the eighth identifier, the association relationship between the first identifier and the second identifier and the seventh identifier and the eighth identifier, and the association relationship between the third identifier and the fourth identifier and the ninth identifier and the tenth identifier, it is determined to communicate with the second base station through the secondary card by using the first 2R path, and it is determined to communicate with the first base station through the primary card by using the fifth 2R path.

It may be understood that the terminal may communicate with the first base station by using the fourth 2R path or the fifth 2R path through the primary card. If the blacklist does not include the association relationship between the first 2R path and the fourth 2R path, the terminal communicates with the first base station by using the fourth 2R path through the primary card. If the blacklist does not include the association relationship between the first 2R path and the fifth 2R path, the terminal communicates with the first base station by using the fifth 2R path through the primary card.

With reference to the first aspect, in a possible implementation, the selection condition includes a blacklist and a whitelist, and the blacklist and the whitelist are pre-stored in the terminal; and the determining, based on the first identifier, the second identifier, the third identifier, the fourth identifier, the seventh identifier, the eighth identifier, the ninth identifier, the tenth identifier, and the selection condition stored in the terminal, to communicate with the second base station through the secondary card by using the first 2R path or the second 2R path specifically includes: when determining that the blacklist does not include an association relationship between the first identifier and the second identifier and the seventh identifier and the eighth identifier, and determining that the whitelist includes the association relationship between the first identifier and the second identifier and the seventh identifier and the eighth identifier, or when determining that the blacklist does not include an association relationship between the first identifier and the second identifier and the ninth identifier and the tenth identifier, and determining that the whitelist includes the association relationship between the first identifier and the second identifier and the ninth identifier and the tenth identifier, determining to communicate with the second base station through the secondary card by using the first 2R path.

It may be understood that, when it is determined that the blacklist does not include the association relationship between the first identifier and the second identifier and the seventh identifier and the eighth identifier, and it is determined that the whitelist includes the association relationship between the first identifier and the second identifier and the seventh identifier and the eighth identifier, or when it is determined that the blacklist does not include the association relationship between the first identifier and the second identifier and the ninth identifier and the tenth identifier, and it is determined that the whitelist includes the association relationship between the first identifier and the second identifier and the ninth identifier and the tenth identifier, it is determined to communicate with the second base station through the secondary card by using the first 2R path. This may also be understood as that when it is determined that the blacklist does not include the association relationship between the first identifier and the second identifier and the seventh identifier and the eighth identifier, the blacklist includes the association relationship between the third identifier and the fourth identifier and the ninth identifier and the tenth identifier, the association relationship between the third identifier and the fourth identifier and the seventh identifier and the eighth identifier, and the association relationship between the first identifier and the second identifier and the ninth identifier and the tenth identifier, and the whitelist includes the association relationship between the first identifier and the second identifier and the seventh identifier and the eighth identifier, or when it is determined that the blacklist does not include the association relationship between the first identifier and the second identifier and the ninth identifier and the tenth identifier, the blacklist includes the association relationship between the third identifier and the fourth identifier and the seventh identifier and the eighth identifier, the association relationship between the first identifier and the second identifier and the seventh identifier and the eighth identifier, and the association relationship between the third identifier and the fourth identifier and the ninth identifier and the tenth identifier, and the whitelist includes the association relationship between the first identifier and the second identifier and the ninth identifier and the tenth identifier, it is determined to communicate with the second base station through the secondary card by using the first 2R path.

For example, generation of the whitelist and the blacklist in the terminal may include: determining a first 2R path and a second 2R path of each low band in the first supported band; determining a fourth 2R path and a fifth 2R path of each low band in the third supported band; and storing an association relationship between the first 2R path and the fourth 2R path in the whitelist, and storing an association relationship between the first 2R path and the fifth 2R path, an association relationship between the second 2R path and the fourth 2R path, and an association relationship between the second 2R path and the fifth 2R path in the blacklist; or storing an association relationship between the first 2R path and the fifth 2R path in the whitelist, and storing an association relationship between the first 2R path and the fourth 2R path, an association relationship between the second 2R path and the fourth 2R path, and an association relationship between the second 2R path and the fifth 2R path in the blacklist.

For example, generation of the whitelist and the blacklist in the terminal may alternatively include: determining a first 2R path and a second 2R path of each medium-high band in the first supported band, determining a fourth 2R path and a fifth 2R path of each medium-high band in the third supported band, and storing an association relationship between the first 2R path and the fourth 2R path in the whitelist, and storing an association relationship between the first 2R path and the fifth 2R path, an association relationship between the second 2R path and the fourth 2R path, and an association relationship between the second 2R path and the fifth 2R path in the blacklist; or storing an association relationship between the first 2R path and the fifth 2R path in the whitelist, and storing an association relationship between the first 2R path and the fourth 2R path, an association relationship between the second 2R path and the fourth 2R path, and an association relationship between the second 2R path and the fifth 2R path in the blacklist.

With reference to the first aspect, in a possible implementation, the determining to communicate with the second base station through the secondary card by using the first 2R path when determining that the blacklist does not include an association relationship between the first identifier and the second identifier and the seventh identifier and the eighth identifier, and determining that the whitelist includes the association relationship between the first identifier and the second identifier and the seventh identifier and the eighth identifier, or when determining that the blacklist does not include an association relationship between the first identifier and the second identifier and the ninth identifier and the tenth identifier, and determining that the whitelist includes the association relationship between the first identifier and the second identifier and the ninth identifier and the tenth identifier specifically includes: when determining that the blacklist does not include the association relationship between the first identifier and the second identifier and the seventh identifier and the eighth identifier, and determining that the whitelist includes the association relationship between the first identifier and the second identifier and the seventh identifier and the eighth identifier, determining to communicate with the second base station through the secondary card by using the first 2R path, and determining to communicate with the first base station through the primary card by using the fourth 2R path; or when determining that the blacklist does not include the association relationship between the first identifier and the second identifier and the ninth identifier and the tenth identifier, and determining that the whitelist includes the association relationship between the first identifier and the second identifier and the ninth identifier and the tenth identifier, determining to communicate with the second base station through the secondary card by using the first 2R path, and determining to communicate with the first base station through the primary card by using the fifth 2R path.

It may be understood that, when it is determined that the blacklist does not include the association relationship between the first identifier and the second identifier and the seventh identifier and the eighth identifier, and it is determined that the whitelist includes the association relationship between the first identifier and the second identifier and the seventh identifier and the eighth identifier, it is determined to communicate with the second base station through the secondary card by using the first 2R path, and it is determined to communicate with the first base station through the primary card by using the fourth 2R path; or when it is determined that the blacklist does not include the association relationship between the first identifier and the second identifier and the ninth identifier and the tenth identifier, and it is determined that the whitelist includes the association relationship between the first identifier and the second identifier and the ninth identifier and the tenth identifier, it is determined to communicate with the second base station through the secondary card by using the first 2R path, and it is determined to communicate with the first base station through the primary card by using the fifth 2R path. This may also be understood as that when it is determined that the blacklist does not include the association relationship between the first identifier and the second identifier and the seventh identifier and the eighth identifier, the blacklist includes the association relationship between the third identifier and the fourth identifier and the ninth identifier and the tenth identifier, the association relationship between the third identifier and the fourth identifier and the seventh identifier and the eighth identifier, and the association relationship between the first identifier and the second identifier and the ninth identifier and the tenth identifier, and the whitelist includes the association relationship between the first identifier and the second identifier and the seventh identifier and the eighth identifier, it is determined to communicate with the second base station through the secondary card by using the first 2R path, and it is determined to communicate with the first base station through the primary card by using the fourth 2R path; or when it is determined that the blacklist does not include the association relationship between the first identifier and the second identifier and the ninth identifier and the tenth identifier, the blacklist includes the association relationship between the third identifier and the fourth identifier and the seventh identifier and the eighth identifier, the association relationship between the first identifier and the second identifier and the seventh identifier and the eighth identifier, and the association relationship between the third identifier and the fourth identifier and the ninth identifier and the tenth identifier, and the whitelist includes the association relationship between the first identifier and the second identifier and the ninth identifier and the tenth identifier, it is determined to communicate with the second base station through the secondary card by using the first 2R path, and it is determined to communicate with the first base station through the primary card by using the fifth 2R path.

With reference to the first aspect, in a possible implementation, the selection condition includes a whitelist, and the whitelist is pre-stored in the terminal; and the determining, based on the first identifier, the second identifier, the third identifier, the fourth identifier, the seventh identifier, the eighth identifier, the ninth identifier, the tenth identifier, and the selection condition stored in the terminal, to communicate with the second base station through the secondary card by using the first 2R path or the second 2R path specifically includes: when determining that the whitelist includes an association relationship between the third identifier and the fourth identifier and the seventh identifier and the eighth identifier, or determining that the whitelist includes an association relationship between the third identifier and the fourth identifier and the ninth identifier and the tenth identifier, determining to communicate with the second base station through the secondary card by using the second 2R path.

For example, generation of the whitelist in the terminal may include: determining a first 2R path and a second 2R path of each low band in the first supported band, determining a fourth 2R path and a fifth 2R path of each medium-high band in the third supported band, and storing an association relationship between the second 2R path and the fourth 2R path in the whitelist, or storing an association relationship between the second 2R path and the fifth 2R path in the whitelist.

For example, generation of the whitelist in the terminal may alternatively include: determining a first 2R path and a second 2R path of each medium-high band in the first supported band, determining a fourth 2R path and a fifth 2R path of each low band in the third supported band, and storing an association relationship between the second 2R path and the fourth 2R path in the whitelist, or storing an association relationship between the second 2R path and the fifth 2R path in the whitelist.

With reference to the first aspect, in a possible implementation, the determining to communicate with the second base station through the secondary card by using the second 2R path when determining that the whitelist includes an association relationship between the third identifier and the fourth identifier and the seventh identifier and the eighth identifier, or determining that the whitelist includes an association relationship between the third identifier and the fourth identifier and the ninth identifier and the tenth identifier specifically includes: when determining that the whitelist includes the association relationship between the third identifier and the fourth identifier and the seventh identifier and the eighth identifier, determining to communicate with the second base station through the secondary card by using the second 2R path, and determining to communicate with the first base station through the primary card by using the fourth 2R path; or when determining that the whitelist includes the association relationship between the third identifier and the fourth identifier and the ninth identifier and the tenth identifier, determining to communicate with the second base station through the secondary card by using the second 2R path, and determining to communicate with the first base station through the primary card by using the fifth 2R path.

It may be understood that the terminal may communicate with the first base station by using the fourth 2R path or the fifth 2R path through the primary card. In a case in which the whitelist stores the association relationship between the third identifier and the fourth identifier and the seventh identifier and the eighth identifier, the terminal communicates with the first base station by using the fourth 2R path through the primary card. In a case in which the whitelist stores the association relationship between the third identifier and the fourth identifier and the ninth identifier and the tenth identifier, the terminal communicates with the first base station by using the fifth 2R path.

With reference to the first aspect, in a possible implementation, the selection condition includes a blacklist, and the blacklist is pre-stored in the terminal; and the determining, based on the first identifier, the second identifier, the third identifier, the fourth identifier, the seventh identifier, the eighth identifier, the ninth identifier, the tenth identifier, and the selection condition stored in the terminal, to communicate with the second base station through the secondary card by using the first 2R path or the second 2R path specifically includes: when determining that the blacklist does not include an association relationship between the third identifier and the fourth identifier and the seventh identifier and the eighth identifier, or determining that the blacklist does not include an association relationship between the third identifier and the fourth identifier and the ninth identifier and the tenth identifier, determining to communicate with the second base station through the secondary card by using the second 2R path.

It may be understood that, when it is determined that the blacklist does not include the association relationship between the third identifier and the fourth identifier and the seventh identifier and the eighth identifier, or it is determined that the blacklist does not include the association relationship between the third identifier and the fourth identifier and the ninth identifier and the tenth identifier, it is determined to communicate with the second base station through the secondary card by using the second 2R path. This may also be understood as that when it is determined that the blacklist does not include the association relationship between the third identifier and the fourth identifier and the seventh identifier and the eighth identifier, and the blacklist includes the association relationship between the third identifier and the fourth identifier and the ninth identifier and the tenth identifier, the association relationship between the first identifier and the second identifier and the seventh identifier and the eighth identifier, and the association relationship between the first identifier and the second identifier and the ninth identifier and the tenth identifier, or when it is determined that the blacklist does not include the association relationship between the third identifier and the fourth identifier and the ninth identifier and the tenth identifier, and the blacklist includes the association relationship between the first identifier and the second identifier and the ninth identifier and the tenth identifier, the association relationship between the first identifier and the second identifier and the seventh identifier and the eighth identifier, and the association relationship between the third identifier and the fourth identifier and the seventh identifier and the eighth identifier, it is determined to communicate with the second base station through the secondary card by using the second 2R path.

For example, generation of the blacklist in the terminal may include: determining a first 2R path and a second 2R path of each low band in the first supported band, determining a fourth 2R path and a fifth 2R path of each medium-high band in the third supported band, and storing an association relationship between the first 2R path and the fourth 2R path, an association relationship between the first 2R path and the fifth 2R path, and an association relationship between the second 2R path and the fifth 2R path in the blacklist, or storing an association relationship between the first 2R path and the fourth 2R path, an association relationship between the first 2R path and the fifth 2R path, and an association relationship between the second 2R path and the fourth 2R path in the blacklist.

For example, generation of the blacklist in the terminal may alternatively include: determining a first 2R path and a second 2R path of each medium-high band in the first supported band, determining a fourth 2R path and a fifth 2R path of each low band in the third supported band, and storing an association relationship between the first 2R path and the fourth 2R path, an association relationship between the first 2R path and the fifth 2R path, and an association relationship between the second 2R path and the fifth 2R path in the blacklist, or storing an association relationship between the first 2R path and the fourth 2R path, an association relationship between the first 2R path and the fifth 2R path, and an association relationship between the second 2R path and the fourth 2R path in the blacklist.

With reference to the first aspect, in a possible implementation, the determining to communicate with the second base station through the secondary card by using the second 2R path when determining that the blacklist does not include an association relationship between the third identifier and the fourth identifier and the seventh identifier and the eighth identifier, or determining that the blacklist does not include an association relationship between the third identifier and the fourth identifier and the ninth identifier and the tenth identifier specifically includes: when determining that the blacklist does not include the association relationship between the third identifier and the fourth identifier and the seventh identifier and the eighth identifier, determining to communicate with the second base station through the secondary card by using the second 2R path, and determining to communicate with the first base station through the primary card by using the fourth 2R path; or when determining that the blacklist does not include the association relationship between the third identifier and the fourth identifier and the ninth identifier and the tenth identifier, determining to communicate with the second base station through the secondary card by using the second 2R path, and determining to communicate with the first base station through the primary card by using the fifth 2R path.

It may be understood that, the determining to communicate with the second base station through the secondary card by using the second 2R path when determining that the blacklist does not include an association relationship between the third identifier and the fourth identifier and the seventh identifier and the eighth identifier, or determining that the blacklist does not include an association relationship between the third identifier and the fourth identifier and the ninth identifier and the tenth identifier specifically includes: when determining that the blacklist does not include the association relationship between the third identifier and the fourth identifier and the seventh identifier and the eighth identifier, determining to communicate with the second base station through the secondary card by using the second 2R path, and determining to communicate with the first base station through the primary card by using the fourth 2R path; or when determining that the blacklist does not include the association relationship between the third identifier and the fourth identifier and the ninth identifier and the tenth identifier, determining to communicate with the second base station through the secondary card by using the second 2R path, and determining to communicate with the first base station through the primary card by using the fifth 2R path. This may also be understood as that the determining to communicate with the second base station through the secondary card by using the second 2R path when determining that the blacklist does not include an association relationship between the third identifier and the fourth identifier and the seventh identifier and the eighth identifier, or determining that the blacklist does not include an association relationship between the third identifier and the fourth identifier and the ninth identifier and the tenth identifier specifically includes: when determining that the blacklist does not include the association relationship between the third identifier and the fourth identifier and the seventh identifier and the eighth identifier, and the blacklist includes the association relationship between the third identifier and the fourth identifier and the ninth identifier and the tenth identifier, the association relationship between the first identifier and the second identifier and the seventh identifier and the eighth identifier, and the association relationship between the first identifier and the second identifier and the ninth identifier and the tenth identifier, determining to communicate with the second base station through the secondary card by using the second 2R path, and determining to communicate with the first base station through the primary card by using the fourth 2R path; or when determining that the blacklist does not include the association relationship between the third identifier and the fourth identifier and the ninth identifier and the tenth identifier, and the blacklist includes the association relationship between the first identifier and the second identifier and the ninth identifier and the tenth identifier, the association relationship between the first identifier and the second identifier and the seventh identifier and the eighth identifier, and the association relationship between the third identifier and the fourth identifier and the seventh identifier and the eighth identifier, determining to communicate with the second base station through the secondary card by using the second 2R path, and determining to communicate with the first base station through the primary card by using the fifth 2R path.

With reference to the first aspect, in a possible implementation, the selection condition includes a blacklist and a whitelist, and the blacklist and the whitelist are pre-stored in the terminal; and the determining, based on the first identifier, the second identifier, the third identifier, the fourth identifier, the seventh identifier, the eighth identifier, the ninth identifier, the tenth identifier, and the selection condition stored in the terminal, to communicate with the second base station through the secondary card by using the first 2R path or the second 2R path specifically includes: when determining that the whitelist includes an association relationship between the third identifier and the fourth identifier and the seventh identifier and the eighth identifier, and determining that the blacklist does not include the association relationship between the third identifier and the fourth identifier and the seventh identifier and the eighth identifier, or when determining that the whitelist includes an association relationship between the third identifier and the fourth identifier and the ninth identifier and the tenth identifier, and determining that the blacklist does not include the association relationship between the third identifier and the fourth identifier and the ninth identifier and the tenth identifier, determining to communicate with the second base station through the secondary card by using the second 2R path.

It may be understood that, when it is determined that the whitelist includes an association relationship between the third identifier and the fourth identifier and the seventh identifier and the eighth identifier, and it is determined that the blacklist does not include the association relationship between the third identifier and the fourth identifier and the seventh identifier and the eighth identifier, or when it is determined that the whitelist includes an association relationship between the third identifier and the fourth identifier and the ninth identifier and the tenth identifier, and it is determined that the blacklist does not include the association relationship between the third identifier and the fourth identifier and the ninth identifier and the tenth identifier, it is determined to communicate with the second base station through the secondary card by using the second 2R path. This may also be understood as that when it is determined that the whitelist includes the association relationship between the third identifier and the fourth identifier and the seventh identifier and the eighth identifier, the blacklist does not include the association relationship between the third identifier and the fourth identifier and the seventh identifier and the eighth identifier, and the blacklist includes the association relationship between the third identifier and the fourth identifier and the ninth identifier and the tenth identifier, the association relationship between the first identifier and the second identifier and the seventh identifier and the eighth identifier, and the association relationship between the first identifier and the second identifier and the ninth identifier and the tenth identifier, or when it is determined that the whitelist includes the association relationship between the third identifier and the fourth identifier and the ninth identifier and the tenth identifier, the blacklist does not include the association relationship between the third identifier and the fourth identifier and the ninth identifier and the tenth identifier, and the blacklist includes the association relationship between the first identifier and the second identifier and the ninth identifier and the tenth identifier, the association relationship between the first identifier and the second identifier and the seventh identifier and the eighth identifier, and the association relationship between the third identifier and the fourth identifier and the seventh identifier and the eighth identifier, it is determined to communicate with the second base station through the secondary card by using the second 2R path.

For example, generation of the blacklist and the whitelist in the terminal may include: determining a first 2R path and a second 2R path of each low band in the first supported band, and determining a fourth 2R path and a fifth 2R path of each medium-high band in the third supported band; and storing an association relationship between the second 2R path and the fourth 2R path in the whitelist, and storing an association relationship between the first 2R path and the fourth 2R path, an association relationship between the first 2R path and the fifth 2R path, and an association relationship between the second 2R path and the fifth 2R path in the blacklist; or storing an association relationship between the second 2R path and the fifth 2R path in the whitelist, and storing an association relationship between the first 2R path and the fourth 2R path, an association relationship between the first 2R path and the fifth 2R path, and an association relationship between the second 2R path and the fourth 2R path in the blacklist.

For example, generation of the blacklist and the whitelist in the terminal may alternatively include: determining a first 2R path and a second 2R path of each medium-high band in the first supported band, and determining a fourth 2R path and a fifth 2R path of each low band in the third supported band; and storing an association relationship between the second 2R path and the fourth 2R path in the whitelist, and storing an association relationship between the first 2R path and the fourth 2R path, an association relationship between the first 2R path and the fifth 2R path, and an association relationship between the second 2R path and the fifth 2R path in the blacklist; or storing an association relationship between the second 2R path and the fifth 2R path in the whitelist, and storing an association relationship between the first 2R path and the fourth 2R path, an association relationship between the first 2R path and the fifth 2R path, and an association relationship between the second 2R path and the fourth 2R path in the blacklist.

With reference to the first aspect, in a possible implementation, the determining to communicate with the second base station through the secondary card by using the second 2R path when determining that the whitelist includes an association relationship between the third identifier and the fourth identifier and the seventh identifier and the eighth identifier, and determining that the blacklist does not include the association relationship between the third identifier and the fourth identifier and the seventh identifier and the eighth identifier, or when determining that the whitelist includes an association relationship between the third identifier and the fourth identifier and the ninth identifier and the tenth identifier, and determining that the blacklist does not include the association relationship between the third identifier and the fourth identifier and the ninth identifier and the tenth identifier specifically includes: when determining that the whitelist includes the association relationship between the third identifier and the fourth identifier and the seventh identifier and the eighth identifier, and determining that the blacklist does not include the association relationship between the third identifier and the fourth identifier and the seventh identifier and the eighth identifier, determining to communicate with the second base station through the secondary card by using the second 2R path, and determining to communicate with the first base station through the primary card by using the fourth 2R path; or when determining that the whitelist includes the association relationship between the third identifier and the fourth identifier and the ninth identifier and the tenth identifier, and determining that the blacklist does not include the association relationship between the third identifier and the fourth identifier and the ninth identifier and the tenth identifier, determining to communicate with the second base station through the secondary card by using the second 2R path, and determining to communicate with the first base station through the primary card by using the fifth 2R path.

According to a second aspect, an embodiment of this application provides an electronic device. The electronic device includes one or more processors and a memory. The memory is coupled to the one or more processors. The memory is configured to store computer program code. The computer program code includes computer instructions. The one or more processors invoke the computer instructions to enable the electronic device to perform the method in any one of the first aspect or the possible implementations of the first aspect.

According to a third aspect, an embodiment of this application provides a chip system. The chip system is applied to an electronic device, the chip system includes one or more processors, and the processor is configured to invoke computer instructions, so that the electronic device performs the method according to any one of the first aspect or the possible implementations of the first aspect.

According to a fourth aspect, an embodiment of this application provides a computer program product including instructions. When the computer program product runs on an electronic device, the electronic device is enabled to perform the method according to any one of the first aspect or the possible implementations of the first aspect.

According to a fifth aspect, an embodiment of this application provides a computer-readable storage medium, including instructions. When the instructions are run on an electronic device, the electronic device is enabled to perform the method according to any one of the first aspect or the possible implementations of the first aspect.

It may be understood that the electronic device provided in the second aspect, the chip system provided in the third aspect, the computer program product provided in the fourth aspect, and the computer storage medium provided in the fifth aspect are all used to perform the method according to any one of the first aspect or the implementations of the first aspect in embodiments of this application. Therefore, for beneficial effects that can be achieved, refer to the beneficial effects in the corresponding method. Details are not described herein again.

DETAILED DESCRIPTION OF ILLUSTRATIVE EMBODIMENTS

To make the objectives, technical solutions, and advantages of this application clearer, the following further describes this application with reference to the accompanying drawings.

The terms "first", "second", and the like in the specification, claims, and accompanying drawings of this application are used to distinguish between different objects, but are not used to describe a specific sequence. In addition, the terms "include" and "have" and any variations thereof are intended to cover non-exclusive inclusion. For example, a process, method, system, product, or device that includes a series of steps or units is not limited to the listed steps or units, but optionally further includes an unlisted step or unit, or optionally further includes another inherent step or unit for the process, method, product, or device.

The "embodiment" mentioned herein means that specific features, structures, or characteristics described with reference to the embodiments may be included in at least one embodiment of this application. Appearance of the phrase at various locations in the specification does not necessarily refer to a same embodiment, or an independent or alternative embodiment mutually exclusive with another embodiment. A person skilled in the art may explicitly and implicitly understand that the embodiments described in this specification may be combined with other embodiments.

In this application, "at least one (piece)" refers to one or more, "a plurality of" refers to two or more, "at least two (pieces)" refers to two, three, or more, and "and/or" is used to describe an association relationship of associated objects, and indicates that three relationships may exist. For example, "A and/or B" may indicate the following three cases: Only A exists, only B exists, and both A and B exist, where A and B may be singular or plural. The character "/" usually indicates an "or" relationship between the associated objects. "At least one of the following items (pieces)" or a similar expression thereof means any combination of these items. For example, at least one of a, b, or c may represent a, b, c, "a and b", "a and c", "b and c", or "a, b, and c".

In embodiments of this application, a terminal may be an electronic device that has a cellular mobile communications network function, such as a mobile terminal, a tablet computer, a desktop computer, a laptop computer, a handheld computer, a notebook computer, and an ultra-mobile personal computer (ultra-mobile personal computer, UMPC).

Figure 1:
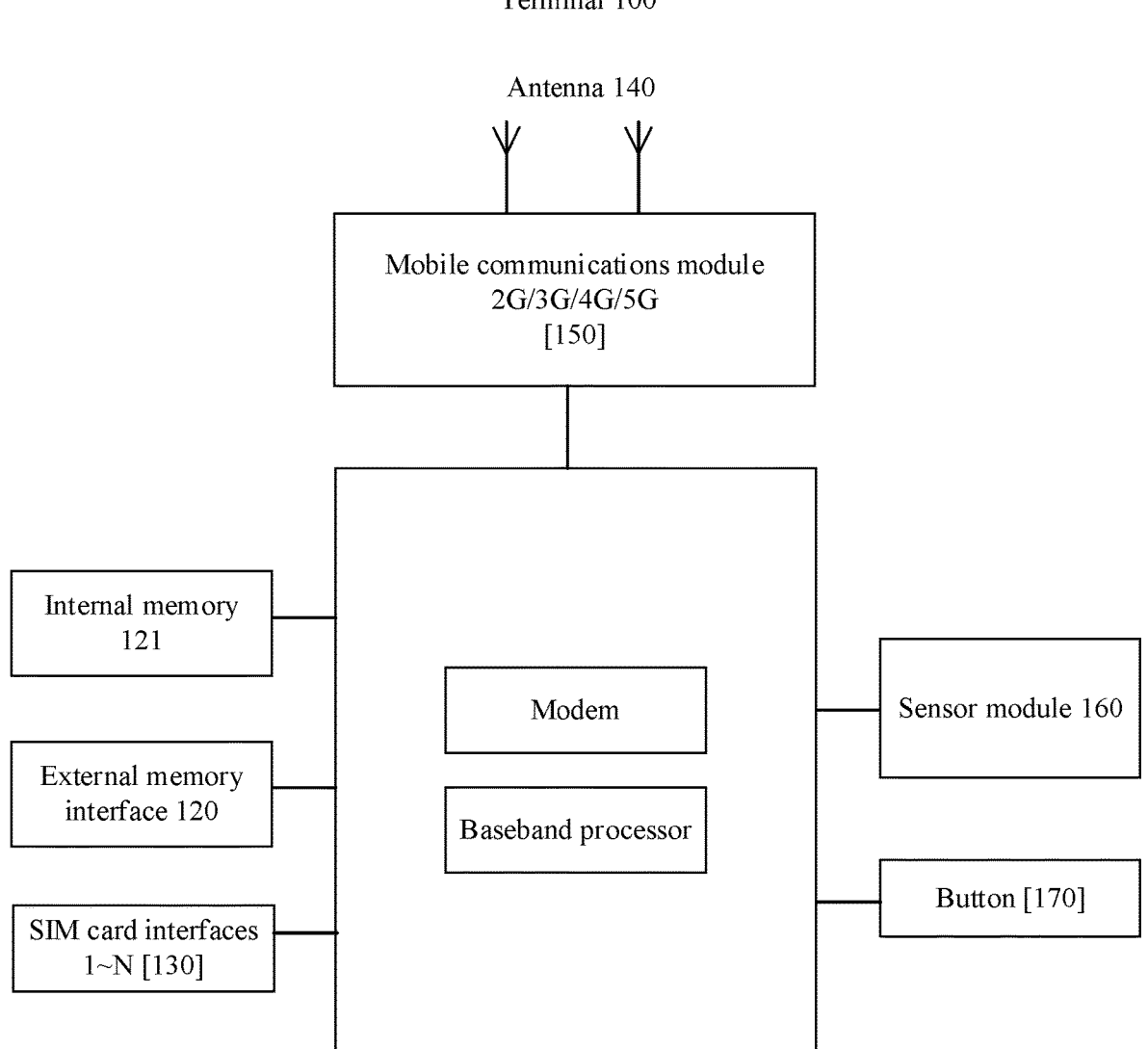
FIG. 1 is a schematic diagram of a structure of a terminal 100 according to an embodiment of this application.

First, a terminal 100 shown in FIG. 1 is used as an example to describe a hardware structure of the terminal. It should be understood that the terminal 100 may have more or fewer components than those shown in FIG. 1, may combine two or more components, or may have different component configurations. The components shown in FIG. 1 may be implemented in hardware including one or more signal processing and/or application-specific integrated circuits, software, or a combination of hardware and software.

As shown in FIG. 1, the terminal 100 may include a processor 110, an external memory interface 120, an internal memory 121, a subscriber identification module (subscriber identification module, SIM) card interface 130, an antenna 140, a mobile communications module 150, a sensor module 160, a button 170, and the like. The sensor module 160 may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

It may be understood that the structure shown in this embodiment of the present invention does not constitute a specific limitation on the terminal 100. In some other embodiments of this application, the terminal 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

A memory may be disposed in the processor 110, to store instructions and data. In some embodiments, the memory in the processor 110 is a cache. The memory may store instructions or data just used or cyclically used by the processor 110. If the processor 110 needs to use the instructions or data again, the instructions or data may be directly invoked from the memory. This avoids repeated access, and reduces waiting time of the processor 110, so that system efficiency is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The internal memory 121 may be configured to store computer executable program code, where the executable program code includes instructions. The processor 110 performs various function applications and data processing of the terminal 100 by running the instructions stored in the internal memory 121. The internal memory 121 may include a program storage area and a data storage area. The program storage area may store an operating system, an application program required by at least one function (for example, a sound play function or an image play function), and the like. The data storage area may store data (such as audio data or a phone book) created in a use process of the terminal 100. In addition, the internal memory 121 may include a high-speed random access memory, and may further include a non-volatile memory, such as at least one magnetic disk storage component, a flash memory component, and a universal flash storage (universal flash storage, UFS).

In this embodiment of this application, the terminal may statically store an association relationship between band information included in a primary path and a diversity path and corresponding impedance value information into the internal memory 121. The terminal may also store blacklist and whitelist information in the internal memory 121. For descriptions of the primary path, the diversity path, the blacklist, and the whitelist, refer to related descriptions in other embodiments of this application. Details are not described herein again.

The antenna 140 is configured to transmit and receive electromagnetic wave signals. Each antenna in the terminal 100 may be configured to cover one or more communication bands. Different antennas may be multiplexed to improve antenna utilization. In some other embodiments, the antenna may be used in combination with a tuning switch. A mobile communication function of the terminal 100 may be implemented by using the antenna 140, the mobile communications module 150, the modem processor, the baseband processor, and the like.

In embodiments of this application, the primary antenna (including an LB primary antenna and an MHB primary antenna) and the diversity antenna (including an LB diversity antenna and an MHB diversity antenna) are included in the antenna 140.

The mobile communications module 150 may provide a solution that is applied to the terminal 100 and includes wireless communication such as a 2nd generation mobile communication technology (2nd-Generation wireless telephone technology, 2G), a 3rd generation mobile communication technology (3rd-Generation, 3G), a 4th generation mobile communication technology (the 4th generation mobile communication technology, 4G), and a 5th generation mobile communication technology (5th-Generation Mobile Communication Technology, 5G). The mobile communications module 150 may include at least one filter, a switch, a power amplifier, a low noise amplifier (low noise amplifier, LNA), and the like. The mobile communications module 150 may receive an electromagnetic wave by using the antenna 140, perform processing such as filtering and amplification on the received electromagnetic wave, and send a processed electromagnetic wave to the modem processor for demodulation. The mobile communications module 150 may further amplify a signal modulated by the modem processor, and convert the signal into an electromagnetic wave for radiation through the antenna 140. In some embodiments, some function modules of the mobile communications module 150 may be disposed in the processor 110. In some embodiments, some function modules of the mobile communications module 150 may be disposed in a same component as some modules of the processor 110.

The modem processor may include a modulator and a demodulator. The modulator is configured to adjust a to-be-sent low-frequency baseband signal to a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (which is not limited to the speaker, the receiver, or the like), or displays an image or a video by using the display. In some embodiments, the modem processor may be an independent device. In some other embodiments, the modem processor may be independent of the processor 110 and disposed in a same device as the mobile communications module 150 or another function modules.

In embodiments of this application, the terminal may determine, by using the antenna 140 and the mobile communications module 150, a band on which a primary-secondary card needs to receive or send data, to determine a path used by the primary-secondary card. For description of the path and the band, refer to related details in other embodiments of this application. Details are not described herein again.

The external memory interface 120 may be configured to connect to an external memory card, such as a micro SD card, to extend a storage capability of the terminal 100. The external memory card communicates with the processor 110 by using the external memory interface 120, to implement a data storage function. For example, files such as music or videos are stored in the external memory card.

The internal memory 121 may be configured to store computer executable program code, where the executable program code includes instructions. The processor 110 perform various function applications and data processing of the terminal 100 by running the instructions stored in the internal memory 121. The internal memory 121 may include a program storage area and a data storage area. The storage program area may store an operating system, an application required by at least one function (such as a face recognition function, a fingerprint recognition function, and a mobile payment function), and the like. The storage data area may store data (such as face information template data and a fingerprint information template) created in a use process of the terminal 100. In addition, the internal memory 121 may include a high-speed random access memory, and may further include a non-volatile memory, such as at least one magnetic disk storage component, a flash memory component, and a universal flash storage (universal flash storage, UFS).

For ease of description, in this specification, that a terminal uses an MHB primary-diversity antenna through a primary card and uses an LB primary-diversity antenna through a secondary card is briefly referred to as primary card MHB+secondary card LB; that a terminal uses an LB primary-diversity antenna through a primary card and uses an MHB primary-diversity antenna through a secondary card is briefly referred to as primary card LB+secondary card MHB; that a terminal uses an LB primary-diversity antenna through a primary card and uses an LB primary-diversity antenna through a secondary card is briefly referred to as primary card LB+secondary card LB; and that a terminal uses an MHB primary-diversity antenna through a primary card and uses an MHB primary-diversity antenna through a secondary card is briefly referred to as primary card MHB+secondary card MHB.

In embodiments of this application, the terminal 100 may determine, by using the mobile communications module 150 and the processor 110, whether the terminal uses a first 2R path (a primary receive path in a primary path and a diversity receive path in a diversity path are collectively referred to as a 2R path, and this may be understood as that an identifier of a primary receive path in a primary path and an identifier of a diversity receive path in a diversity path are collectively referred to as a 2R path) or a second 2R path to receive data through a secondary card. For example, the terminal 100 may determine, by using the mobile communications module 150, whether the current primary-secondary card of the terminal is a scenario of primary card MHB+secondary card LB or primary card MHB+secondary card LB; and if yes, the processor determines, according to the scenario, that the terminal uses the second 2R path by using the secondary card; or if no (the current primary-secondary card is a scenario of primary card MHB+secondary card MHB or primary card LB+secondary card LB), the processor determines, according to the scenario, that a second communications chip uses the first 2R path. For descriptions of the first 2R path, the second 2R path, primary card MHB+ secondary card MHB, and the like, refer to another embodiment of this application. Details are not described herein again.

In some embodiments of this application, steps in the methods may be separately completed by an application processor in the processor 110, may be separately completed by the mobile communications module 150, the modem, or the baseband processor, or may be jointly completed by the processor 110, the mobile communications module 150, the baseband processor, and the baseband processor. This is not limited herein.

The following briefly describes a working principle of dual-card dual-standby dual-pass of a terminal.

In embodiments of this application, two or more SIM card slots are disposed in the terminal. For ease of description, the following uses an example in which two SIM card slots are disposed in the terminal. In addition, the terminal is separately installed with SIM cards in the two SIM card slots, which are referred to as a primary card and a secondary card herein.

In the terminal, communications chips are corresponding to the primary card and the secondary card, and the communications chip may be a modem. In embodiments of this application, a communications chip used by the primary card may be referred to as a first communications chip, and a communications chip used by the secondary card may be referred to as a second communications chip. In addition, the terminal specifies a radio frequency path for the primary card and the secondary card, and the terminal may use, through the communications chip corresponding to the SIM card and the specified radio frequency path, an antenna to perform a signal sending and receiving service of the SIM card (for ease of description, receiving, sending, or receiving and sending of signals are collectively referred to as signal receiving and sending). That is, the first communications chip and the second communications chip of the terminal may send and receive signals by using a same set of antennas, so that the terminal can implement dual-card dual-standby dual-pass.

Figure 2:
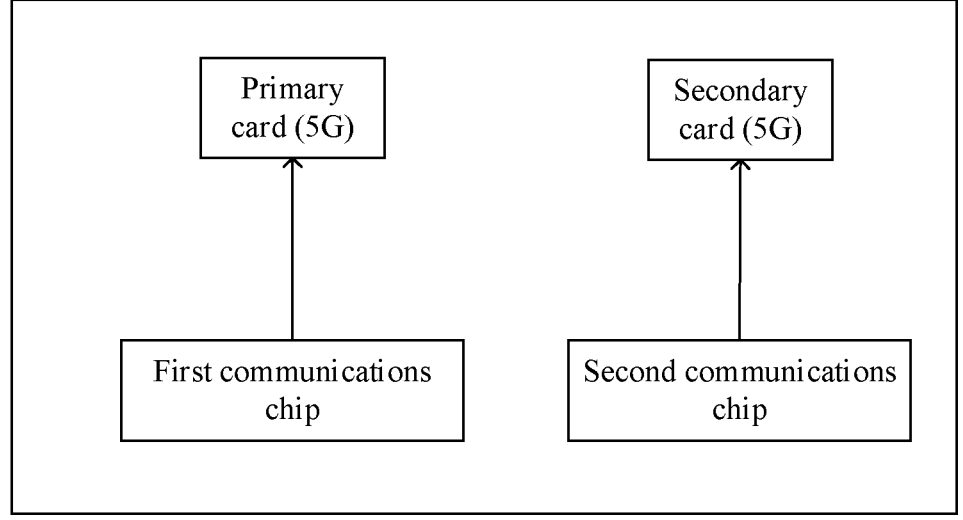
FIG. 2 is a schematic diagram in which a second communications chip and a first communications chip use different modems in a case of primary card 5G+secondary card 5G according to an embodiment of this application.
Figure 3:
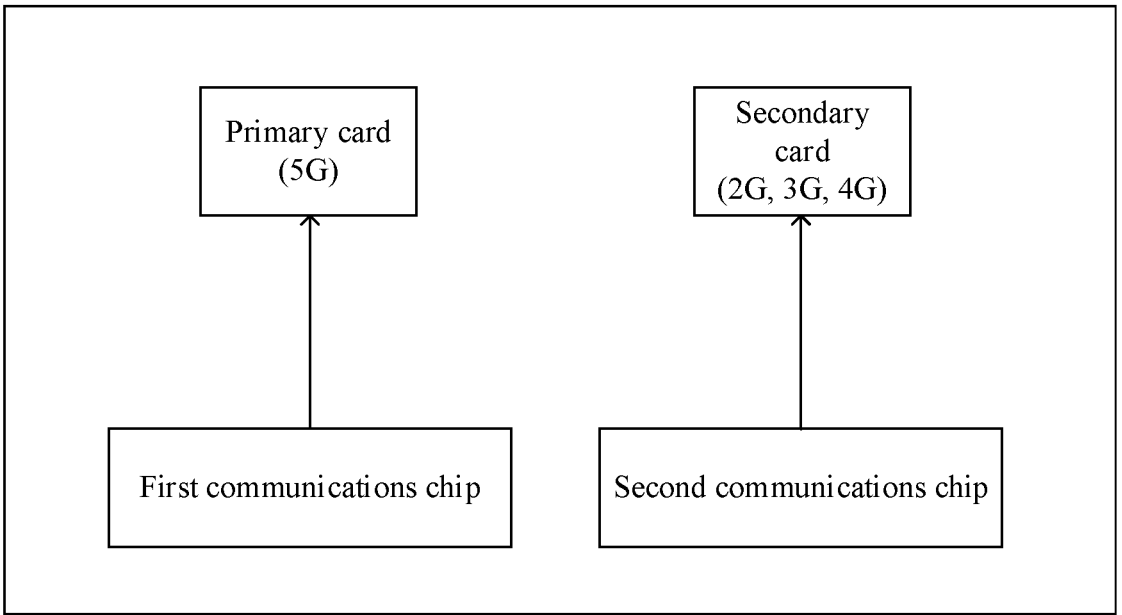
FIG. 3 is a schematic diagram in which a second communications chip and a first communications chip use different modems in a case of primary card 5G+secondary card 2G, 3G, or 4G according to an embodiment of this application.

For example, as shown in FIG. 2, in a case in which two cards of the terminal both use a 5G mobile communications network, or as shown in FIG. 3, in a case in which one of two cards uses a 5G network (for example, the primary card uses 5G), and the other card uses a 2G, 3G, or 4G network (for example, the secondary card uses the 2G, 3G, or 4G network), the primary card separately uses the first communications chip and the secondary card separately uses the second communications chip, and the two cards can implement dual-card dual-standby dual-pass. When the communications networks used by the two cards of the terminal are a combination of any two of 2G, 3G, and 4G mobile communication networks, the two cards of the terminal cannot implement dual-card dual-standby dual-pass. It may be understood that if a 2G, 3G, or 4G mobile communications network exclusively uses different communications chips, when the communications networks used by the two cards of the terminal are a combination of any two of 2G, 3G, and 4G mobile communication networks, the terminal can also implement dual-card dual-standby dual-pass. This is not limited in embodiments of this application.

It may be understood that the second communications chip and the first communications chip may be a same communications chip. For example, the communications chip (the second communications chip or the first communications chip) includes a first modem that supports a 5G network and a second modem that supports a 2G, 3G, or 4G network.

For ease of understanding, the following first describes related terms and related concepts in embodiments of this application.

(1) Primary Card and Secondary Card

In embodiments of this application, if the terminal performs a mobile data service by using a target card, the target card is a primary card. For example, there are the following two manners for distinguishing between a primary card and a secondary card in the terminal. (1) According to different rules of the manufacturers, the terminal may specify one card as the primary card by default. For example, the terminal may specify a card in a card slot whose physical card slot number is 0 as the primary card, and specify a card in a card slot whose physical card slot number is 2 as the secondary card. It may be understood that descriptions of the physical card slot 0, the physical card slot 2, and that the card in the card slot whose physical card slot number is 0 is the primary card are merely an example. In embodiments of this application, the number of the physical card slot and a specific physical card slot in which a card is specified by the terminal as the primary card or the secondary card are not limited. (2) The terminal determines a target card as the primary card by receiving a user operation. For example, when the user operation received by the terminal is to use a mobile data service by using the target card, the target card is the primary card.

In embodiments of this application, the terminal may send a signal and/or receive a signal by using the primary card and the secondary card.

In embodiments of this application, the primary card and the secondary card each may be a SIM card that includes a telephone service and a mobile data traffic service, or the primary card and the secondary card each may be a traffic card that does not include a telephone service but includes only a mobile data traffic service. This is not limited in embodiments of this application.

It may be understood that the primary card and the secondary card described in embodiments of this application each may be a physical card, or may be a digital card. That is, the primary card and the secondary card each may be a SIM card, or may be an embedded SIM card (Embedded-SIM, eSIM card). This is not limited in embodiments of this application.

(2) Primary Antenna and Diversity Antenna

In embodiments of this application, the terminal may communicate with a base station by using a same set of antennas through communications chips corresponding to the primary card and the secondary card, and a specified radio frequency circuit. It may be understood that antennas include a primary antenna and a diversity antenna. Usually, the terminal receives and sends signals by using the primary antenna and receives signals by using the diversity antenna. In some special cases, for example, when a decrease in signal strength of the primary antenna is greater than 3 dB (it may be understood that 3 dB is only an example, and may be another suitable value, which is not limited in embodiments of this application), or signal strength of the primary antenna is less than signal strength of the diversity antenna, the terminal may receive and send signals by using the diversity antenna and receive signals by using the primary antenna.

In embodiments of this application, according to band ranges, the primary antenna includes a low band (LB) primary antenna and a medium-high band (MHB) primary antenna, and the diversity antenna includes a low band (LB) diversity antenna and a medium-high band (MHB) diversity antenna. That is, the terminal has two sets of primary-diversity antennas: LB primary-diversity antenna (an LB primary antenna and an LB diversity antenna are collectively referred to as an LB primary-diversity antenna) and MHB primary-diversity antenna (an MHB primary antenna and an MHB diversity antenna are collectively referred to as an MHB primary-diversity antenna).

Figure 4:
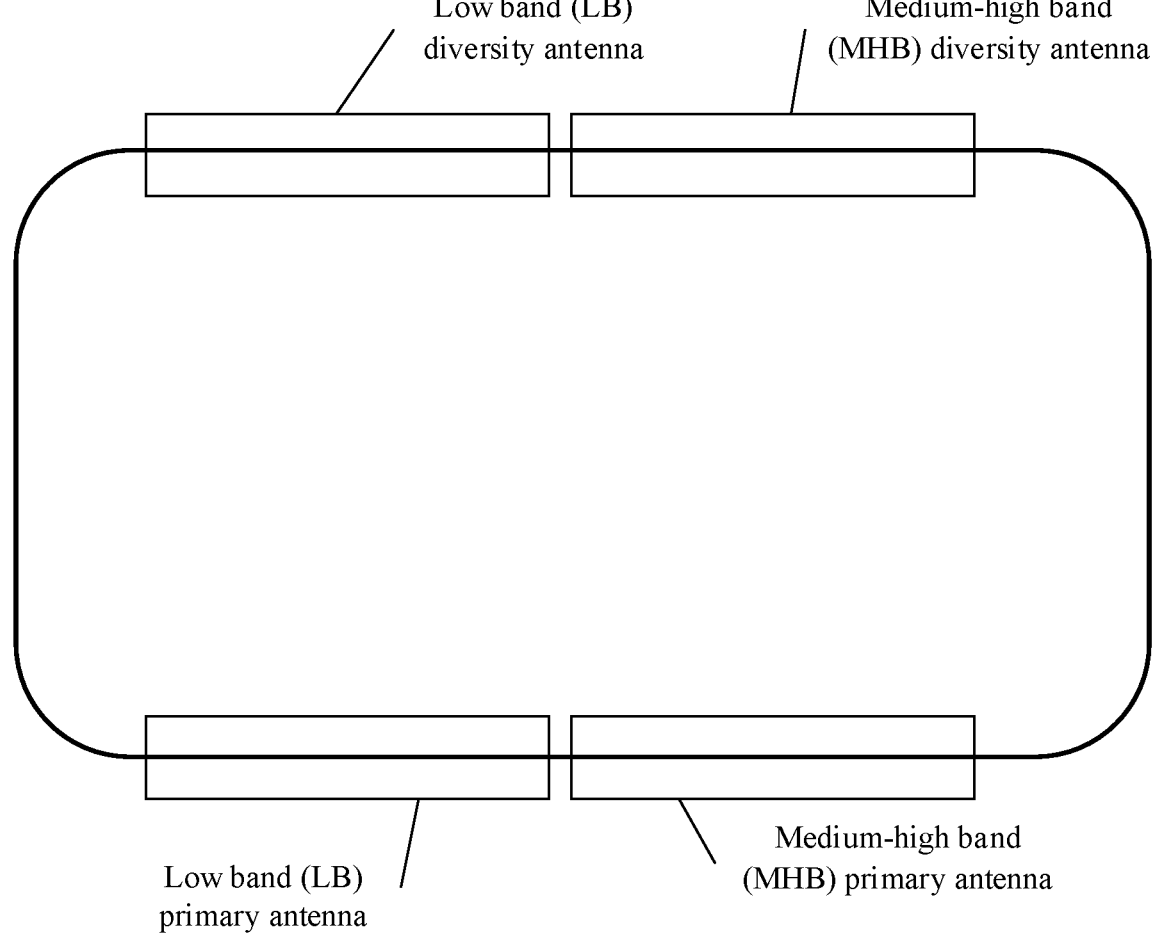
FIG. 4 is a schematic diagram of locations of primary antennas and diversity antennas in a terminal according to an embodiment of this application.

For example, locations of the LB primary antenna, the MHB primary antenna, the LB diversity antenna, and the MHB diversity antenna in the terminal are shown in FIG. 4. The LB primary antenna and the MHB primary antenna are at the bottom of the terminal, and the LB diversity antenna and the MHB diversity antenna are at the top of the terminal. It may be understood that, in actual hardware application, circuits of the LB primary antenna and the MHB primary antenna in FIG. 1 may be relatively close to each other, and therefore a circuit coupling relationship is formed between the LB primary antenna and the MHB primary antenna, causing mutual interference between a radiation signal during operation of the LB primary antenna and a radiation signal during operation of the MHB primary antenna. That is, the LB primary antenna is coupled to the MHB primary antenna. When antenna status configuration information of the LB primary antenna is modified, antenna status configuration information of the MHB primary antenna is also modified (or when antenna status configuration information of the MHB primary antenna is modified, antenna status configuration information of the LB primary antenna is also modified). Therefore, a related constraint mechanism is usually set on the terminal, for example, a constraint mechanism in which the terminal cannot use the LB primary antenna and the MHB primary antenna together to communicate with a base station through the primary card and the secondary card.

Generally, the primary antenna is used to make a performance indicator such as signal strength of a mobile communications network of a terminal meet a preset standard of a project. Good performance of the primary antenna is one of objectives of the project design. For example, there is a larger clearance area at the bottom of the terminal, space is larger, and an antenna radiation effect is better. The primary antenna may be placed at the bottom of the terminal to improve performance of the primary antenna. That is, in general, performance of the primary antenna is better than performance of the diversity antenna. However, there are also some special cases. For example, when the user makes a call and the primary antenna is held, or the primary antenna is shielded for another reason, a radiation effect of the primary antenna decreases. For example, when the terminal detects that a decrease in the signal strength of the primary antenna is greater than 3 dB or the signal strength of the primary antenna is less than the signal strength of the diversity antenna, the terminal switches to the diversity antenna to receive and send signals. This may be understood as using the diversity antenna as the primary antenna.

It may be understood that, in FIG. 1, the locations of the LB primary-diversity antenna and the MHB primary-diversity antenna in the terminal are merely an example, and the LB primary-diversity antenna and the MHB primary-diversity antenna may alternatively be in other proper locations in the terminal. This is not limited in embodiments of this application.

(3) Low Band (Low Band, LB) and Medium-High Band (Medium-High Band, MHB)

In embodiments of this application, the LB or the MHB covers a 5G NR (New Radio) band (for example, band N1 or N2) and a 2G, 3G, or 4G long term evolution (Long Term Evolution, LTE) band (for example, band B5 or B12). For example, a band whose band range is less than 1 GHz (gigahertz) is a low band, and a band whose band range is greater than or equal to 1 GHz and less than 3 GHz is a medium-high band. LB mainly includes bands such as B5, B8, B12, B17, B19, B26, B28, N5, N8, N20, N28, and N71. MHB mainly includes bands such as N1, N2, N3, N7, N70, B1, and B2. For example, bands and band ranges mainly included in LB and MHB are shown in the following Table 1 and Table 2. It may be understood that the uplink band shown in Table 1 and Table 2 is a channel band on which a terminal sends a signal to a base station, and the downlink band is a channel band on which a terminal receives a signal sent by a base station.

TABLE 1

| NR band number | Uplink band (base station receiving/ terminal sending) | Downlink band (base station sending/ terminal receiving) |
| --- | --- | --- |
| N1 (MHB) | 1920 MHz~1980 MHz (megahertz) | 2110 MHz~2170 MHz |
| N2 (MHB) | 1850 MHz~1910 MHz | 1930 MHz~1990 MHz |
| N3 (MHB) | 1710 MHz~1785 MHz | 1850 MHz~1880 MHz |
| N5 (LB) | 824 MHz~849 MHz | 869 MHz~894 MHz |
| N7 (MHB) | 2500 MHz~2570 MHz | 2620 MHz~2690 MHz |
| N8 (LB) | 880 MHz~915 MHz | 925 MHz~960 MHz |
| N20 (LB) | 832 MHz~862 MHz | 791 MHz~821 MHz |
| N28 (LB) | 703 MHz~748 MHz | 758 MHz~803 MHz |
| N70 (MHB) | 1695 MHz~1710 MHz | 1995 MHz~2020 MHz |
| N71 (LB) | 663 MHz~698 MHz | 617 MHz~652 MHz |
| . . . | . . . | . . . |

TABLE 2

| LTE band number | Uplink band (base station receiving/ terminal sending) | Downlink band (base station sending/ terminal receiving) |
| --- | --- | --- |
| B1 (MHB) | 1920 MHz~1980 MHz | 2110 MHz~2170 MHz |
| B2 (MHB) | 1850 MHz~1910 MHz | 1930 MHz~1990 MHz |
| B5 (LB) | 824 MHz~849 MHz | 869 MHz~894 MHz |
| B12 (LB) | 699 MHz~716 MHz | 729 MHz~746 MHz |
| B17 (LB) | 704 MHz~716 MHz | 734 MHz~746 MHz |
| B19 (LB) | 830 MHz~845 MHz | 875 MHz~890 MHz |
| B26 (LB) | 814 MHz~849 MHz | 859 MHz~894 MHz |
| B28 (LB) | 703 MHz~748 MHz | 758 MHz~803 MHz |
| . . . | . . . | . . . |

It may be understood that a value of a band range of a specific band is only an example, and may alternatively be another suitable value. This is subject to a specific communication standard and a project requirement. This is not limited in embodiments of this application. The LB or the MHB may include more or fewer bands, depending on a specific communication standard and a project requirement. This embodiment of this application is merely an example, and is not limited thereto.

It may be understood that, for an LTE band and an NR band whose code in the LTE band number and code in the NR band number are consistent, band ranges of the bands are consistent. For example, if band number codes of both N1 and B1 are "1", band ranges of N1 and B1 are consistent. For example, if band number codes of both N2 and B2 are "2", band ranges of N2 and B2 are consistent. In this specification, a meaning of two bands whose code in the LTE band number and code in the NR band number are consistent is consistent with the meaning herein.

It may be understood that a signal is an analog signal having an electromagnetic wavelength of a specific band, which is used to carry the signal, so that the signal can be transmitted in the air. A band on which a terminal receives and sends signals is determined by a base station that communicates with the terminal. For example, when the terminal establishes a connection to the base station in a network search program at a protocol layer, the base station determines a communication band and sends the communication band to the terminal, so that a signal is transmitted between the base station and the terminal in the communication band. It may be understood that when the terminal transmits and receives signals by using a low band (for example, B5), an LB primary-diversity antenna is used. When the terminal transmits and receives signals by using a medium-high band (for example, N1), an MHB primary-diversity antenna is used.

For example, a primary card in the terminal uses a 5G cellular mobile communications network, and a secondary card uses a 4G mobile communications network. After the terminal establishes communication with a first base station by using the primary card and establishes communication with a second base station by using the secondary card, the second base station may configure a communication band (for example, a second band) for the secondary card in the terminal, so that the terminal may communicate with the second base station in the second band by using the secondary card. The first base station may configure a communication band (for example, a first band) for the primary card in the terminal, so that the terminal may communicate with the first base station in the first band by using the secondary card. For example, a communication band that is received by the terminal and that is configured by the first base station for the primary card in the terminal is N1, and a communication band that is received by the terminal and that is configured by the second base station for the secondary card in the terminal is B5. Subsequently, as long as the base station that establishes a communication connection to the terminal does not change or the communication band configured by the base station for the primary card or the secondary card in the terminal does not change, the primary card in the terminal may perform a signal receiving and sending service of the primary card through a first communications chip in the band N1 by using the MHB primary-diversity antenna in the terminal, and the secondary card in the terminal may perform a signal receiving and sending service of the secondary card through a second communications chip in the band B5 by using the LB primary-diversity antenna in the terminal.

(4) Radio Frequency Circuit and Antenna Circuit

Figure 5:
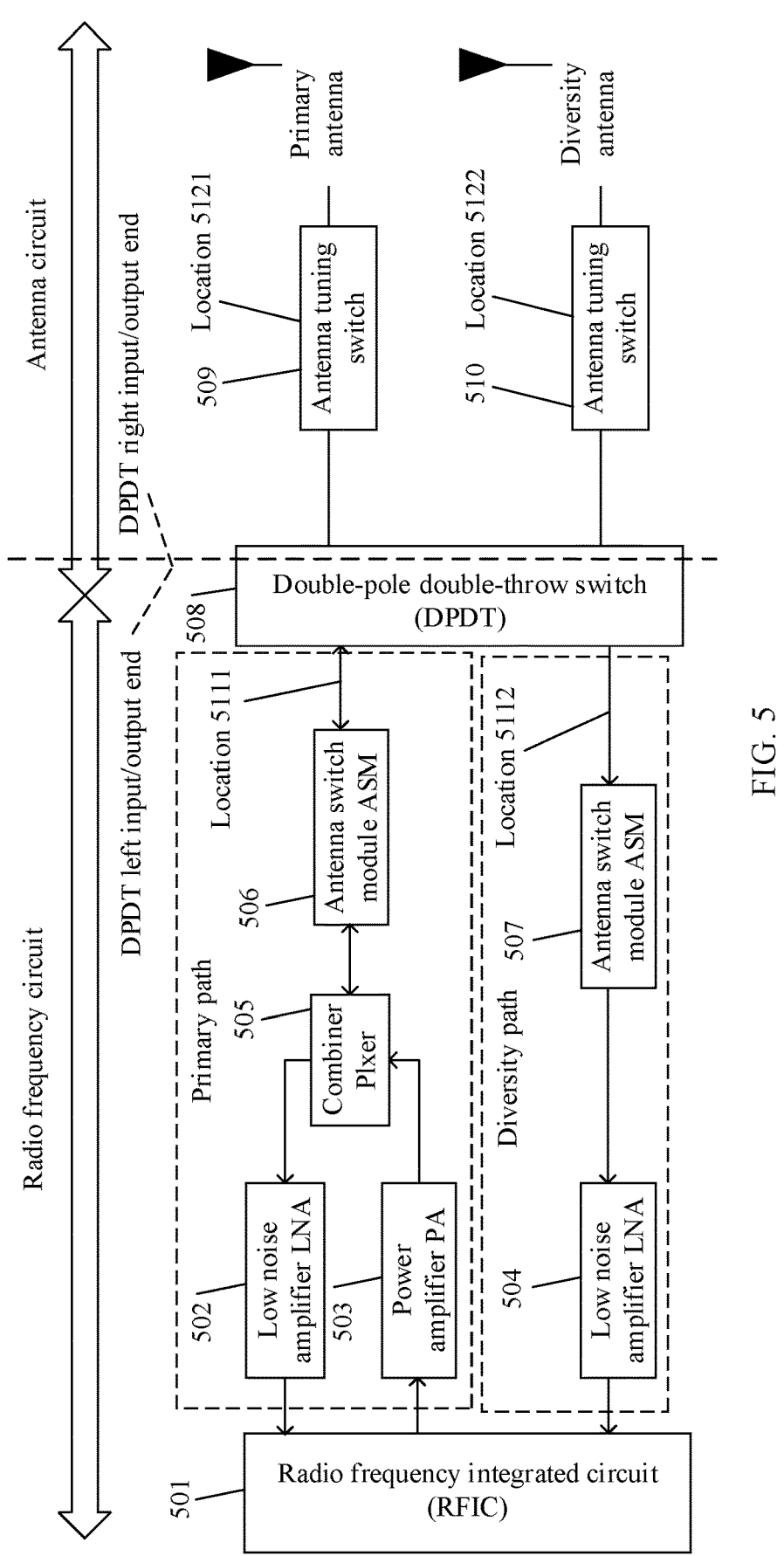
FIG. 5 is a schematic diagram of circuit structures of a radio frequency circuit and an antenna circuit according to an embodiment of this application.

For example, FIG. 5 is a diagram of circuit structures of a radio frequency circuit and an antenna circuit in a terminal according to an embodiment of this application.

A circuit from a left input/output end of a double-pole double-throw switch 508 to a radio frequency integrated chip 501 is a radio frequency circuit. A circuit from a right input/output end of the double-pole double-throw switch 508 to an antenna is an antenna circuit.

The antenna circuit includes a primary antenna and a diversity antenna. The radio frequency circuit includes the radio frequency integrated circuit (Radio Frequency Integrated Circuit, RFIC) 501, a low noise amplifier (low noise amplifier, LNA) 502 in a primary path, a low noise amplifier 504 in a diversity path, a power amplifier (power amplifier, PA) 503, a combiner (plxer) 505, and the double-pole double-throw switch (double pole double throw, DPDT) 508.

The RFIC (501) may access some data content in the LNA (including the LNA 502 and the LNA 504), the PA, the plxer, the DPDT, and an ASM (including an ASM 506 and an ASM 507), and send a control instruction to components such as the LNA, the PA, the plxer, the DPDT, and the antenna tuning switch based on the accessed data content, to complete signal sending and signal receiving.

The LNA (including the LNA 502 and the LNA 504) is configured to: after the terminal receives a signal by using the antenna, amplify a useful signal, and suppress a noise signal, to improve a signal-to-noise ratio.

The PA (503) is configured to perform power amplification on a modulated to-be-transmitted signal to meet a transmit power requirement, and then radiate the signal to space by using the antenna.

The plxer (505) is configured to combine transmission and receiving onto one circuit. For a receiving circuit, a signal received by the terminal by using the antenna enters a receive path through the combiner. For a transmit circuit, a signal transmitted by the terminal to the antenna passes through a transmit path of the combiner and then is transmitted by using the antenna.

It may be understood that, the LNA, the PA, and the plxer in the radio frequency circuit are components that assist in implementing a function of signal sending and receiving. If another component can implement a function consistent with that of one or more of the LNA, the PA, or the plxer in the radio frequency circuit, the another component may replace the one or more of the LNA, the PA, or the plxer. Alternatively, if a function of signal sending and receiving can be completely implemented in the radio frequency circuit without using any component in the LNA, the PA, and the plxer, the radio frequency circuit may include none of the LNA, the PA, and the plxer component. That is, a quantity of LNAs, PAs, and plxer components in the radio frequency circuit may be 0, or another component may be used. This is not limited in embodiments of this application.

The DPDT (508) is configured to determine, based on mobile communication signal strength of the primary antenna and the diversity antenna, whether the primary antenna or the diversity antenna is responsible for signal receiving and sending. For example, when the mobile communication signal strength of the primary antenna is greater than or equal to that of the diversity antenna, the primary antenna is used to send and receive signals. When the mobile communication signal strength of the diversity antenna is greater than that of the primary antenna or when a decrease in the signal strength of the primary antenna is greater than 3 dB, the diversity antenna is used to send and receive signals.

(5) Primary Path, Diversity Path, Primary Receive Path, and Diversity Receive Path Referring to FIG. 5, it may be understood that path information at a software level may be obtained through function combination of the foregoing components such as the LNA, the PA, the plxer, or the DPDT, including a primary path (primary path) and a diversity path (diversity path). It may be understood that a radio frequency path directly connected to a primary antenna is a primary path, and a radio frequency path directly connected to a diversity antenna is a diversity path. Usually, a communications chip in a terminal may receive, send, or receive and send signals by using an antenna through a primary path, and may receive a signal by using an antenna through a diversity path.

Generally, in a radio frequency circuit, a band is in a one-to-one correspondence with a primary path and a diversity path. For example, one band (for example, B5) may be used to determine one corresponding primary path (primary path) and one corresponding diversity path (diversity path), or two or more bands may be used to determine one corresponding primary path and one corresponding diversity path. In this solution, whether one or more bands are used to determine one primary path and one diversity path is not limited. This may be determined according to a requirement in actual application with reference to a carrier aggregation technology. For ease of description, in embodiments of this application, an example in which one band is used to determine one primary path and one diversity path is used.

It may be understood that one or more components such as an LNA, a PA, a plxer, or a DPDT may be included in one primary path or diversity path, and components such as an LNA, a PA, a plxer, or a DPDT may be reused for bands that are all LBs or MHBs.

For example, a primary path corresponding to B5 (LB) in the radio frequency circuit is a1, and a diversity path corresponding to B5 (LB) is a2. A primary path corresponding to B7 is c1, and a diversity path corresponding to B7 is c2. a1, c1, a2, and c2 may share one or more components such as an LNA, a PA, a plxer, or a DPDT. It may be understood that a path identifier (Identity document, ID) (for example, a1, a2, c1, or c2) of each path is merely an example. A specific path number may be customized. A specific value of the path number is not limited in embodiments of this application. Descriptions of the path ID in this specification are the same.

Figures 6, 7:
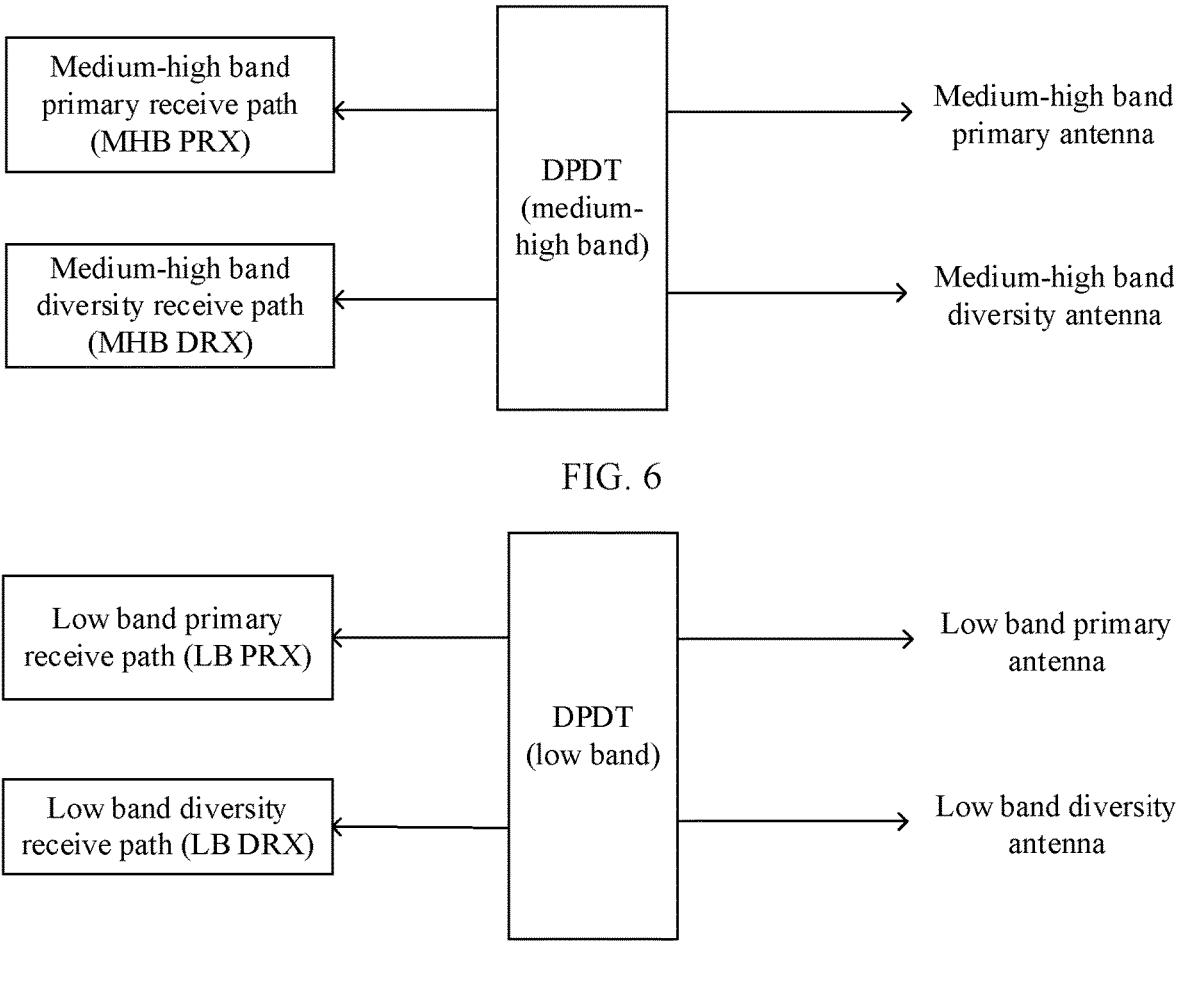
FIG. 6 is a schematic diagram of an MHB primary antenna, an MHB diversity antenna, PRX, and DRX according to an embodiment of this application.
FIG. 7 is a schematic diagram of an LB primary antenna, an LB diversity antenna, PRX, and DRX according to an embodiment of this application.

It may be understood that, as shown in FIG. 6 and FIG. 7, the LB primary-diversity antenna and the MHB primary-diversity antenna have respective radio frequency circuits and antenna circuits. In the radio frequency circuit of the LB primary-diversity antenna, a primary path includes an LB primary receive (primary receive, PRX) path (PRX path is referred to as PRX path for ease of description below) and an LB primary transmit path, and a diversity path includes an LB diversity receive (diversity receive, DRX) path (DRX path is referred to as DRX path for ease of description below). In an MHB primary-diversity antenna, a primary path includes an MHB primary receive path (MHB PRX path) and an MHB primary transmit path, and a diversity path includes an MHB diversity receive path (MHB DRX path).

It may be understood that, usually, in a radio frequency circuit, a band is in a one-to-one correspondence with a primary path and a diversity path. Embodiments of this application mainly resolve a problem that receiving by a secondary card does not affect receiving and sending performance of a primary card when a terminal performs a signal receiving and sending service by using the primary card and performs a signal receiving service by using the secondary card. Therefore, the following provides detailed descriptions mainly by using PRX in a primary path and DRX in a diversity path (that is, a 2R path). It may be understood that one band corresponds to one PRX path and one DRX path. For example, receive paths corresponding to B5 (LB) include an LB primary receive path LB PRX path d1 and an LB DRX path d2.

Generally, when a second communications chip and a first communications chip use a same set of primary-diversity antennas (for example, primary card MHB+secondary card MHB or primary card LB+secondary card LB), the first communications chip corresponding to the primary card has a high priority on the PRX of the primary path in priorities of use permission for the PRX of the primary path and the DRX of the diversity path. For example, when the terminal needs to perform a signal receiving service of the secondary card through the second communications chip by using an antenna, if the first communications chip currently does not perform a receiving service of the primary card by using the PRX of the primary path, the second communications chip may receive a signal by using both the diversity path and the PRX of the primary path; or if the first communications chip currently performs a receiving service of the primary card by using the PRX of the primary path, the second communications chip can use only the diversity path to receive a signal.

(6) Cross State and Direct State

In embodiments of this application, there may be the following two antenna states according to different manners in which a communications chip in a terminal receives and sends signals by using a primary antenna or a diversity antenna through a primary path.

Figures 8, 9, 10:
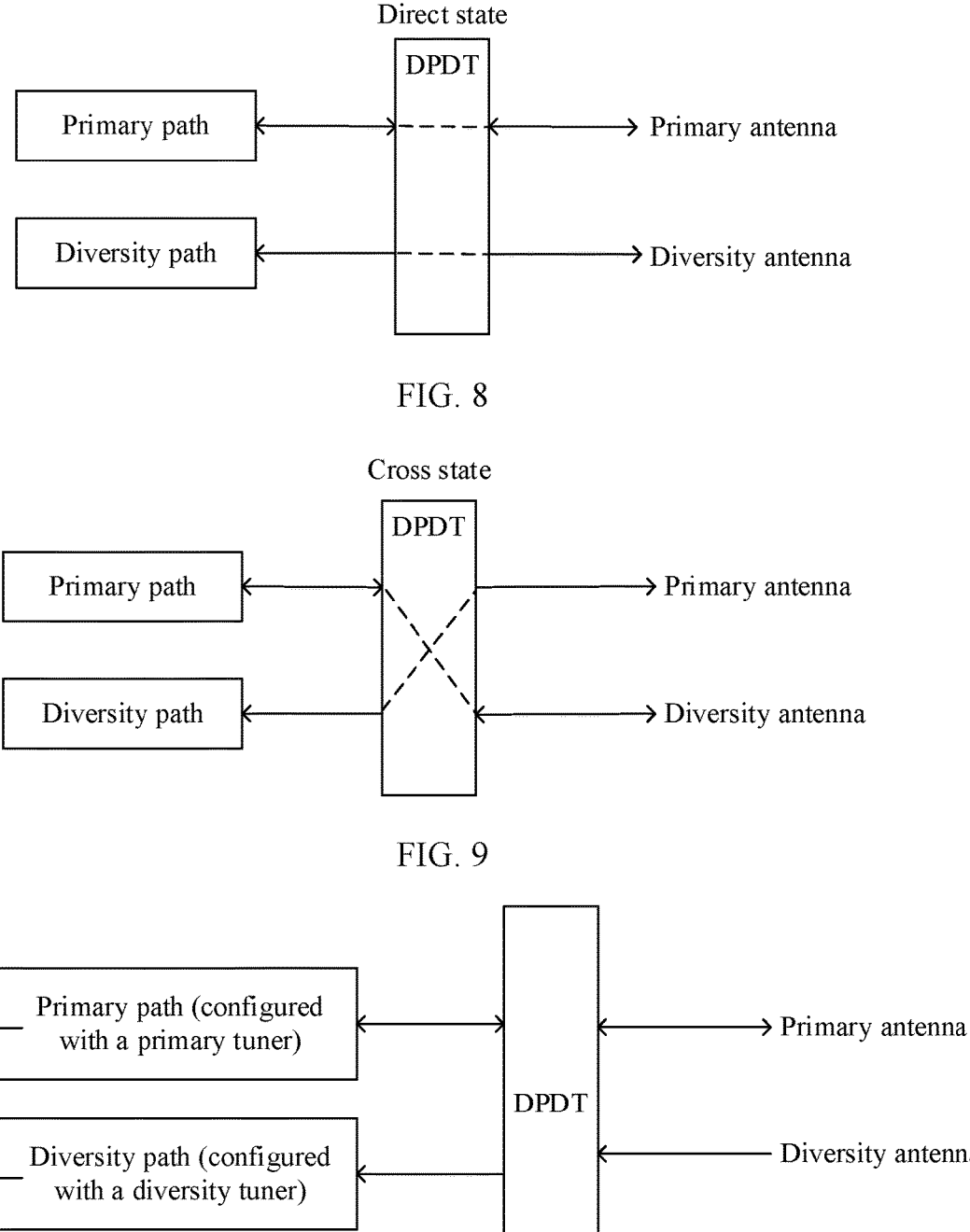
FIG. 8 is a schematic diagram in which an antenna status is a direct state according to an embodiment of this application.
FIG. 9 is a schematic diagram in which an antenna status is a cross state according to an embodiment of this application.
FIG. 10 is a schematic diagram of configuring tuners on a primary path and a diversity path according to an embodiment of this application.

1. FIG. 8 shows the direct state. When an antenna status is the direct state, the communications chip in the terminal may receive and send signals by using the primary antenna through the primary path, and may receive a signal by using the diversity antenna through a diversity path.

It may be understood that, in a normal case, signal strength and performance of the primary antenna are better than those of the diversity antenna, and the primary antenna is used to receive and send signals.

2. FIG. 9 shows the cross state. When an antenna status is the cross state, the communications chip may send and receive signals by using the diversity antenna through the primary path, and receive a signal by using the primary antenna through a diversity path.

It may be understood that, in some cases, for example, when the terminal detects that a decrease in the signal strength of the primary antenna is greater than 3 dB, or the signal strength of the primary antenna is less than the signal strength of the diversity antenna, a DPDT in the terminal may switch the antenna status to the cross state.

(7) Antenna Tuning Switch and Antenna Status Configuration Information

Generally, the primary path of the radio frequency circuit shown in FIG. 5 may further include an antenna switch module (Antenna Switch Module, ASM) 506, and the diversity path may further include an antenna switch module (ASM) 507. The ASM is configured to select, based on a target band of a sending frequency or a receiving frequency, a path (path) corresponding to the target band from the radio frequency circuit to the antenna circuit to transmit a signal.

Generally, the antenna circuit shown in FIG. 5 further includes an antenna tuning switch 509 in the primary antenna circuit, and an antenna tuning switch 510 in the diversity antenna circuit. It may be understood that the impedance value of the radio frequency circuit changes with a band value of the path, and different paths corresponding to different bands are corresponding to different impedance values. To achieve impedance matching between the radio frequency circuit and the antenna circuit, the antenna tuning switch is configured to switch a value of a tuning element between the radio frequency circuit and the antenna circuit to a value corresponding to the target band, to implement maximum antenna efficiency. Usually, the tuning element is an impedance value. It may be understood that the tuning element may be another element, or the tuning element may include another element other than the impedance value. This is not limited in embodiments of this application. For ease of description, an example in which the tuning element is an impedance value is used for detailed description below.

An association relationship between the value of the tuning element and the band is antenna status configuration information (tuner). It may be understood that the tuner described in embodiments of this application refers to software information, and may also be understood as configuration information that drives the antenna tuning switch to play a tuning function.

For example, as shown in the following Table 3, an impedance value (or referred to as a tuner value) in antenna status configuration information is in a one-to-one correspondence with a band. In addition, because the path is in a one-to-one correspondence with the band, a corresponding impedance value may be stored in the path. Specifically, an attribute of the path may include the band and the impedance value, to indicate a correspondence between the path, the band, and the impedance value. The communications chip of the terminal may set, by using the path in the radio frequency circuit, the tuner value to a tuner value that is consistent with a sending or receiving band on which the terminal receives and sends signals, to implement good matching between the radio frequency circuit and the antenna circuit, and maximize antenna efficiency. It may be understood that the path or tuner is in a one-to-one correspondence with the band. For two bands with a same frequency range (for example, B1 and N1, or B2 and N2), corresponding paths and tuner values are consistent.

For example, path information of the PRX in the primary path of the MHB is shown in Table 3 below. It may be understood that path information of the PRX in the primary path of the LB, path information of the DRX in the diversity path of the MHB, and path information of the DRX in the diversity path of the LB are similar to those shown in Table 3, and are not described in detail herein.

TABLE 3

| Path ID | Band | Impedance value/tuner value |
|---------|------|-----------------------------|
| path a1 | B1 (MHB), N1 (MHB) | r1 |
| path a2 | B2 (MHB), N2 (MHB) | r2 |
| . . . | . . . | . . . |

It may be understood that when an impedance value corresponding to the path is stored in the path, and the communications chip in the terminal uses the path, an impedance tuning element between the radio frequency circuit and the antenna circuit may be set to the impedance value corresponding to the path, to implement impedance matching between the radio frequency circuit and the antenna circuit. When the impedance value corresponding to the path is not stored in the path, and the communications chip in the terminal uses the path, an impedance tuning element between the radio frequency circuit and the antenna circuit cannot be set to the impedance value corresponding to the path, to implement impedance matching between the radio frequency circuit and the antenna circuit.

For ease of description below, that the impedance value corresponding to the path is stored in the path is referred to as that a tuner is configured in the path, and that the impedance value corresponding to the path is not stored in the path is referred to as that no tuner is configured in the path.

It may be understood that the PRX path in the primary path and the primary transmit path in the primary path may share a same tuner.

(8) Non-Standalone Networking and Standalone Networking

It may be understood that non-standalone networking refers to deploying a 5G network by using an existing 4G infrastructure. Standalone networking refers to creating a new 5G network, including a new base station, a backhaul link, and a core network. A base station in non-standalone networking may support an LTE band and an NR band, and a base station in 5G standalone networking supports an NR band.

It may be understood that a networking manner of a base station that establishes a communication connection to a primary card or a secondary card in a terminal is not limited in embodiments of this application. When the networking manner of the base station that establishes a communication connection to the primary card or the secondary card is a non-standalone networking manner, a target card that uses a 5G network in the primary card or the secondary card supports both an NR band and an LTE band. When the networking manner of the base station that establishes a communication connection to the primary card or the secondary card is a standalone networking manner, a target card that uses a 5G network in the primary card or the secondary card supports an NR band.

It may be understood that, when a 5G networking manner is a standalone networking manner, in embodiments of this application, a card using a 5G network may support one or more bands in the NR band, and a card using a 2G, 3G, or 4G network may support one or more bands in the LTE band. When a 5G networking manner is a non-standalone networking manner, in embodiments of this application, a card using a 5G network may support one or more bands in the NR band or the LTE band, and a card using a 2G, 3G, or 4G network may support one or more bands in the LTE band. This embodiment of this application sets no limitation on a quantity of bands supported by the primary card or the secondary card and a specific band supported by the primary card or the secondary card.

The following describes advantages of an antenna configuration method in embodiments of this application with reference to the foregoing term descriptions and implementations of several other antenna configuration methods.

It may be understood that when a primary card in a terminal uses a first communications chip and a secondary card uses a second communications chip to receive and send signals through an antenna in a target band by using corresponding radio frequency paths, if an impedance value of the radio frequency circuit is inconsistent with an impedance value corresponding to the target band, an impedance of the radio frequency circuit does not match an impedance of the antenna circuit, thereby affecting performance of the terminal in receiving or sending a signal by using the primary card or the secondary card.

Referring to FIG. 5, usually, due to a constraint of platform software and hardware, if a terminal manufacturer installs, in locations 5121 and 5122 in an antenna circuit shown in FIG. 5, antenna tuning switches provided by a specific platform, because tuner software information is configured in the antenna tuning switches provided by the platform, the terminal may control, by using the antenna circuit, the antenna tuning switches and the tuner information to play a tuning function in the locations 5121 and 5122 in the antenna circuit shown in FIG. 5. If a terminal manufacturer uses, in locations 5121 and 5122 in an antenna circuit shown in FIG. 5, third-party antenna tuning switches that are not provided by a specific platform and that have an antenna tuning function, the platform supports configuring a tuner in the radio frequency circuit in an ASM type manner (for example, the tuner is configured in the radio frequency circuit according to information such as timing control and an event type used by the RFIC in the radio frequency circuit to send an instruction to the ASM). For example, the tuner is configured in locations 5111 and 5112 in FIG. 5, and an identifier of the third-party antenna tuning switch is stored in a corresponding path, so that the RFIC in the radio frequency circuit can be used to control the third-party antenna tuning switches installed at locations 5121 and 5122 based on the tuner information in the path to play a tuning function. That is, a hardware physical location of the third-party antenna tuning switch is in the antenna circuit, but software information (that is, tuner) of the third-party antenna tuning switch is configured in the radio frequency circuit, and is controlled by the RFIC in the radio frequency circuit. Usually, the terminal manufacturer chooses to use the third-party antenna tuning switch in consideration of factors such as a function and costs. In embodiments of this application, technical problems existing in a solution in which third-party antenna tuning switches are installed at locations 5121 and 5122, and a tuner is configured in a radio frequency circuit are posed, and a method for resolving these technical problems is provided.

Generally, in the radio frequency circuit of the terminal, there may be the following two antenna configuration methods (tuner) (for ease of description, a tuner whose tuner value is applied to a primary path is referred to as a primary tuner, a tuner whose tuner value is applied to a diversity path is referred to as a diversity tuner, and it may be understood that, regardless of whether an antenna status is a cross state or a direct state, tuner information of the primary tuner is applied to antenna tuning switch hardware of a primary antenna, and tuner information of the diversity tuner is applied to antenna tuning switch hardware of a diversity antenna).

1. Referring to FIG. 10, a primary tuner is configured in a primary path, and a diversity tuner is configured in a diversity path (the diversity path may also be understood as DRX).

It may be understood that, in this configuration manner, when a primary card in the terminal uses a first communications chip and a secondary card uses a second communications chip to simultaneously use a same set of primary-diversity antennas (for example, simultaneously use an LB primary-diversity antenna or an MHB primary-diversity antenna), if signal strength of the primary antenna is less than signal strength of the diversity antenna when the primary card sends or receives a signal through the first communications chip, a DPDT switches an antenna status from a direct state to a cross state, so that the first communications chip uses the primary path to send and receive signals on the diversity antenna. In this case, because the diversity tuner is located before the DPDT, and the antenna status is switched to the cross state after the DPDT, it can be learned from software logic that the diversity tuner cannot perceive that the antenna status has been switched to the cross state at the DPDT. Therefore, the second communications chip preempts the diversity antenna to perform a signal receiving service. In addition, the second communications chip modifies, by using the diversity tuner in the diversity path, a tuner value of the diversity tuner to a tuner value corresponding to a target band on which the second communications chip receives a signal. For an antenna tuning switch of the diversity antenna, an impedance value (tuning element) of the antenna tuning switch of the diversity antenna circuit is modified to an impedance value corresponding to the target band. In addition, in this case, on the diversity antenna, the primary card may send and receive signals by using the diversity antenna in a frequency division duplex manner. That is, the tuner value of the antenna tuning switch of the diversity circuit plays a role in both a sending service of the diversity antenna and a receiving service of the diversity antenna. In this case, the second communications chip preempts receiving of the diversity antenna, and modifies the tuner value to a tuner value that is consistent with a receiving band of the second communications chip. A tuner value consistent with a sending band of the first communications chip is also modified. Therefore, normal antenna use of the first communications chip is affected, and sending performance of the first communications chip is reduced.

For example, after the antenna status is switched to the cross state in the DPDT, the first communications chip and the second communications chip need to read a status of the DPDT to update cognition of the antenna status. For example, for the first communications chip, there is a mark value used to record the antenna status. When the mark value is 0, it indicates that the antenna status is the cross state, or when the mark value is 1, it indicates that the antenna status is the direct state. Similarly, the second communications chip also has such a mark value, but the mark values of the first communications chip and the second communications chip are not a same mark value. In this case, the first communications chip switches the antenna status to the cross state by using an antenna, and the first communications chip reads the status of the DPDT, so that the cross state can be sensed. However, because the ASM is located before the DPDT, the DPDT does not notify the second communications chip to update the mark value. Therefore, the second communications chip cannot recognize that the antenna status is the cross state, uses an antenna as if the antenna status is the direct state. Therefore, when the primary-secondary card uses a same set of primary-diversity antennas, it is difficult to comply with the related priority constraints of the primary-secondary card on the primary-diversity path, it cannot be ensured that the primary-secondary card normally uses the antenna, and even a series of primary card performance attenuation problems occur.

Figure 11:
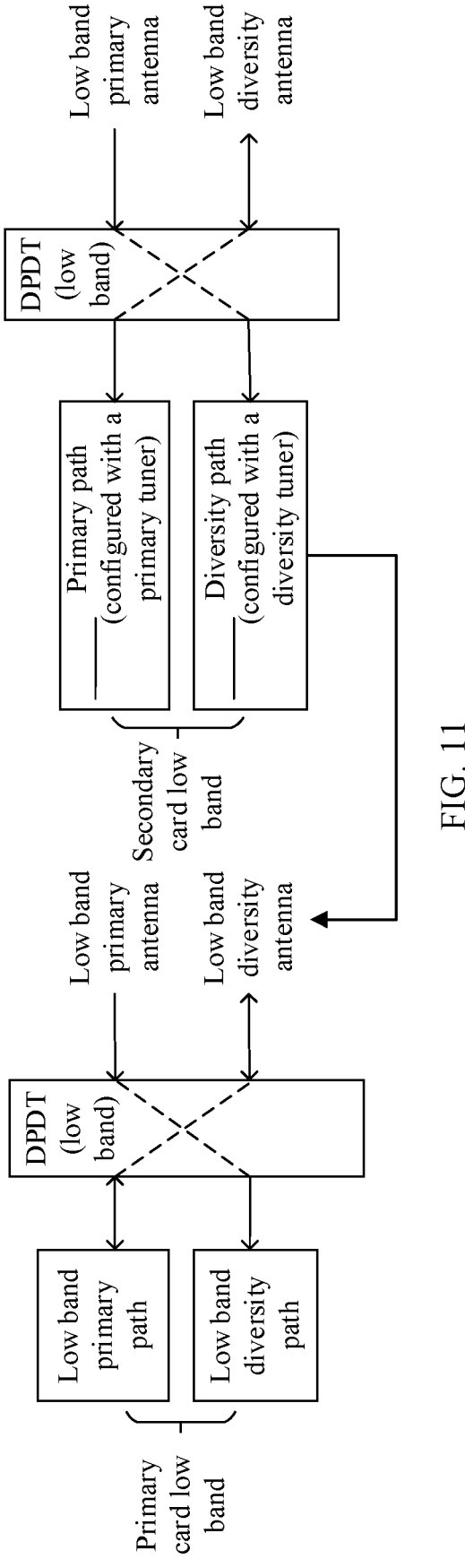
FIG. 11 is a schematic diagram of how to use an antenna in a scenario of primary card LB+secondary card LB according to an embodiment of this application.

For example, as shown in FIG. 11, if the terminal performs a signal receiving and sending service with the base station through the primary card on the second band by using the LB diversity antenna, a tuner value of the primary tuner on the primary path in the LB radio frequency circuit is an impedance value (tuner value) corresponding to the second band. For example, the impedance value is r1. In this case, the tuner value is applied between the LB radio frequency circuit and the LB diversity antenna circuit, that is, the impedance value (tuning element) of the antenna tuning switch on the LB diversity antenna is r1. In this case, if the second communications chip needs to receive a signal in the first band, and the first band and the second band are both LB bands, because the tuner configured in the diversity path in the LB radio frequency circuit cannot sense that the antenna status has been changed to the cross state, the second communications chip still receives a signal by using the LB diversity antenna through the LB DRX. In addition, the second communications chip sets, by using the tuner on the diversity path, the tuner value of the antenna tuning switch on the LB diversity antenna to an impedance value corresponding to the first band, for example, r2. In this case, if the tuner value is applied to the antenna tuning switch on the LB diversity antenna circuit, the impedance value of the antenna tuning switch on the LB diversity antenna is changed from r1 to r2. When the second band is inconsistent with the first band (for example, N8 and B5), r1 is inconsistent with r2, and a tuner value of the LB diversity antenna is a tuner value corresponding to the first band but not corresponding to the second band, thereby reducing performance of sending a signal on the LB diversity antenna by the primary card of the terminal by using the first communications chip.

It may be understood that, in a case in which the first communications chip and the second communications chip simultaneously use the MHB primary-diversity antenna, there is a problem that the second communications chip modifies the tuner value of the diversity antenna of the first communications chip, which affects receiving performance of the first communications chip. This is similar to a problem that exists when the first communications chip and the second communications chip simultaneously use the LB primary-diversity antenna. Reference may be made to related detailed descriptions shown in FIG. 11, and details are not described herein again.

Figure 12:
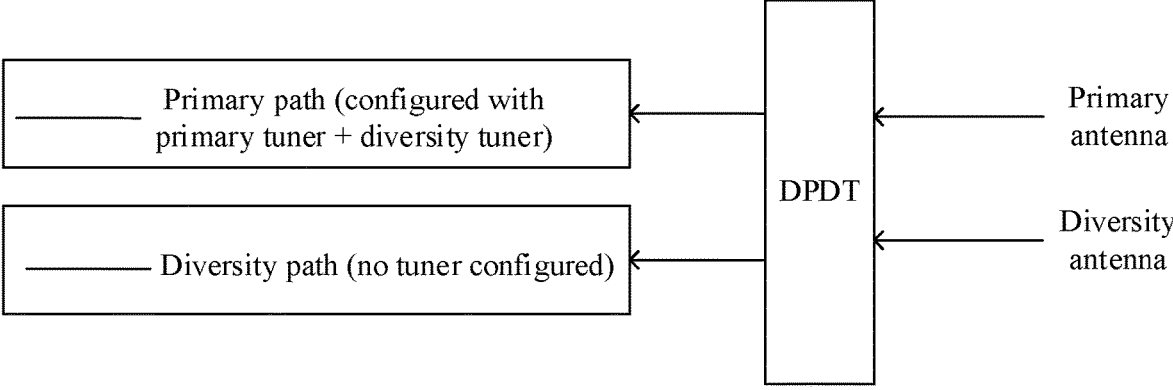
FIG. 12 is a schematic diagram of how to configure a primary tuner and a diversity tuner on a primary path and a diversity path according to an embodiment of this application.

2. As shown in FIG. 12, the terminal may configure a primary tuner and a diversity tuner on the primary path, and configures no tuner on the diversity path.

Figure 13:
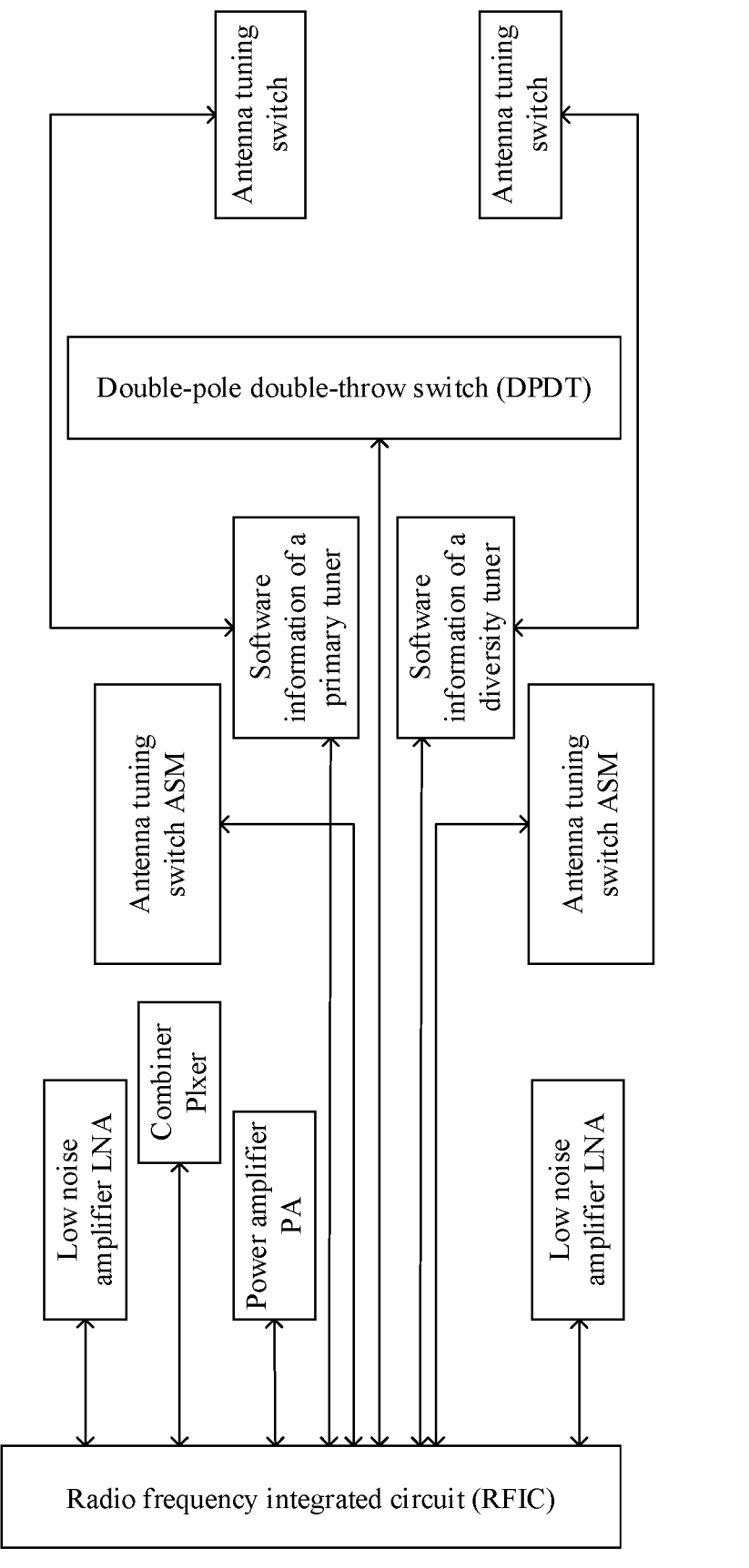
FIG. 13 is a schematic diagram of a control path in a radio frequency circuit according to an embodiment of this application.

Generally, when the first communications chip receives a signal by using the PRX in the primary path in the target band, values of both the primary tuner and the diversity tuner of the PRX are set to tuner values corresponding to the target band (it may be understood that because the PRX in the primary path and the primary transmit path share a same tuner, configuring the primary tuner and the diversity tuner in the primary path may also be understood as configuring the primary tuner and the diversity tuner in the PRX). In addition, a control path shown in FIG. 13 exists among the RFIC, the LNA, the PA, the plxer, the ASM, the DPDT, and the tuner software information. Therefore, for the tuner value that is set in the diversity tuner on the PRX, the information of the diversity tuner of the PRX may be obtained by using the RFIC, and then the RFIC sends the information of the diversity tuner to the DRX, to control the tuner value of the diversity tuner of the PRX to take effect on the DRX. Finally, the tuner value of the diversity tuner is reflected to the antenna tuning switch of the diversity antenna by using the DRX. Whether the tuner value that is set on the diversity tuner takes effect on the antenna tuning switch depends on whether the first communications chip has permission to receive a signal by using the DRX. If the first communications chip has permission to receive a signal by using the DRX, the tuner value of the diversity tuner takes effect on the DRX, and finally is reflected on the antenna tuning switch of the diversity antenna.

Figure 14:
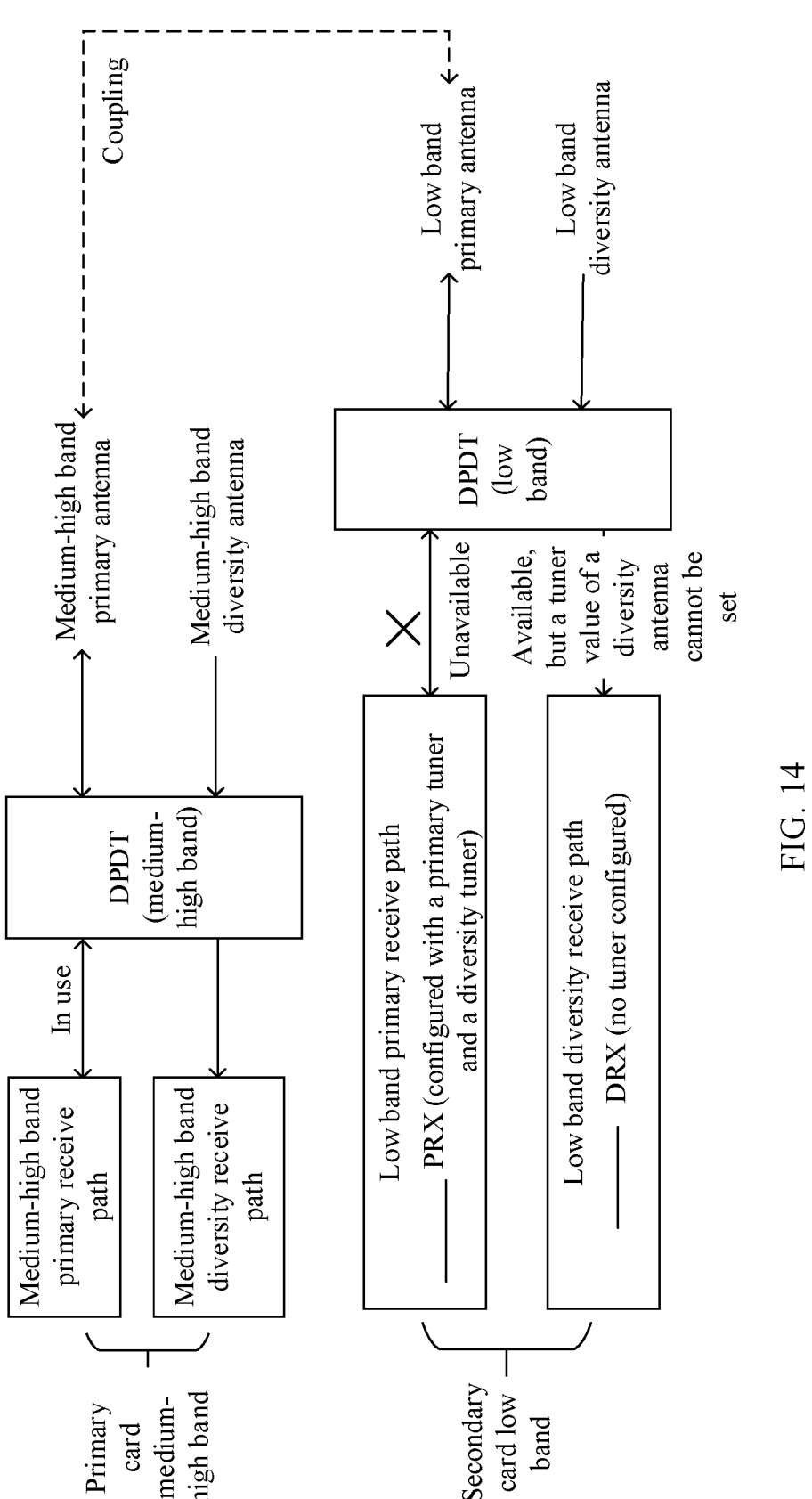
FIG. 14 is a schematic diagram of how to use an antenna in a scenario of primary card MHB+secondary card LB according to an embodiment of this application.

In this manner, the first communications chip and the second communications chip in the terminal use different primary-diversity antennas (for example, as shown in FIG. 14, the first communications chip uses the MHB primary-diversity antenna to receive a signal, and the second communications chip uses the LB primary-diversity antenna to receive a signal). When antenna statuses are the direct state, and the first communications chip uses the MHB primary antenna to receive and send signals through the MHB primary path, if the second communications chip uses the LB primary antenna by using the LB PRX, because the MHB primary antenna is coupled to the LB primary antenna, receiving and sending performance of the first communications chip on the MHB primary antenna is affected. Therefore, in a scenario of primary card MHB+secondary card LB, in order not to affect normal use of the MHB primary antenna by the first communications chip, the second communications chip in the terminal cannot receive a signal by using the LB primary antenna through the LB PRX, and can only receive a signal by using the LB diversity antenna through the LB DRX. Similarly, when the antenna status is the cross state, because the second communications chip cannot sense the cross state, the second communications chip cannot receive a signal by using the LB primary antenna through the LB PRX, and can only receive a signal by using the LB diversity antenna through the LB DRX.

It can be learned from the foregoing that, in a scenario of primary card MHB+secondary card LB, the second communications chip cannot receive a signal by using the PRX of the primary path of the LB, and can only receive a signal by using the DRX of the LB. In addition, a diversity tuner is not configured in the LB DRX, and therefore, the second communications chip cannot set a tuner value of the diversity tuner to a tuner value that is consistent with a target band used when the second communications chip receives a signal. Consequently, performance of the second communications chip for receiving a signal by using the diversity antenna is poor.

Similarly, when the first communications chip receives a signal by using the LB primary-diversity antenna and the second communications chip receives a signal by using the MHB primary-diversity antenna, there is a problem that when the second communications chip receives a signal in the target band by using the MHB DRX through the LB diversity antenna, the terminal cannot configure a tuner value of the diversity tuner as a tuner value corresponding to the target band. This is similar to a problem that the first communications chip uses the LB primary-diversity antenna and the second communications chip uses the MHB primary-diversity antenna. Details are not described herein again.

However, according to the method provided in embodiments of this application, a 2R path is added to each band of the second communications chip in the LB or the MHB (PRX in the primary path and DRX in the diversity path are collectively referred to as 2R path, and this may be understood as that an identifier of PRX in the primary path and an identifier of DRX in the diversity path are collectively referred to as 2R path). In a scenario in which the first communications chip and the second communications chip simultaneously use a same set of primary-diversity antennas to receive a signal, and a scenario in which the first communications chip and the second communications chip simultaneously use different primary-diversity antennas, the second communications chip may use different 2R paths, and the tuner is configured in different manners in the two different sets of 2R paths, to resolve the problem shown in FIG. 11 and FIG. 14. For ease of description, the following separately describes two 2R paths of the second communications chip as a first 2R path and a second 2R path (newly added).

Specifically, the primary tuner and the diversity tuner are configured on the PRX of the first 2R path, and no tuner is configured on the DRX. The primary tuner is configured on the PRX in the second 2R path, and the tuner is configured on the DRX. A blacklist and a whitelist are set, so that when the first communications chip and the second communications chip use a same set of primary-diversity antennas (for example, primary card LB+secondary card LB or primary card MHB+secondary card MHB), the second communications chip uses the first 2R path. Therefore, in a scenario of primary card LB+secondary card LB or primary card MHB+secondary card MHB, the first communications chip transmit and receive signals by using the diversity antenna in the cross state. When the second communications chip receives signals by using the DRX in the first 2R path, because no tuner is configured on the DRX in the first 2R path, the second communications chip does not modify the tuner value of the antenna tuning switch on the diversity antenna. Therefore, performance of sending a signal on the diversity antenna by the first communications chip is prevented from being affected when the second communications chip preempts diversity reception.

When the first communications chip and the second communications chip use different sets of primary-diversity antennas (for example, primary card LB+secondary card MHB or primary card MHB+secondary card LB), the second communications chip uses the second 2R path. Therefore, in a scenario of primary card LB+secondary card MHB or primary card MHB+secondary card LB, when the second communications chip receives a signal by using the DRX path in the second 2R path, because a diversity tuner is configured on the DRX in the second 2R path, the second communications chip may set, by using the diversity tuner configured on the DRX in the second 2R path, a tuner value of the diversity antenna to a tuner value consistent with a band of a signal received by the second communications chip. This avoids a problem that the tuner value of the diversity antenna cannot be set by the second communications chip in a scenario of primary card LB+secondary card MHB or primary card MHB+secondary card LB, affecting receiving performance of the diversity antenna.

Figure 15:
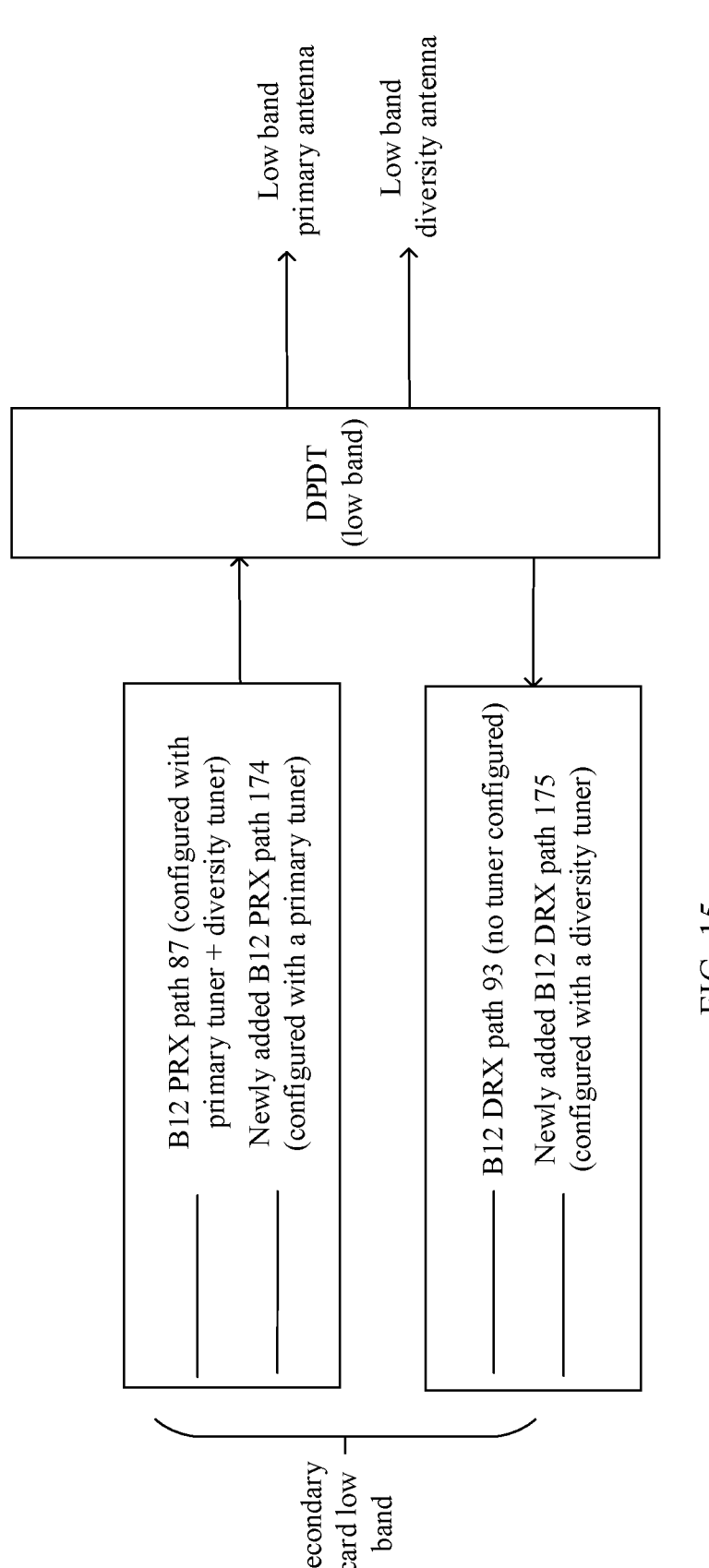
FIG. 15 is a schematic diagram of configuring a primary tuner and a diversity tuner on a primary path and a diversity path according to an embodiment of this application.

For example, B12 (LB) in the second communications chip is used as an example to describe in detail how to add a 2R path to each band in the secondary card. As shown in FIG. 15, for a secondary card, a 2R path is added to a B12 band of LB PRX. Two 2R paths of B12 are respectively referred to as a first 2R path and a second 2R path (newly added), where the first 2R path includes a PRX path 87 and a DRX path 93, and the second 2R path includes a PRX path 174 and a DRX path 175. The PRX path 87 is configured with the primary tuner and the diversity tuner, and the DRX path 93 is not configured with a tuner. The PRX path 174 is configured with the primary tuner, and the DRX path 175 is configured with the diversity tuner.

Figure 16:
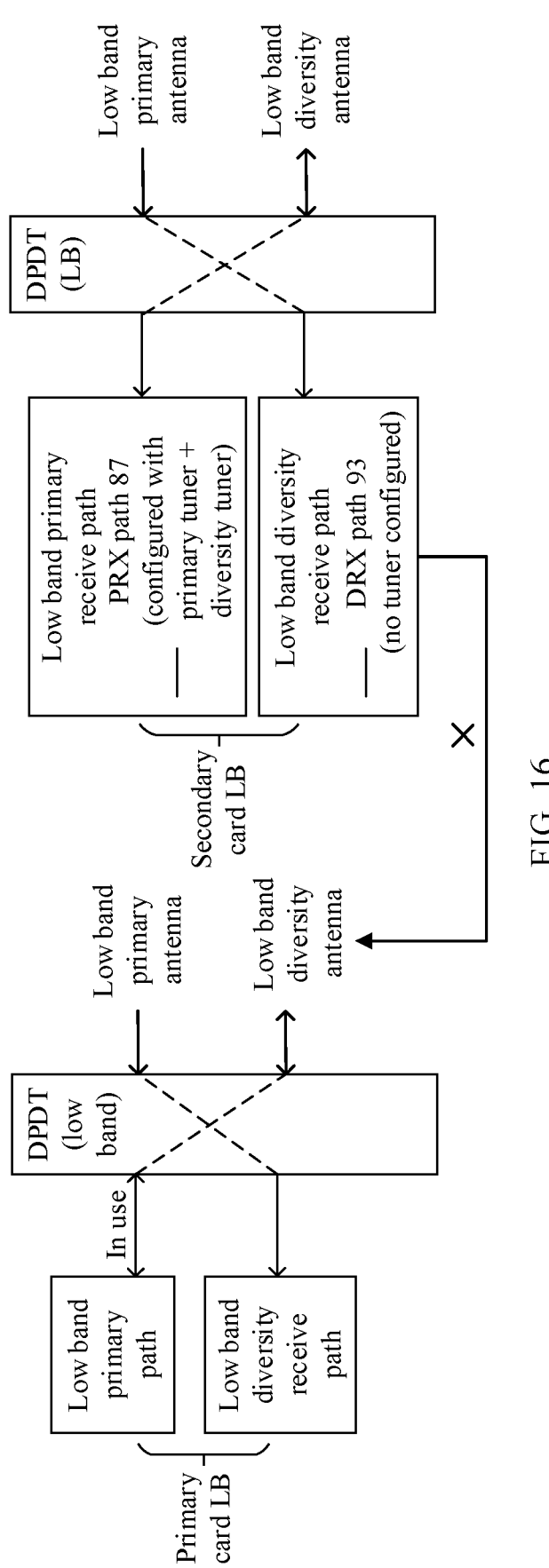
FIG. 16 is a schematic diagram of how to use an antenna in a scenario of primary card LB+secondary card LB according to an embodiment of this application.

For example, as shown in FIG. 16, in a scenario of primary card LB+secondary card LB, when the first communications chip uses the LB diversity antenna in the cross state to send and receive signals by using the LB primary path, the secondary card cannot sense the cross state. In this case, the secondary card uses the first 2R path, that is, the secondary card uses the LB diversity antenna to receive a signal through the DRX path 93 of the LB DRX. No tuner is configured in the DRX path 93. Therefore, the secondary card does not modify the tuner value of the first communications chip on the diversity antenna. This does not affect performance of using the diversity antenna to send a signal by the first communications chip, and a problem shown in FIG. 8 is avoided. It may be understood that a related description in a scenario of primary card MHB+secondary card MHB is similar to a scenario of primary card LB+secondary card LB, and details are not described herein again.

Figure 17:
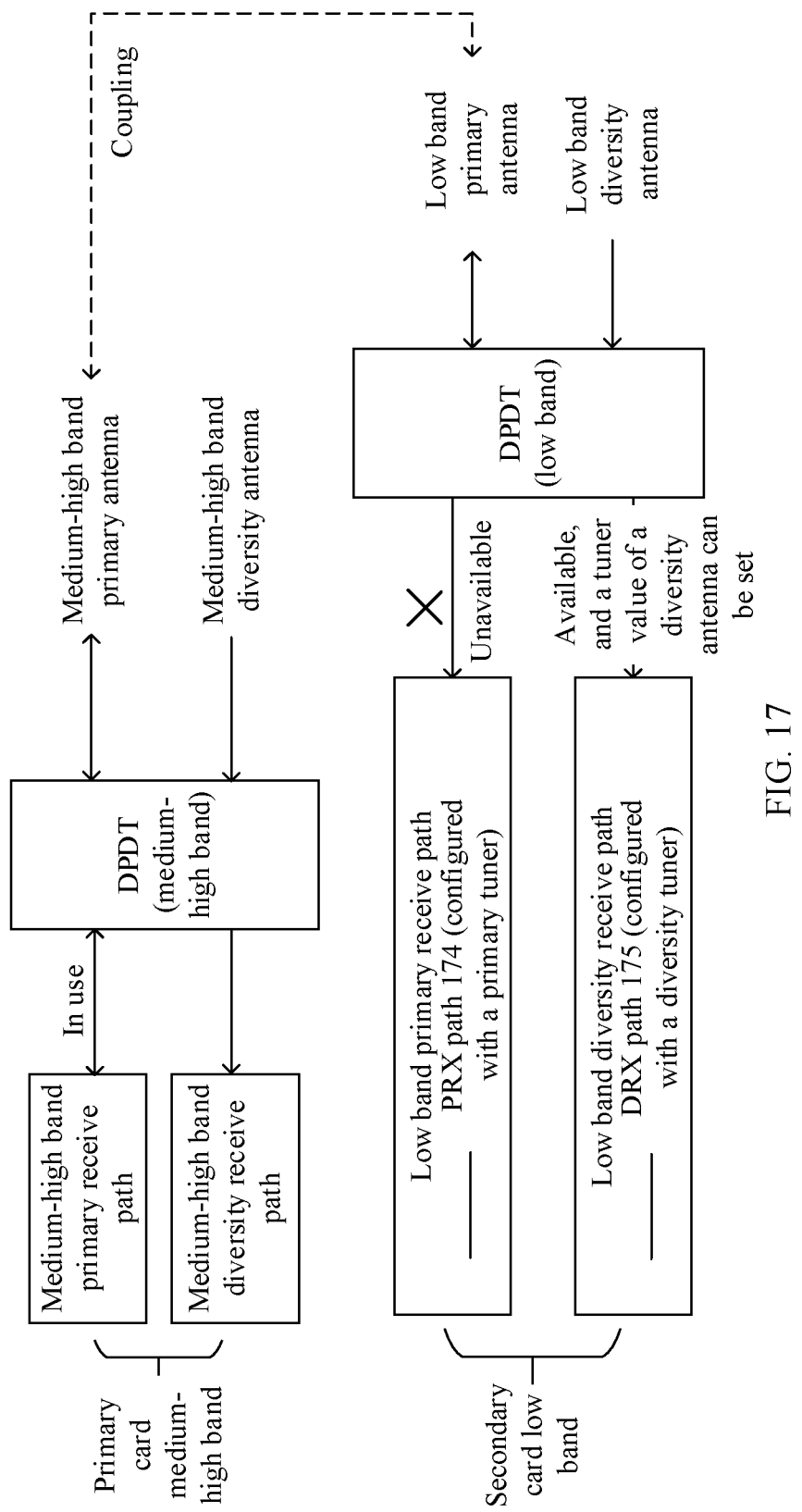
FIG. 17 is a schematic diagram of how to use an antenna in a scenario of primary card MHB+secondary card LB according to an embodiment of this application.

In addition, for example, as shown in FIG. 17, in a scenario of primary card MHB+secondary card LB, the first communications chip transmits and receives signals by using the MHB primary antenna. When the secondary card needs to receive signals, because the MHB primary antenna is coupled to the LB primary antenna, the secondary card cannot receive signals by using the LB primary antenna through the LB PRX, and can only receive signals by using the LB diversity antenna through the LB DRX. In this case, the secondary card uses the second 2R path, that is, the secondary card receives a signal by using the LB diversity antenna through the DRX path 175 on the LB DRX. Because the diversity tuner is configured on the DRX path 175, the secondary card may configure the tuner value of the diversity antenna by using the diversity tuner on the DRX path 175. Therefore, in a scenario of primary card MHB+secondary card LB, the secondary card may set the tuner value of the diversity antenna when using the LB diversity antenna for receiving. This can avoid a problem that the secondary card cannot set the tuner value of the diversity antenna when using the LB diversity antenna for receiving in FIG. 11, and improve receiving performance when the second communications chip uses the diversity antenna for receiving in a scenario of primary card MHB+secondary card LB. It may be understood that a related description in a scenario of primary card LB+secondary card MHB is similar to a scenario of primary card MHB+secondary card LB, and details are not described herein again.

It can be learned from the foregoing that according to the method provided in embodiments of this application, the second communications chip uses two different sets of 2R paths in a scenario in which the primary-secondary card uses a same set of primary-diversity antennas and a scenario in which the primary-secondary card uses different primary-diversity antennas. Therefore, it is considered that when the primary-secondary card uses a same set of primary-diversity antennas, the secondary card does not modify a tuner value of the primary card on the diversity antenna in a cross state, thereby avoiding affecting performance of using the antenna by the primary card. In addition, when the primary-secondary card uses different primary-diversity antennas, the secondary card may use the diversity antenna to receive a signal in the target band and set a tuner value of the diversity antenna, that is, may set the tuner value of the diversity antenna to a tuner value corresponding to the target band, thereby improving receiving performance of the secondary card.

Figure 18:
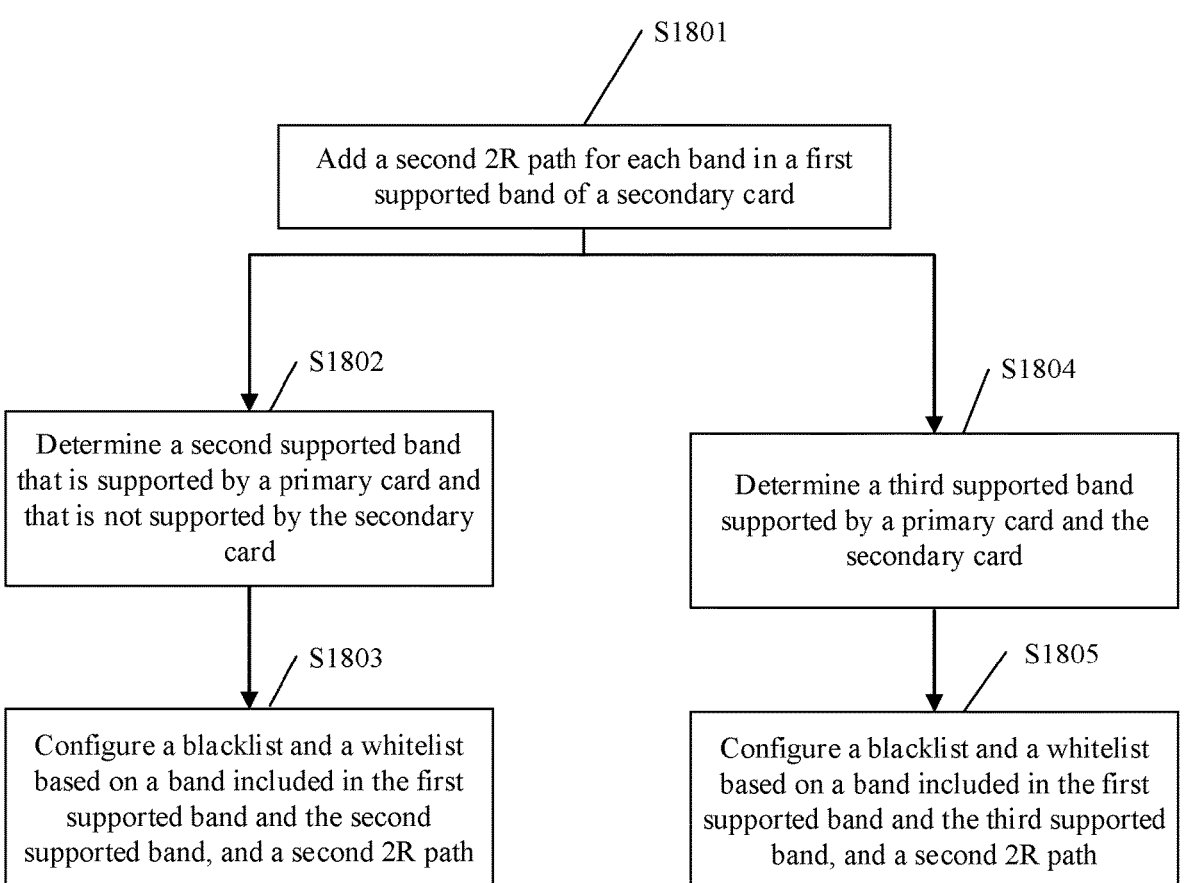
FIG. 18 is a schematic diagram of a blacklist and whitelist configuration method according to an embodiment of this application.

Based on the foregoing related detailed descriptions, the following describes in detail an antenna configuration method in an embodiment of this application with reference to FIG. 18. In this embodiment of this application, a second communications chip in a terminal first determines a second band in which a secondary card receives a signal, and a first communications chip in the terminal determines a first band in which a primary card sends and receives signals. Then, four paths (two 2R paths) that are corresponding to the second band and that can be used by the secondary card are determined based on the second band, and two paths or four paths that are corresponding to the first band and that can be used by the first communications chip are determined based on the first band (it may be understood that, if a band range of a band (for example, B1) supported by the second communications chip and a band range of a band (for example, N1) supported by the first communications chip are consistent, because a path is in a one-to-one correspondence with a band, when the second communications chip adds a 2R path for B1, it is equivalent that a 2R path that supports B1 and N1 is added, that is, the first communications chip may also use the newly added 2R path in N1). Then, two specific paths in the four paths (a specific 2R path in two 2R paths) corresponding to the second band that are used by the secondary card to receive a signal in a specific scenario are determined based on a blacklist and a whitelist.

It may be understood that in this embodiment of this application, configuration information of the blacklist and the whitelist is statically stored in the terminal. Specifically, the blacklist and whitelist information is used to set the following constraint: In a case of primary card LB+secondary card MHB or primary card MHB+secondary card LB, the terminal communicates with a base station through the secondary card by using a second 2R path, without using a first 2R path. In a case of primary card LB+secondary card LB or primary card MHB+secondary card MHB, the terminal communicates with a base station through the secondary card by using a first 2R path. The following provides detailed description with reference to FIG. 18.

S1801. Add a second 2R path for each band in a first supported band of a secondary card.

In this embodiment of this application, a 2R path is added to each band in the first supported band (the first supported band is a band supported by the secondary card) of the secondary card. That is, a second 2R path is added to each LB and each MHB that are in the first supported band and that have a first 2R path. Therefore, when the terminal receives a signal by using a second band (the second band may be any band in the first supported band) through the secondary card, two 2R paths corresponding to the second band may be determined, including the first 2R path (a first path ID of a first PRX path and a second path ID of a first DRX path) and the second 2R path (a third path ID of a second PRX path and a fourth path ID of a second DRX path).

S1802. Determine a second supported band that is supported by a primary card and that is not supported by the secondary card.

For ease of description, a band supported by both the primary card and the secondary card is referred to as a target band. In this case, the second supported band may also be understood as a band other than the target band in bands supported by the primary card.

It may be understood that, because the second supported band is a band that is supported by the primary card and that is not supported by the secondary card, each band in the second supported band includes an original 2R path, and does not include a newly added 2R path. Therefore, when the terminal transmits and receives data by using a first band (the first band may be any band in the second supported band) through the primary card, one third 2R path (a fifth path ID of a third PRX path and a sixth path ID of a third DRX path) corresponding to the first band may be determined.

S1803. Configure a blacklist and a whitelist based on a band included in the first supported band and the second supported band, and the second 2R path.

Specifically, the configuring a blacklist and a whitelist based on a band included in the first supported band and the second supported band, and a second 2R path includes the following.

(1) A first 2R path of each low band in the first supported band and a third 2R path of each low band in the second supported band are added to the whitelist, and a second 2R path and a third 2R path of each low band in the first supported band are added to the blacklist.

For example, the first 2R path and the second 2R path of each low band in the first supported band are determined, the third 2R path of each low band in the second supported band is determined, an association relationship between the first 2R path and the third 2R path is stored in the whitelist, and an association relationship between the second 2R path and the third 2R path is stored in the blacklist.

(2) A first 2R path of each medium-high band in the first supported band and a third 2R path of each medium-high band in the second supported band are added to the whitelist, and a second 2R path and a third 2R path of each medium-high band in the first supported band are added to the blacklist.

For example, the first 2R path and the second 2R path of each medium-high band in the first supported band are determined, the third 2R path of each medium-high band in the second supported band is determined, an association relationship between the first 2R path and the third 2R path is stored in the whitelist, and an association relationship between the second 2R path and the third 2R path is stored in the blacklist.

Therefore, it is constrained that when the terminal communicates with a base station by using an LB primary-diversity antenna in the second band through the secondary card, and communicates with a base station by using the LB primary-diversity antenna in the first band through the primary card, or when the terminal communicates with a base station by using an MHB primary-diversity antenna in the second band through the secondary card, and communicates with a base station by using an MHB primary-diversity antenna in the first band through the primary card, the secondary card uses the first 2R path, and the primary card uses the third 2R path.

For example, a specific implementation in which the blacklist and the whitelist are set for primary card LB+secondary card LB is described in detail by using primary card N71+secondary card B12 as an example. As shown in the following Table 4, it is assumed that in the secondary card B12 band, a first path ID is 87, a second path ID is 93, a third path ID is 174, and a fourth path ID is 175; and in the primary card N71 band, a fifth path ID is 156, and a sixth path ID is 158. In a case of primary card N71+secondary card B12, either of 156 and 158 may be used in combination with either of 87 and 93. That is, in a scenario of primary card N71+secondary card B12, the secondary card may use the first 2R path. As shown in the following Table 5, in a case of first communications chip N71 and second communications chip B12, either of 156 and 158 cannot be used in combination with either of 174 and 175. That is, in a scenario of primary card N71+secondary card B12, the second communications chip cannot use the second 2R path.

TABLE 4

| Primary card LB + secondary card LB whitelist configuration | | |
| --- | --- | --- |
| Dual-card band combination | First communications chip path-N71 | First 2R path of a second communications chip (B12) |
| Primary card N71 + secondary card B12 | 156, 158 | 87, 93 |

TABLE 5

| Primary card LB + secondary card LB blacklist configuration | | |
| --- | --- | --- |
| Dual-card band combination | First communications chip path-N71 | Second 2R path of a second communications chip (B12) |
| Primary card N71 + secondary card B12 | 156, 158 | 174, 175 |

Specifically, the configuring a blacklist and a whitelist based on a band included in the first supported band and the second supported band, and a second 2R path alternatively includes the following.

(1) A second 2R path of each medium-high band in the first supported band and a third 2R path of each low band in the second supported band are added to the whitelist, and a first 2R path and a third 2R path of each medium-high band in the first supported band are added to the blacklist.

For example, the first 2R path and the second 2R path of each medium-high band in the first supported band are determined, and the third 2R path of each low band in the second supported band is determined. An association relationship between the second 2R path and the third 2R path is stored in the whitelist, and an association relationship between the first 2R path and the third 2R path is stored in the blacklist.

(2) A second 2R path of each low band in the first supported band and a third 2R path of each medium-high band in the second supported band are added to the whitelist, and a first 2R path and a third 2R path are added to the blacklist.

For example, the first 2R path and the second 2R path of each low band in the first supported band are determined, and the third 2R path of each medium-high band in the second supported band is determined. An association relationship between the second 2R path and the third 2R path is stored in the whitelist, and an association relationship between the first 2R path and the third 2R path is stored in the blacklist.

Therefore, it is constrained that when the terminal communicates with a base station by using an LB primary-diversity antenna in the second band through the secondary card, and communicates with a base station by using the MHB primary-diversity antenna in the first band through the primary card, or when the terminal communicates with a base station by using an MHB primary-diversity antenna in the second band through the secondary card, and communicates with a base station by using an LB primary-diversity antenna in the first band through the primary card, the secondary card uses the second 2R path, and the primary card uses the third 2R path.

For example, a specific implementation in which the blacklist and the whitelist are set for primary card LB+secondary card MHB or primary card MHB+secondary card LB is described in detail by using primary card N70+secondary card B12 as an example. It is assumed that in the secondary card B12 band, a first path ID is 87, a second path ID is 93, a third path ID is 174, and a fourth path ID is 175. In the primary card N70 band, a fifth path ID is 166, and a sixth path ID is 168. As shown in the following Table 6 and Table 7, in a case of first communications chip N70 and second communications chip B12, either of 166 and 168 and either of 87 and 93 have a blacklist relationship, and either of 166 and 168 and either of 174 and 175 have a whitelist relationship. It indicates that in the case of first communications chip N70 and second communications chip B12, either of 166 and 168 cannot be used in combination with either of 87 and 93, and either of 166 and 168 of N70 can be used in combination with either of 174 and 175. That is, in a scenario of primary card N70+secondary card B12, the terminal may communicate with a base station through the secondary card by using the second 2R path, but cannot communicate with a base station through the secondary card by using the first 2R path.

TABLE 6

| Primary card MHB + secondary card LB blacklist configuration | | |
| --- | --- | --- |
| Dual-card band combination | First communications chip path-N70 | First 2R path of a second communications chip (B12) |
| Primary card N70 + secondary card B12 | 166, 168 | 87, 93 |

TABLE 7

| Primary card MHB + secondary card LB whitelist configuration | | |
|---|---|---|
| Dual-card band combination | First communications chip path-N70 | Second 2R path of a second communications chip (B12) |
| Primary card N70 + secondary card B12 | 166, 168 | 174, 175 |

S1804. Determine a third supported band supported by the primary card and the secondary card.

It may be understood that the third supported band may also be understood as a target band in a band supported by the primary card (the target band is a band supported by both the primary card and the secondary card). A set of the second supported band and the third supported band is a band supported by the primary card, the third supported band is included in the first supported band, and the second supported band is not included in the first supported band.

It may be understood that, because the third supported band is a band supported by the primary card and the secondary card, each band in the third supported band includes an original 2R path and a newly added 2R path. Therefore, when the terminal receives and sends data by using a first band (the first band may be any band in the third supported band) through the primary card, two 2R paths corresponding to the first band may be determined, which are a fourth 2R path (including a seventh path ID of a fourth PRX path and an eighth path ID of a fourth DRX path) and a fifth 2R path (a ninth path ID of a fifth PRX path and a tenth path ID of a fifth DRX path).

S1805. Configure a blacklist and a whitelist based on a band included in the first supported band and the third supported band, and a second 2R path.

Specifically, the configuring a blacklist and a whitelist based on a band included in the first supported band and the third supported band, and a second 2R path includes the following.

(1) A first 2R path of each low band in the first supported band and a fourth 2R path of each low band in the third supported band are added to the whitelist, and a first 2R path and a fifth 2R path, a second 2R path and a fourth 2R path, and a second 2R path and a fifth 2R path are added to the blacklist. Alternatively, a first 2R path of each low band in the first supported band and a fifth 2R path of each low band in the third supported band are added to the whitelist, and a first 2R path and a fourth 2R path, a second 2R path and a fourth 2R path, and a second 2R path and a fifth 2R path are added to the blacklist.

For example, the first 2R path and the second 2R path of each low band in the first supported band are determined. The fourth 2R path and the fifth 2R path of each low band in the third supported band are determined.

An association relationship between the first 2R path and the fourth 2R path is stored in the whitelist, and an association relationship between the first 2R path and the fifth 2R path, an association relationship between the second 2R path and the fourth 2R path, and an association relationship between the second 2R path and the fifth 2R path are stored in the blacklist.

Alternatively,
an association relationship between the first 2R path and the fifth 2R path is stored in the whitelist, and an association relationship between the first 2R path and the fourth 2R path, an association relationship between the second 2R path and the fourth 2R path, and an association relationship between the second 2R path and the fifth 2R path are stored in the blacklist.

(2) A first 2R path of each medium-high band in the first supported band and a fourth 2R path of each medium-high band in the third supported band are added to the whitelist, and a first 2R path and a fifth 2R path, a second 2R path and a fourth 2R path, and a second 2R path and a fifth 2R path are added to the blacklist. Alternatively, a first 2R path of each medium-high band in the first supported band and a fifth 2R path of each medium-high band in the third supported band are added to the whitelist, and a first 2R path and a fourth 2R path, a second 2R path and a fourth 2R path, and a second 2R path and a fifth 2R path are added to the blacklist.

For example, the first 2R path and the second 2R path of each medium-high band in the first supported band are determined. The fourth 2R path and the fifth 2R path of each medium-high band in the third supported band are determined.

An association relationship between the first 2R path and the fourth 2R path is stored in the whitelist, and an association relationship between the first 2R path and the fifth 2R path, an association relationship between the second 2R path and the fourth 2R path, and an association relationship between the second 2R path and the fifth 2R path are stored in the blacklist.

Alternatively,
an association relationship between the first 2R path and the fifth 2R path is stored in the whitelist, and an association relationship between the first 2R path and the fourth 2R path, an association relationship between the second 2R path and the fourth 2R path, and an association relationship between the second 2R path and the fifth 2R path are stored in the blacklist.

Therefore, it is constrained that when the terminal communicates with a base station by using the LB primary-diversity antenna in the second band through the secondary card, and communicates with a base station by using the LB primary-diversity antenna in the first band through the primary card, or when the terminal communicates with a base station by using the MHB primary-diversity antenna in the second band through the secondary card, and communicates with a base station by using the MHB primary-diversity antenna in the first band through the primary card, the secondary card uses the first 2R path, and the primary card may use the fourth 2R path or the fifth 2R path.

For example, a specific implementation in which a first 2R path of each low band in the first supported band and a fourth 2R path of each low band in the third supported band are added to the whitelist, and a first 2R path and a fifth 2R path, a second 2R path and a fourth 2R path, and a second 2R path and a fifth 2R path are added to the blacklist is described in detail by using primary card N5+secondary card B5 as an example.

For example, it is assumed that in the secondary card B5 band, a first path ID is 77, a second path ID is 83, a third path ID is 134, and a fourth path ID is 135; and in the primary card N5 band, a seventh path ID is 126, an eighth path ID is 128, a ninth path ID is 124, and a tenth path ID is 125. As shown in Table 8 below, 124, 125 and 77, 83; 124, 125 and 134, 135; and 126, 128 and 134, 135 are added to the blacklist. As shown in Table 9 below, 126, 128 and 77, 83 are added to the whitelist. It indicates that in a case of first communications chip N5 and second communications chip B5, either of 124 and 125 cannot be used in combination with either of 77 and 83, either of 124 and 125 cannot be used in combination with either of 134 and 135, either of 126 and 128 cannot be used in combination with either of 134 and 135, and either of 126 and 128 can be used in combination with either of 77 and 83. That is, in a scenario of primary card N5+secondary card B5, the terminal may communicate with a base station through the secondary card by using the first 2R path, and may communicate with a base station through the primary card by using the fourth 2R path.

TABLE 8

| Primary card LB + secondary card LB blacklist configuration | | |
| --- | --- | --- |
| Dual-card band combination | Primary card (N5) | Secondary card (B5) |
| Primary card N5 + secondary card B5 | 124, 125 | 77, 83 |
| Primary card N5 + secondary card B5 | 124, 125 | 134, 135 |
| Primary card N5 + secondary card B5 | 126, 128 | 134, 135 |

TABLE 9

| Primary card LB + secondary card LB whitelist configuration | | |
| --- | --- | --- |
| Dual-card band combination | First communications chip path-N5 | Second 2R path of a second communications chip (B5) |
| Primary card N5 + secondary card B5 | 126, 128 | 77, 83 |

Specifically, the configuring a blacklist and a whitelist based on a band included in the first supported band and the third supported band, and a second 2R path alternatively includes the following.

(1) A second 2R path of each low band in the first supported band and a fourth 2R path of each medium-high band in the third supported band are added to the whitelist, and a first 2R path and a fourth 2R path, a first 2R path and a fifth 2R path, and a second 2R path and a fifth 2R path are added to the blacklist. Alternatively, a second 2R path of each low band in the first supported band and a fifth 2R path of each medium-high band in the third supported band are added to the whitelist, and a first 2R path and a fourth 2R path, a first 2R path and a fourth 2R path, and a second 2R path and a fourth 2R path are added to the blacklist.

For example, the first 2R path and the second 2R path of each low band in the first supported band are determined, and the fourth 2R path and the fifth 2R path of each medium-high band in the third supported band are determined.

An association relationship between the second 2R path and the fourth 2R path is stored in the whitelist, and an association relationship between the first 2R path and the fourth 2R path, an association relationship between the first 2R path and the fifth 2R path, and an association relationship between the second 2R path and the fifth 2R path are stored in the blacklist.

Alternatively, an association relationship between the second 2R path and the fifth 2R path is stored in the whitelist, and an association relationship between the first 2R path and the fourth 2R path, an association relationship between the first 2R path and the fifth 2R path, and an association relationship between the second 2R path and the fourth 2R path are stored in the blacklist.

(2) A second 2R path of each medium-high band in the first supported band and a fourth 2R path of each low band in the third supported band are added to the whitelist, and a first 2R path and a fourth 2R path, a first 2R path and a fifth 2R path, and a second 2R path and a fifth 2R path are added to the blacklist. Alternatively, a second 2R path of each medium-high band in the first supported band and a fifth 2R path of each low band in the third supported band are added to the whitelist, and a first 2R path and a fourth 2R path, a first 2R path and a fifth 2R path, and a second 2R path and a fourth 2R path are added to the blacklist.

For example, the first 2R path and the second 2R path of each medium-high band in the first supported band are determined, and the fourth 2R path and the fifth 2R path of each low band in the third supported band are determined.

An association relationship between the second 2R path and the fourth 2R path is stored in the whitelist, and an association relationship between the first 2R path and the fourth 2R path, an association relationship between the first 2R path and the fifth 2R path, and an association relationship between the second 2R path and the fifth 2R path are stored in the blacklist.

Alternatively, an association relationship between the second 2R path and the fifth 2R path is stored in the whitelist, and an association relationship between the first 2R path and the fourth 2R path, an association relationship between the first 2R path and the fifth 2R path, and an association relationship between the second 2R path and the fourth 2R path are stored in the blacklist.

Therefore, it is constrained that when the terminal communicates with a base station by using the LB primary-diversity antenna in the second band through the secondary card, and communicates with a base station by using the MHB primary-diversity antenna in the first band through the primary card, or when the terminal communicates with a base station by using the MHB primary-diversity antenna in the second band through the secondary card, and communicates with a base station by using the LB primary-diversity antenna in the first band through the primary card, the secondary card uses the second 2R path, and the primary card may use the fourth 2R path or the fifth 2R path.

In this embodiment of this application, a corresponding primary tuner and diversity tuner are statically configured in a PRX path and a DRX path in the first 2R path and the second 2R path. Specifically, in the first 2R path, the primary tuner and the diversity tuner are configured in a first PRX path, and no tuner is configured in a first DRX path. In the second 2R path, the primary tuner is configured in a second PRX path, and the diversity tuner is configured in a second DRX path.

This embodiment of this application sets no limitation on how to configure the primary tuner and the diversity tuner in a PRX path and a DRX path in the third 2R path. For example, there are the following two manners of configuring the primary tuner and the diversity tuner in the PRX path and the DRX path in the third 2R path. (1) In the third 2R path, the primary tuner and the diversity tuner are configured in the PRX path, and no primary tuner or diversity tuner is configured in the DRX path. (2) In the third 2R path, the primary tuner is configured in the PRX path, and the diversity tuner is configured in the DRX path.

In this embodiment of this application, a configuration manner of the primary tuner and the diversity tuner in the PRX path and the DRX path in the fourth 2R path and the fifth 2R path is consistent with a configuration manner of the primary tuner and the diversity tuner in the PRX path and the DRX path in the first 2R path and the second 2R path. That is, the primary tuner and the diversity tuner are configured in the PRX path in the fourth 2R path, and no primary tuner or diversity tuner is configured in the DRX path in the fourth 2R path. The primary tuner is configured in the PRX path in the fifth 2R path, and the diversity tuner is configured in the DRX path in the fifth 2R path.

It may be understood that when a band range of the first band is the same as a band range of the second band, the first 2R path and the fourth 2R path are a same 2R path, and the second 2R path and the fifth 2R path are a same 2R path.

It may be understood that, when tuner software information is configured in a path, an association relationship between an action object of the tuner software information, that is, an ID of an antenna tuning switch, and the path needs to be established, so that the tuner software information in the path can be applied to the corresponding antenna tuning switch.

For example, as shown in the following Table 10, it is assumed that an antenna tuning switch on a primary antenna in an LB antenna circuit is U9201, and an antenna tuning switch on a diversity antenna is U8203. A PRX path 87 in the first 2R path is associated with U9201 and U8203, and a DRX path 93 is associated with the antenna tuning switch. A PRX path 87 in the second 2R path is associated with U9201, and a DRX path 93 is associated with U8203.

TABLE 10

| | Band: B12 (LB) | | | |
| --- | --- | --- | --- | --- |
| | PRX path ID in a first 2R path 87 | DRX path ID in the first 2R path 93 | PRX path ID in a second 2R path 174 | DRX path ID in the second 2R path 175 |
| Antenna tuning switch on a primary antenna | U9201 | Not configure | U9201 | Not configure |
| Antenna tuning switch on a diversity antenna | U8203 | Not configure | Not configure | U8203 |

In this embodiment of this application, the blacklist and whitelist configuration information may be statically configured, or it may be understood that before delivery of the terminal, the blacklist and whitelist configuration information is stored in a database, and the blacklist and the whitelist are configured. According to a product requirement, the blacklist and whitelist configuration information may alternatively have another configuration method. This is not limited in this embodiment of this application.

It may be understood that, in this embodiment of this application, the second 2R path is added to each LB and each MHB in the second communications chip. Any hardware component in the primary path or the diversity path shown in FIG. 5 may not be added, and the added second 2R path may share a hardware component (for example, an LNA, a PA, a plxer, an ASM, a DPDT, and an RFIC) with the original first 2R path. It may be understood that a corresponding hardware component may also be added based on a requirement. This is not limited in this embodiment of this application.

The following describes in detail actual application of the antenna configuration method in this embodiment of this application by using an example in which the terminal communicates with the base station by using any band in the first supported band through the secondary card, and the terminal communicates with the base station by using any band in the second supported band through the primary card.

Figure 19:
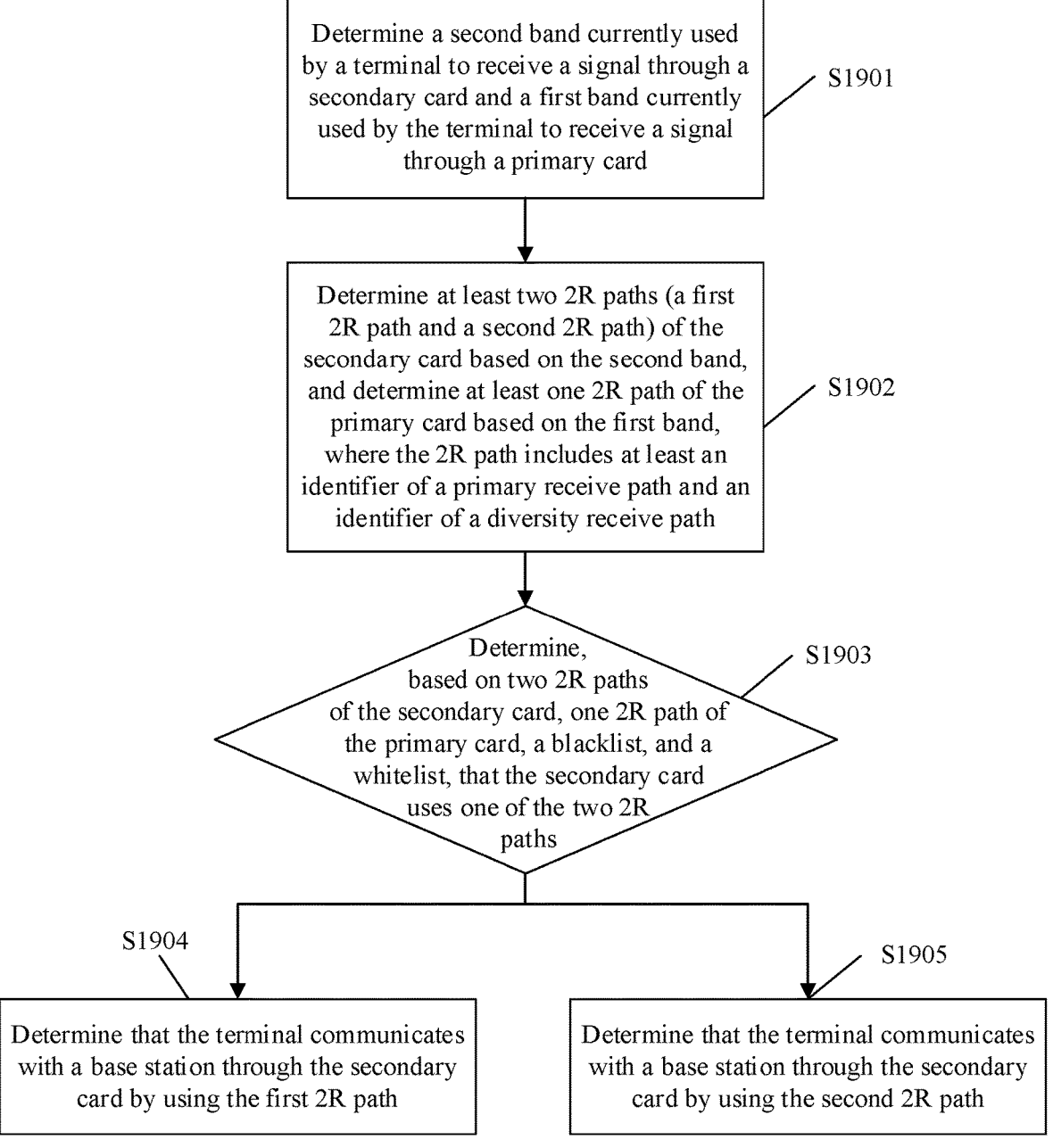
FIG. 19 is a schematic flowchart of an antenna configuration method according to an embodiment of this application.

As shown in FIG. 19, the antenna configuration method includes the following steps.

S1901. Determine a second band currently used by a terminal to receive a signal through a secondary card and a first band currently used by the terminal to receive a signal through a primary card.

It may be understood that the second band and the first band are determined by a base station that establishes communication with the terminal. When the terminal establishes a connection to the base station in a network search program at a protocol layer, the base station may determine a communication band and configure the communication band for the primary card or the secondary card in the terminal, so that a signal is transmitted between the base station and the primary card or the secondary card in the communication band. For example, the terminal may send a communication connection request to a second base station by using the secondary card. After receiving the communication connection request, the second base station configures a communication band (the second band) for communication with the secondary card, and sends configuration information that includes the second band to the secondary card in the terminal. After receiving the configuration information by using the secondary card, the terminal obtains the second band. Therefore, the second band and the first band may be determined.

S1902. Determine at least two 2R paths (a first 2R path and a second 2R path) of the secondary card based on the second band, and determine at least one 2R path of the primary card based on the first band, where the 2R path includes at least an identifier of a primary receive path and an identifier of a diversity receive path.

Specifically, the determining at least two 2R paths of the secondary card based on the second band includes: determining a first path ID and a second path ID of the first 2R path and a third path ID and a fourth path ID of the second 2R path based on the second band.

Specifically, the determining at least one 2R path of the primary card based on the first band includes: determining a fifth path ID and a sixth path ID of a third 2R path based on the first band.

In this embodiment of this application, the first path ID, the third path ID, and the fifth path ID are PRX path IDs, and the second path ID, the fourth path ID, and the sixth path ID are DRX path IDs.

It may be understood that the second band is included in a first supported band, and the first band is included in a second supported band. With reference to related descriptions in FIG. 18, the second band may be used to determine the first 2R path and the second 2R path corresponding to the second band, and the first band may be used to determine the third 2R path corresponding to the first band.

Figure 20:
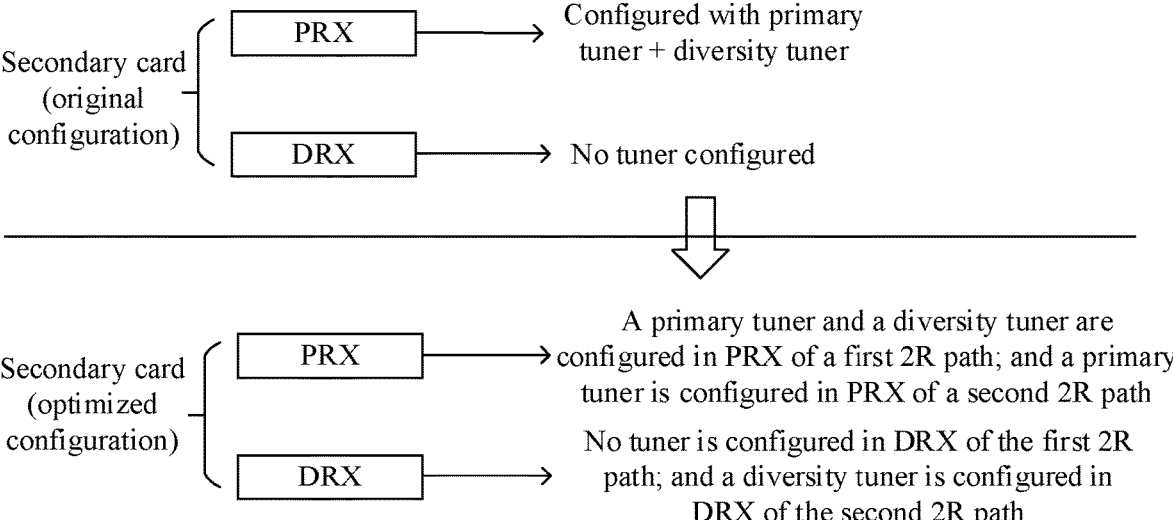
FIG. 20 is a schematic diagram of an original tuner configuration and an optimized tuner configuration of a secondary card according to an embodiment of this application.

For example, as shown in FIG. 20, in an original configuration of each LB and each MHB in the first support band of the secondary card, a primary tuner and a diversity tuner are configured on the PRX, and no tuner is configured for the DRX path on the DRX. According to the method provided in this embodiment of this application, in an optimized configuration of each LB and each MHB in the first support band, a primary tuner and a diversity tuner are configured in a PRX path of the first 2R path, a primary tuner is configured in a PRX path of the second 2R path, no tuner is configured in the DRX path of the first 2R path, and a diversity tuner is configured in a DRX path of the second 2R path.

For detailed descriptions of the first 2R path, the second 2R path, the PRX path, the DRX path, the primary tuner, and the diversity tuner, refer to the foregoing description, and details are not described herein again.

S1903. Determine, based on two 2R paths of the secondary card, one 2R path of the primary card, a blacklist, and a whitelist, that the secondary card uses one of the two 2R paths.

Specifically, the determining, based on two 2R paths of the secondary card, one 2R path of the primary card, a blacklist, and a whitelist, that the secondary card uses one of the two 2R paths includes: determining, based on the first 2R path, the second 2R path, the third 2R path, the blacklist, and the whitelist, whether the terminal uses the first 2R path or uses the second 2R path to communicate with the base station through the secondary card.

It may be understood that, when the whitelist stores an association relationship between the first 2R path and the third 2R path, and the blacklist stores an association relationship between the second 2R path and the third 2R path, it is determined that the terminal communicates with the base station through the secondary card by using the first 2R path. When the whitelist stores an association relationship between the second 2R path and the third 2R path, and the blacklist stores an association relationship between the first 2R path and the third 2R path, it is determined that the terminal communicates with the base station through the secondary card by using the second 2R path.

S1904. Determine that the terminal communicates with the base station through the secondary card by using the first 2R path.

Specifically, the determining that the terminal communicates with the base station through the secondary card by using the first 2R path includes: when determining that the whitelist stores an association relationship between the first 2R path and the third 2R path, and the blacklist stores an association relationship between the second 2R path and the third 2R path, determining that the terminal communicates with the base station through the secondary card by using the first 2R path.

For example, the second band is B12, the first band is N71, the white list stores an association relationship between the first 2R path (87, 93) and the third 2R path (156, 158), and the blacklist stores an association relationship between the second 2R path (174, 175) and the third 2R path (156, 158). In this case, the terminal communicates with the base station through the secondary card by using the first 2R path.

Figure 21:
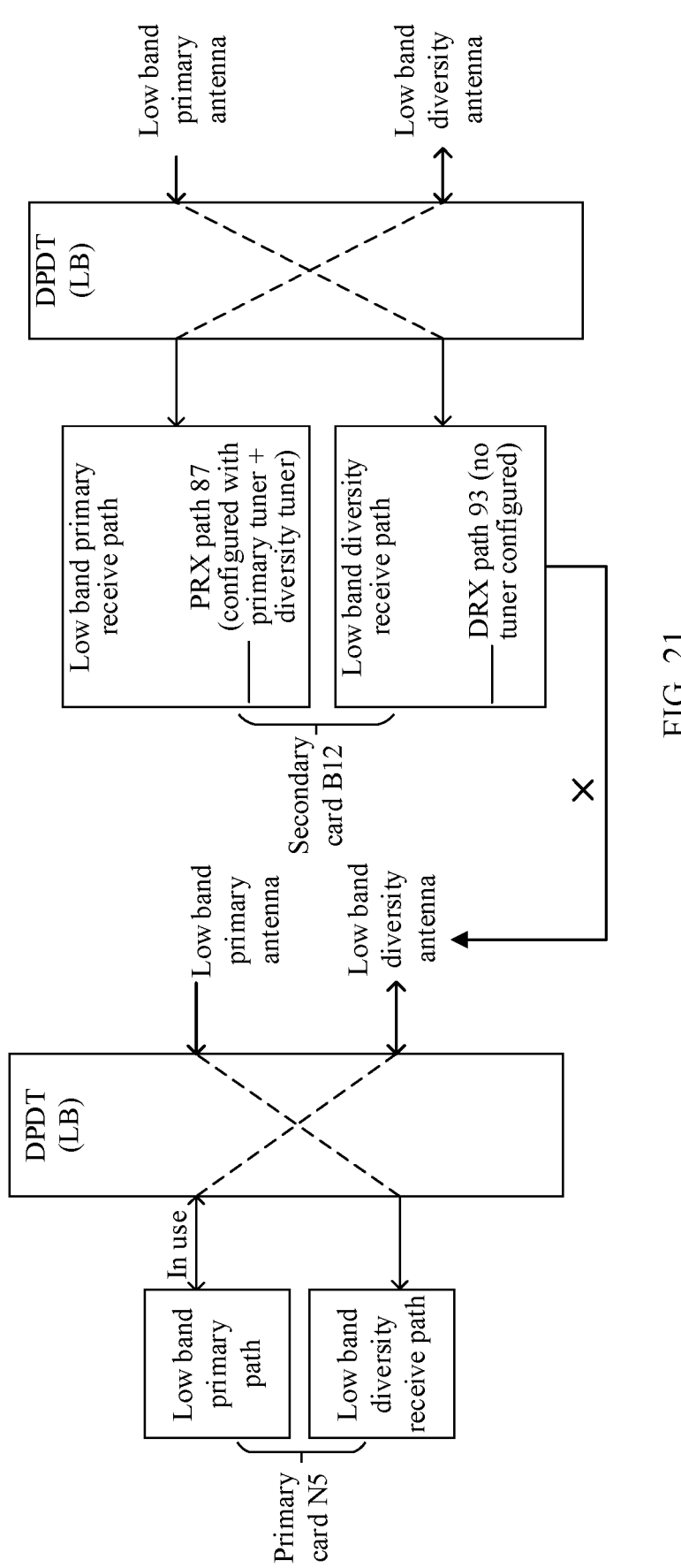
FIG. 21 is a schematic diagram of how to use an antenna in a scenario of primary card N5+secondary card B12 according to an embodiment of this application.

Therefore, in a scenario of primary card N71+B12, a primary tuner is configured in the PRX path 87 of the first 2R path of B12, and no tuner is configured in the DRX path 93. In this case, the second communications chip uses the first 2R path, and does not use the second 2R path. As shown in FIG. 21, if the terminal receives and transmits signals by using an LB diversity antenna in a cross state through the primary card, when the terminal preempts LB DRX through the secondary card to receive a signal, because no tuner is configured in the DRX path 93, the secondary card does not modify a configuration of an antenna tuning switch of the diversity antenna, thereby avoiding impact on signal sending performance of the primary card on the diversity antenna.

S1905. Determine that the terminal communicates with the base station through the secondary card by using the second 2R path.

Specifically, the determining that the terminal communicates with the base station through the secondary card by using the second 2R path includes: when determining that the whitelist stores an association relationship between the second 2R path and the third 2R path, and the blacklist stores an association relationship between the first 2R path and the third 2R path, determining that the terminal communicates with the base station through the secondary card by using the second 2R path.

For example, the second band is B12, the first band is N70, the white list stores an association relationship between the second 2R path (174, 175) and the third 2R path (166, 168), and the blacklist stores an association relationship between the first 2R path (87, 93) and the third 2R path (166, 168). In this case, the terminal communicates with the base station through the secondary card by using the second 2R path.

Therefore, in a scenario of primary card N70+secondary card B12, a primary tuner is configured in the PRX path 174 of the second 2R path, and a tuner is configured in the DRX path 175. In this case, the second communications chip uses the second 2R path. Referring to FIG. 17, when receiving a signal by using the LB DRX, the second communications chip may set the tuner value of the antenna tuning switch of the diversity antenna by using the diversity tuner configured in the DRX path 175, thereby improving performance of receiving a signal by using the diversity antenna through the second communications chip.

In this embodiment of this application, the description in which the terminal communicates with the base station through the secondary card by using the first 2R path or the terminal communicates with the base station through the secondary card by using the second 2R path indicates that when a priority condition of the primary card and the secondary card on the primary path and the diversity path is met, the terminal may simultaneously receive signals by using a PRX path and a DRX path in a 2R path (the first 2R path or the second 2R path) through the secondary card.

For example, in a primary card MHB+secondary card MHB scenario in which the primary card transmits and receives signals by using the MHB diversity antenna through the MHB primary path when the antenna status is a cross state, because the first communications chip has a high priority on the primary path, when the first communications chip uses the MHB primary path, the second communications chip cannot receive a signal by using the PRX path in the first 2R path, and can only receive a signal by using the DRX path in the first 2R path.

That is, when the first communications chip and the second communications chip use a same set of primary-diversity antennas at the same time, the second communications chip can use only the DRX path in the first 2R path to receive a signal.

For example, in a scenario of primary card MHB+secondary card LB, the second communications chip receives and sends signals by using the MHB primary antenna through the MHB primary path. Because the MHB primary antenna is coupled to the LB primary antenna, when the second communications chip uses the second 2R path, only the DRX path can be used to receive a signal.

For example, in a scenario of primary card MHB+secondary card LB, the second communications chip receives and sends signals by using the MHB diversity antenna through the MHB primary path. In this case, when the second communications chip uses the second 2R path, the second communications chip may receive a signal by using both the PRX path and the DRX path.

The following describes in detail actual application of the antenna configuration method in this embodiment of this application by using an example in which the terminal communicates with the base station by using any band in the first supported band through the secondary card, and the terminal communicates with the base station by using any band in the third supported band through the primary card.

Figure 22:
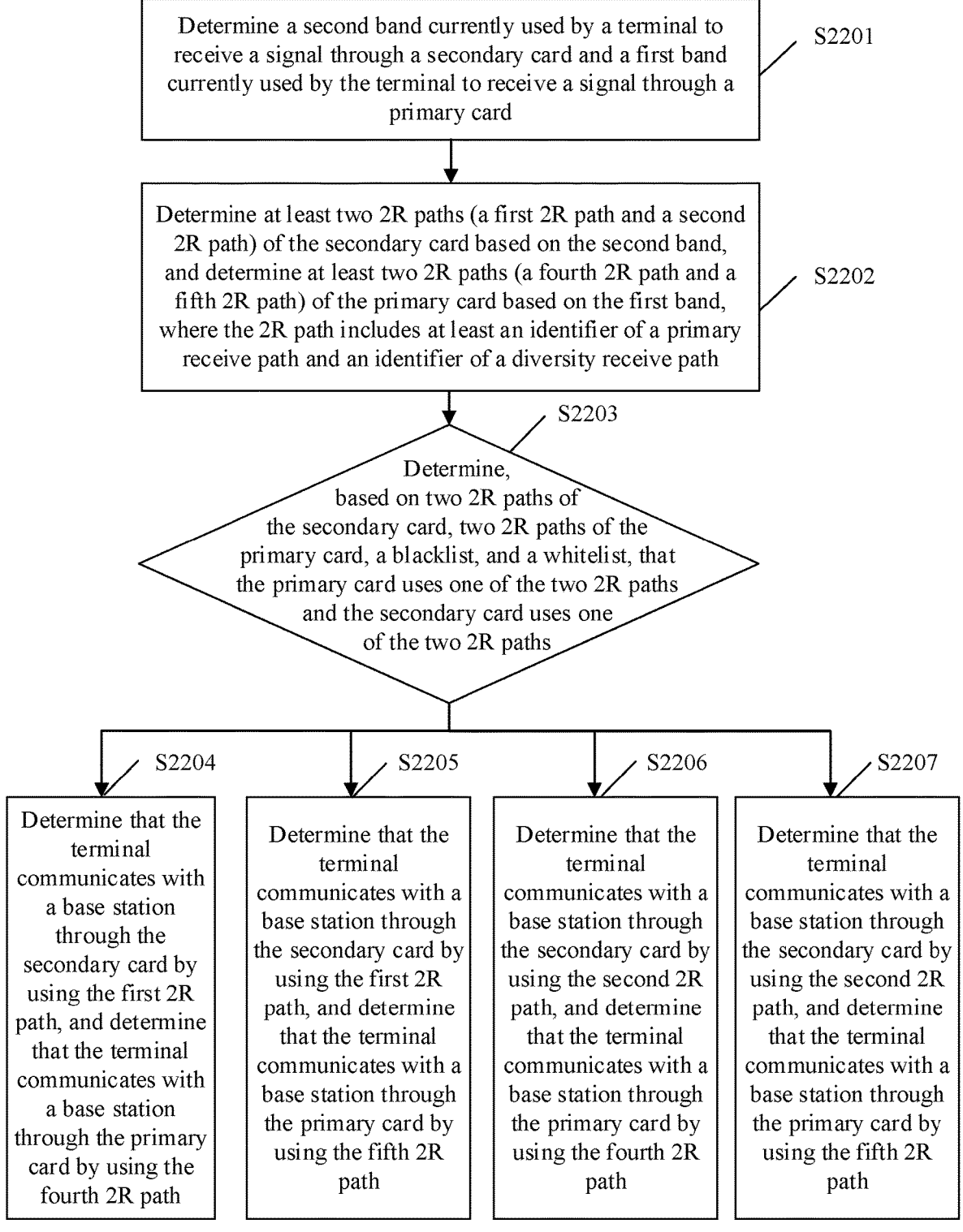
FIG. 22 is a schematic flowchart of an antenna configuration method according to an embodiment of this application.

As shown in FIG. 22, the antenna configuration method includes the following steps.

S2201. Determine a second band currently used by a terminal to receive a signal through a secondary card and a first band currently used by the terminal to receive a signal through a primary card.

For related descriptions of the second band and the first band, refer to related descriptions of other embodiments in this specification (for example, step 1901 in FIG. 19).

S2202. Determine at least two 2R paths (a first 2R path and a second 2R path) of the secondary card based on the second band, and determine at least two 2R paths (a fourth 2R path and a fifth 2R path) of the primary card based on the first band, where the 2R path includes at least an identifier of a primary receive path and an identifier of a diversity receive path.

Specifically, the determining at least two 2R paths of the secondary card based on the second band includes: determining a first path ID and a second path ID of the first 2R path and a third path ID and a fourth path ID of the second 2R path based on the second band.

Specifically, the determining at least two 2R paths of the primary card based on the first band includes: determining a seventh path ID and an eighth path ID of the fourth 2R path and a ninth path ID and a tenth path ID of the fifth 2R path based on the first band.

In this embodiment of this application, the first path ID, the third path ID, the seventh path ID, and the ninth path ID are PRX path IDs, and the second path ID, the fourth path ID, the eighth path ID, and the tenth path ID are DRX path IDs.

It may be understood that the second band is included in a first supported band, and the first band is included in a third supported band. With reference to related descriptions in FIG. 18, the second band may be used to determine the first 2R path and the second 2R path corresponding to the second band, and the first band may be used to determine the fourth 2R path and the fifth 2R path corresponding to the first band.

It may be understood that, when a band range of the second band is consistent with a band range of the first band, the first path ID and the seventh path ID are a same path ID, the second path ID and the eighth path ID are a same path ID, the third path ID and the ninth path ID are a same path ID, and the fourth path ID and the tenth path ID are a same path ID.

S2203. Determine, based on two 2R paths of the secondary card, two 2R paths of the primary card, a blacklist, and a whitelist, that the primary card uses one of the two 2R paths and the secondary card uses one of the two 2R paths.

Specifically, the determining, based on two 2R paths of the secondary card, two 2R paths of the primary card, a blacklist, and a whitelist, that the primary card uses one of the two 2R paths and the secondary card uses one of the two 2R paths includes: determining, based on the first 2R path, the second 2R path, the fourth 2R path, the fifth 2R path, the blacklist, and the whitelist, whether the terminal uses the first 2R path or the second 2R path to communicate with the base station through the secondary card, and whether the terminal uses the fourth 2R path or the fifth 2R path to communicate with the base station through the primary card.

S2204. Determine that the terminal communicates with the base station through the secondary card by using the first 2R path, and determine that the terminal communicates with the base station through the primary card by using the fourth 2R path.

Specifically, the determining that the terminal communicates with the base station through the secondary card by using the first 2R path, and determining that the terminal communicates with the base station through the primary card by using the fourth 2R path includes: when determining that the whitelist stores an association relationship between the first 2R path and the fourth 2R path, and the blacklist stores an association relationship between the first 2R path and the fifth 2R path, an association relationship between the second 2R path and the fourth 2R path, and an association relationship between the second 2R path and the fifth 2R path, determining that the terminal communicates with the base station through the secondary card by using the first 2R path, and determining that the terminal communicates with the base station through the primary card by using the fourth 2R path.

For example, the second band is B5, the first band is N5, the whitelist stores an association relationship between the first 2R path (77, 83) and the fourth 2R path (126, 128) of B5, and the blacklist stores an association relationship between the first 2R path (77, 83) and the fifth 2R path (124, 125) of N5, an association relationship between the second 2R path (134, 135) and the fourth 2R path (126, 128), and an association relationship between the second 2R path (134, 135) and the fifth 2R path (124, 125). In this case, it is determined that the terminal communicates with the base station through the secondary card by using the first 2R path, and the terminal communicates with the base station through the primary card by using the fourth 2R path.

Therefore, in a scenario of primary card B5+secondary card N5, the primary tuner is configured in the PRX path 77 of the first 2R path of B5, and no tuner is configured in the DRX path 83. In this case, the second communications chip uses the first 2R path, and does not use the second 2R path. As shown in FIG. 21, if the terminal receives and transmits signals by using an LB diversity antenna in a cross state through the primary card, when the terminal preempts LB DRX through the secondary card to receive a signal, because no tuner is configured in the DRX path 93, the secondary card does not modify a configuration of an antenna tuning switch of the diversity antenna, thereby avoiding impact on signal sending performance of the primary card on the diversity antenna.

S2205. Determine that the terminal communicates with the base station through the secondary card by using the first 2R path, and determine that the terminal communicates with the base station through the primary card by using the fifth 2R path.

Specifically, the determining that the terminal communicates with the base station through the secondary card by using the first 2R path, and determining that the terminal communicates with the base station through the primary card by using the fifth 2R path includes: when determining that the whitelist stores an association relationship between the first 2R path and the fifth 2R path, and the blacklist stores an association relationship between the first 2R path and the fourth 2R path, an association relationship between the second 2R path and the fourth 2R path, and an association relationship between the second 2R path and the fifth 2R path, determining that the terminal communicates with the base station through the secondary card by using the first 2R path, and determining that the terminal communicates with the base station through the primary card by using the fifth 2R path.

S2206. Determine that the terminal communicates with the base station through the secondary card by using the second 2R path, and determine that the terminal communicates with the base station through the primary card by using the fourth 2R path.

Specifically, the determining that the terminal communicates with the base station through the secondary card by using the second 2R path, and determining that the terminal communicates with the base station through the primary card by using the fourth 2R path includes: when determining that the whitelist stores an association relationship between the second 2R path and the fourth 2R path, and the blacklist stores an association relationship between the first 2R path and the fourth 2R path, an association relationship between the first 2R path and the fifth 2R path, and an association relationship between the second 2R path and the fifth 2R path, determining that the terminal communicates with the base station through the secondary card by using the second 2R path, and determining that the terminal communicates with the base station through the primary card by using the fourth 2R path.

S2207. Determine that the terminal communicates with the base station through the secondary card by using the second 2R path, and determine that the terminal communicates with the base station through the primary card by using the fifth 2R path.

Specifically, the determining that the terminal communicates with the base station through the secondary card by using the second 2R path, and determining that the terminal communicates with the base station through the primary card by using the fifth 2R path includes: when determining that the whitelist stores an association relationship between the second 2R path and the fifth 2R path, and the blacklist stores an association relationship between the first 2R path and the fourth 2R path, an association relationship between the first 2R path and the fifth 2R path, and an association relationship between the second 2R path and the fourth 2R path, determining that the terminal communicates with the base station through the secondary card by using the second 2R path, and determining that the terminal communicates with the base station through the primary card by using the fifth 2R path.

It can be learned from the foregoing that, according to the method provided in embodiments of this application, in a scenario of primary card MHB+secondary card MHB or primary card LB+secondary card LB, the terminal communicates with the base station through the secondary card by using the first 2R path, to ensure that when the primary card uses the diversity antenna to send and receive signals in the cross state, the second communications chip preempts the diversity antenna to receive signals in the second band, and does not modify the tuner value of sending a signal by the primary card by using the diversity antenna, thereby improving sending performance of the primary card. In a case of primary card MHB+secondary card LB or primary card LB+secondary card MHB, the terminal communicates with the base station through the secondary card by using the second 2R path, to ensure that when the secondary card uses the diversity antenna to receive a signal, the tuner value of the diversity antenna may be set according to the second band, thereby improving signal receiving performance of the secondary card by using the antenna without affecting sending and receiving performance of the primary card.

It may be understood that one 2R path described in this specification may also be referred to as one set of 2R paths, and two 2R paths may also be referred to as two sets of 2R paths. A quantifier used to describe the 2R path is not limited in this specification.

It may be understood that, for a high band antenna part (for example, a band whose band range is greater than 3 GMz is a high band), to pursue better performance, currently, for a single-card 5G high band or dual-card 5G high band, each card uses a high band antenna exclusively, and there is no conflict problem of simultaneously using a same antenna. Therefore, in embodiments of this application, implementations of the solution are mainly described in detail in a low band scenario and a medium-high band scenario. However, a problem shown in FIG. 8 and FIG. 11 in embodiments of this application also exists if two cards use a same set of high band primary-diversity antennas at the same time in a dual-card scenario, or when a high band primary-diversity antenna and a medium-high band or low band primary-diversity antenna are coupled. The antenna configuration method provided in embodiments of this application is also applicable to this scenario, and a specific use scenario is not limited in embodiments of this application.

It may be understood that only when the primary card and the secondary card concurrently share a same set of antennas or share antennas that have a coupling relationship, a collision problem may occur due to preemption. A modem is a baseband chip used to enable a terminal to implement a modulation and demodulation function required for communication, and generally includes a modulator and a demodulator. When the terminal needs to send a signal, the modem adjusts a digital signal generated by a computer into an analog signal that can be transmitted by using a telephone line, so that the analog signal can be sent by using a radio frequency circuit and an antenna circuit. When the terminal needs to receive a signal, the modem converts an analog signal input to the computer into a corresponding digital signal, and sends the digital signal to a computer interface, to convert the received signal into a signal that can be recognized by the computer, and obtain accurate signal content. It may be understood that when two cards share a same modem, it means that the modem needs to be used in a time division manner. Therefore, the two cards cannot simultaneously use an antenna (one or more of the LB primary-diversity antenna and the MHB primary-diversity antenna) to receive and send signals through the modem. That is, when two cards share a same modem, the two cards cannot simultaneously use the antenna. Therefore, a conflict problem (a problem shown in FIG. 8 or FIG. 11) existing when the two cards simultaneously uses the antenna does not occur.

Therefore, the method provided in embodiments of this application may be applicable to a scenario in which one of the primary and secondary cards uses an LTE band (that is, 2G, 3G, or 4G), and the other card uses an NR band (that is, 5G). Alternatively, the method may be applicable to a scenario in which both the primary card and the secondary card use an NR band (that is, 5G).

It may be understood that a networking manner of a base station of the 5G band used by the communications chip is not limited in embodiments of this application, and the networking manner of the 5G base station may be standalone networking or non-standalone networking.

In some other embodiments, the antenna may further include another antenna (for example, a multiple input multiple output (multiple input multiple output, MIMO) primary antenna and a MIMO diversity antenna). An antenna quantity and an antenna type are not limited in embodiments of this application. It may be understood that the MIMO primary-diversity antenna may also be divided into a low band MIMO primary-diversity antenna and a medium-high band MIMO primary-diversity antenna. Priority permission of a primary-secondary card on a primary path and a diversity path in a radio frequency circuit corresponding to the low band MIMO primary-diversity antenna and the medium-high band MIMO primary-diversity antenna is consistent with priority permission of a primary-secondary card on a primary path and a diversity path in the foregoing LB primary-diversity antenna and MHB primary-diversity antenna (for example, MHB PRX and MHB DRX shown in FIG. 3 and FIG. 4). Therefore, a problem shown in FIG. 11 and FIG. 14 also exists in the MIMO primary-diversity antenna. The method provided in embodiments of this application is also applicable to a scenario in which the primary and secondary cards use the MIMO primary-diversity antenna.

It may be understood that in a case in which a second band used by the second communications chip or a first band used by the first communications chip changes (for example, band switching occurs in a process in which the terminal moves between different base stations, or band switching for the terminal occurs in the base station), the terminal repeatedly performs step S1902 to step S1905 or step S2202 to step S2207, to determine whether the second communications chip uses the first 2R path or the second 2R path.

It may be understood that the terminal may perform the antenna configuration method in embodiments of this application, or the antenna configuration module in the terminal may perform the antenna configuration method in embodiments of this application. The antenna configuration module may be a hardware component in the first terminal. For example, the antenna configuration module may be a chip in the terminal that is used to perform the antenna configuration method provided in this application. Alternatively, the antenna configuration module may be a software function module that is provided by an existing hardware component in the first terminal and that can perform the antenna configuration method provided in this application. For example, the antenna configuration module is an application. A specific form of the antenna configuration module is not limited in this embodiment of this application.

Figure 23:
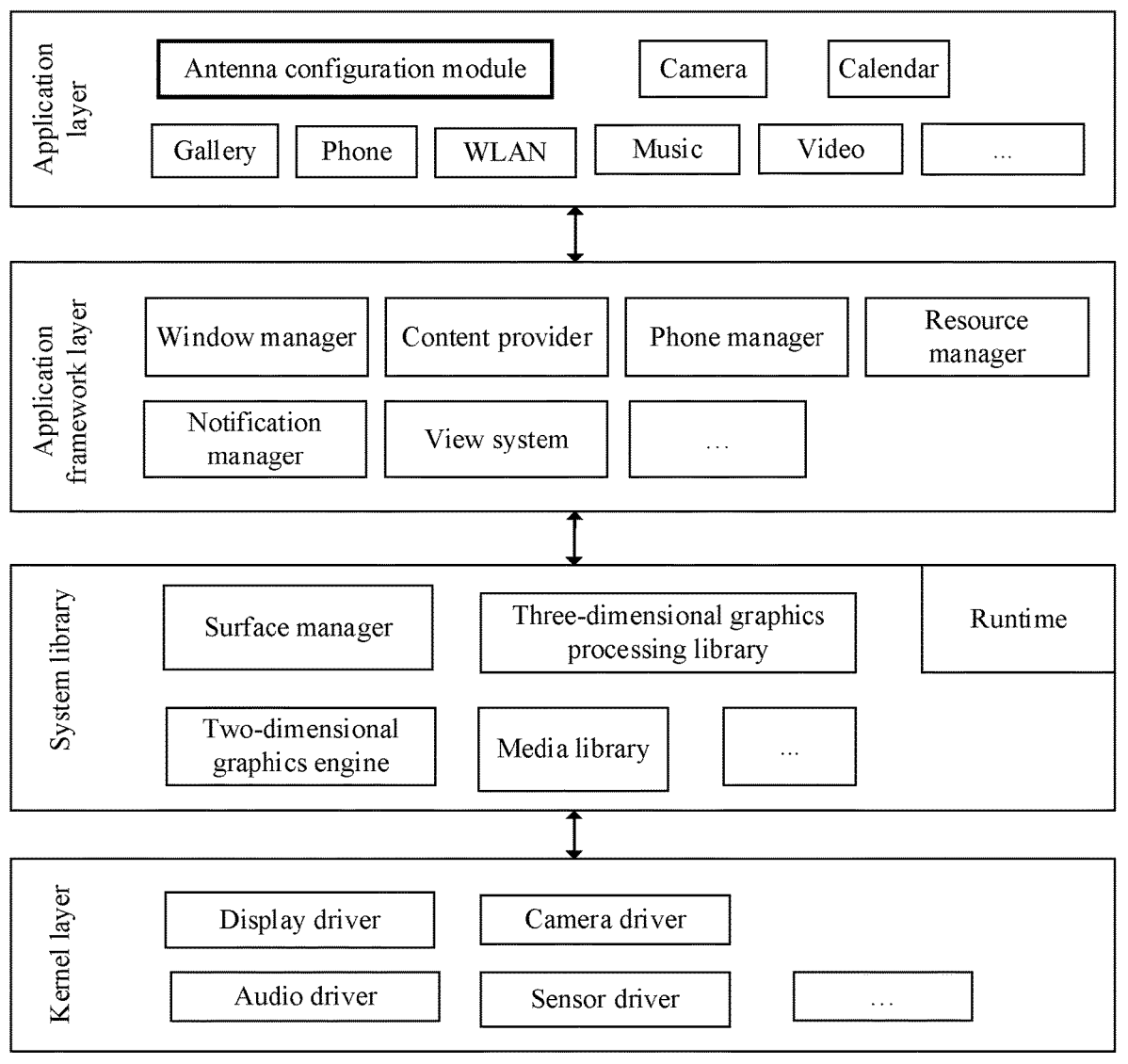
FIG. 23 is a block diagram of a software structure of a terminal 100 according to an embodiment of this application.

FIG. 23 is a block diagram of a software structure of a terminal 100 according to an embodiment of this application.

The layered architecture divides software into several layers, and each layer has a clear role and task. The layers communicate with each other through a software interface. In some embodiments, a system is divided into four layers: an application layer, an application framework layer, runtime (Runtime) and system library, and a kernel layer from top to bottom.

The application layer may include a series of application packages.

As shown in FIG. 23, the application packages may include application programs (which may also be referred to as applications (application, App)) such as Camera, Gallery, Calendar, Phone, Map, Navigation, WLAN, Bluetooth, Music, Videos, and Messages.

In this embodiment of this application, the application layer may further include an antenna configuration module, and the antenna configuration module is configured to perform the antenna configuration method in embodiments of this application.

For example, a process used for antenna status configuration information is created at the application layer, and the process determines whether antennas currently used by a primary-secondary card of a terminal are a same set of primary-diversity antennas. If yes, a first 2R path is used, or if no, a second 2R path is used. For related descriptions of the first 2R path and the second 2R path, refer to details of other embodiments of this application. Details are not described herein again.

In some embodiments of this application, the antenna configuration module may alternatively be located at another layer of the software architecture, such as the application framework layer, the system library, or the kernel layer. This is not limited herein.

The application framework layer provides an application programming interface (application programming interface, API) and a programming framework for applications at the application layer. The application framework layer includes some predefined functions.

As shown in FIG. 23, the application framework layer may include a window manager, a content provider, a view system, a phone manager, a resource manager, a notification manager, and the like.

The window manager is configured to manage window programs. The content provider is configured to store and obtain data and make the data accessible to the application. The view system includes visual controls, such as a text display control and a picture display control. The view system may be configured to construct an application. The phone manager is configured to provide a communication function of the terminal 100. The resource manager provides various resources for the application, such as a localized string, an icon, a picture, a layout file, and a video file. The notification manager enables the application to display notification information in a status bar, and may be configured to transfer a message of a notification type. The information may automatically disappear after a short stay without user interaction.

The runtime (Runtime) includes a core library and a virtual machine. The runtime is responsible for scheduling and management of the system.

The core library includes two parts: a function that needs to be invoked by using a programming language (for example, Java), and a core library of the system.

The application layer and the application framework layer may run in the virtual machine. The virtual machine may execute a binary file of a programming file (for example, a Java file) at the application layer and the application framework layer. The virtual machine is configured to perform functions such as object lifecycle management, stack management, thread management, security and abnormity management, and garbage collection.

The system library may include a plurality of function modules, for example, a surface manager (surface manager), a media library (Media Libraries), a three-dimensional graphics processing library (for example, OpenGL ES), and a two-dimensional graphics engine (for example, SGL).

The kernel layer is a layer between hardware and software. The kernel layer may include a display driver, a camera driver, an audio driver, a sensor driver, a virtual card driver, and the like.

As used in the foregoing embodiments, according to the context, the term "when" may be interpreted as "if", "after", "in response to determining", or "in response to detecting". Similarly, according to the context, the phrase "when determining" or "if detecting (the stated condition or event)" may be interpreted as "if determining", "in response to determining", "when detecting (the stated condition or event)", or "in response to detecting (the stated condition or event)".

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the procedures in the methods in the foregoing embodiments may be completed by a computer program instructing related hardware. The program may be stored in a computer-readable storage medium. When the program is executed, the procedures in the foregoing method embodiments may be included. The foregoing storage medium includes any medium that can store program code, such as a ROM or a random access memory RAM, a magnetic disk, or an optical disc.

The foregoing embodiments are merely used to describe the technical solutions of this application, but not limit the technical solutions of this application. Although this application is described in detail with reference to the foregoing embodiments, persons of ordinary skill in the art should understand that they may still modify the technical solutions described in the foregoing embodiments, or perform equivalent replacement on some technical features. However, these modifications or replacements do not make the essence of the corresponding technical solutions depart from the scope of the technical solutions in embodiments of this application.

What is claimed is:

1. A terminal, wherein the terminal is configured to support a primary card and a secondary card, identifiers of at least two primary receive paths and identifiers of at least two diversity receive paths are configured on each band supported by the secondary card, one primary receive path and one diversity receive path are denoted as a 2R path, and the terminal comprises:

a processor; and a memory storing computer instructions, wherein when the computer instructions are executed by the processor, the terminal is enabled to perform the following:

receiving configuration information of a first base station and a second base station, and determining a first band and a second band based on the configuration information of the first base station and the second base station, wherein the first band is a band configured by the first base station for the primary card, and the second band is a band configured by the second base station for the secondary card;

when the secondary card does not support the first band, determining a first identifier and a second identifier of a first 2R path and a third identifier and a fourth identifier of a second 2R path based on the second band, and determining a fifth identifier and a sixth identifier of a third 2R path based on the first band, wherein the first identifier, the third identifier, and the fifth identifier are identifiers of primary receive paths, and the second identifier, the fourth identifier, and the sixth identifier are identifiers of diversity receive paths; and determining, based on the first identifier, the second identifier, the third identifier, the fourth identifier, the fifth identifier, the sixth identifier, and a selection condition stored in the terminal, to communicate with the second base station through the secondary card by using the first 2R path or the second 2R path, wherein the selection condition comprises:

the secondary card communicates with the second base station by using the first 2R path when both the first band and the second band are low bands or medium-high bands; or the secondary card communicates with the second base station by using the second 2R path when the first band is a low band and the second band is a medium-high band, or the first band is a medium-high band and the second band is a low band.

2. The terminal according to claim 1, wherein antenna status configuration information of an antenna tuning switch of a primary antenna is configured on a primary receive path of the first 2R path and a primary receive path of the second 2R path, antenna status configuration information of an antenna tuning switch of a diversity antenna is configured on the primary receive path of the first 2R path and a diversity receive path of the second 2R path, no antenna status configuration information is configured on a diversity receive path of the first 2R path, and the antenna status configuration information is configured to be used to adjust a value of a tuning element of an antenna tuning switch on a corresponding antenna circuit.

3. The terminal according to claim 1, wherein the selection condition comprises a whitelist, and the whitelist is pre-stored in the terminal; and the determining, based on the first identifier, the second identifier, the third identifier, the fourth identifier, the fifth identifier, the sixth identifier, and a selection condition stored in the terminal, to communicate with the second base station through the secondary card by using the first 2R path or the second 2R path comprises:

when determining that the whitelist comprises an association relationship between the first identifier and the second identifier and the fifth identifier and the sixth identifier, determining to communicate with the second base station through the secondary card by using the first 2R path.

4. The terminal according to claim 1, wherein the selection condition comprises a blacklist, and the blacklist is pre-stored in the terminal; and the determining, based on the first identifier, the second identifier, the third identifier, the fourth identifier, the fifth identifier, the sixth identifier, and a selection condition stored in the terminal, to communicate with the second base station through the secondary card by using the first 2R path or the second 2R path comprises:

when determining that the blacklist does not comprise an association relationship between the first identifier and the second identifier and the fifth identifier and the sixth identifier, determining to communicate with the second base station through the secondary card by using the first 2R path.

5. The terminal according to claim 1, wherein the selection condition comprises a blacklist and a whitelist, and the blacklist and the whitelist are pre-stored in the terminal; and the determining, based on the first identifier, the second identifier, the third identifier, the fourth identifier, the fifth identifier, the sixth identifier, and a selection condition stored in the terminal, to communicate with the second base station through the secondary card by using the first 2R path or the second 2R path comprises:

when determining that the blacklist does not comprise an association relationship between the first identifier and the second identifier and the fifth identifier and the sixth identifier, and determining that the whitelist comprises the association relationship between the first identifier and the second identifier and the fifth identifier and the sixth identifier, determining to communicate with the second base station through the secondary card by using the first 2R path.

6. The terminal according to claim 1, wherein the selection condition comprises a whitelist, and the whitelist is pre-stored in the terminal; and the determining, based on the first identifier, the second identifier, the third identifier, the fourth identifier, the fifth identifier, the sixth identifier, and a selection condition stored in the terminal, to communicate with the second base station through the secondary card by using the first 2R path or the second 2R path comprises:

when determining that the whitelist comprises an association relationship between the third identifier and the fourth identifier and the fifth identifier and the sixth identifier, determining to communicate with the second base station through the secondary card by using the second 2R path.

7. The terminal according to claim 1, wherein the selection condition comprises a blacklist, and the blacklist is pre-stored in the terminal; and the determining, based on the first identifier, the second identifier, the third identifier, the fourth identifier, the fifth identifier, the sixth identifier, and a selection condition stored in the terminal, to communicate with the second base station through the secondary card by using the first 2R path or the second 2R path comprises:

when determining that the blacklist does not comprise an association relationship between the third identifier and the fourth identifier and the fifth identifier and the sixth identifier, determining to communicate with the second base station through the secondary card by using the second 2R path.

8. The terminal according to claim 1, wherein the selection condition comprises a blacklist and a whitelist, and the blacklist and the whitelist are pre-stored in the terminal; and the determining, based on the first identifier, the second identifier, the third identifier, the fourth identifier, the fifth identifier, the sixth identifier, and a selection condition stored in the terminal, to communicate with the second base station through the secondary card by using the first 2R path or the second 2R path comprises:

when determining that the blacklist does not comprise an association relationship between the third identifier and the fourth identifier and the fifth identifier and the sixth identifier, and determining that the whitelist comprises the association relationship between the third identifier and the fourth identifier and the fifth identifier and the sixth identifier, determining to communicate with the second base station through the secondary card by using the second 2R path.

9. The terminal according to claim 1, wherein the terminal is enabled to further perform the following operations:

when the secondary card supports the first band, determining the first identifier and the second identifier of the first 2R path and the third identifier and the fourth identifier of the second 2R path based on the second band, and determining a seventh identifier and an eighth identifier of a fourth 2R path and a ninth identifier and a tenth identifier of a fifth 2R path based on the first band, wherein the first identifier, the third identifier, the seventh identifier, and the ninth identifier are identifiers of primary receive paths, and the second identifier, the fourth identifier, the eighth identifier, and the tenth identifier are identifiers of diversity receive paths; and determining, based on the first identifier, the second identifier, the third identifier, the fourth identifier, the seventh identifier, the eighth identifier, the ninth identifier, the tenth identifier, and the selection condition stored in the terminal, to communicate with the second base station through the secondary card by using the first 2R path or the second 2R path.

10. The terminal according to claim 9, wherein the selection condition comprises a whitelist, and the whitelist is pre-stored in the terminal; and the determining, based on the first identifier, the second identifier, the third identifier, the fourth identifier, the seventh identifier, the eighth identifier, the ninth identifier, the tenth identifier, and the selection condition stored in the terminal, to communicate with the second base station through the secondary card by using the first 2R path or the second 2R path comprises:

when determining that the whitelist comprises an association relationship between the first identifier and the second identifier and the seventh identifier and the eighth identifier, or determining that the whitelist comprises an association relationship between the first identifier and the second identifier and the ninth identifier and the tenth identifier, determining to communicate with the second base station through the secondary card by using the first 2R path.

11. The terminal according to claim 10, wherein the determining to communicate with the second base station through the secondary card by using the first 2R path when determining that the whitelist comprises an association relationship between the first identifier and the second identifier and the seventh identifier and the eighth identifier, or determining that the whitelist comprises an association relationship between the first identifier and the second identifier and the ninth identifier and the tenth identifier comprises:

when determining that the whitelist comprises the association relationship between the first identifier and the second identifier and the seventh identifier and the eighth identifier, determining to communicate with the second base station through the secondary card by using the first 2R path, and determining to communicate with the first base station through the primary card by using the fourth 2R path; or when determining that the whitelist comprises the association relationship between the first identifier and the second identifier and the ninth identifier and the tenth identifier, determining to communicate with the second base station through the secondary card by using the first 2R path, and determining to communicate with the first base station through the primary card by using the fifth 2R path.

12. The terminal according to claim 9, wherein the selection condition comprises a blacklist, and the blacklist is pre-stored in the terminal; and the determining, based on the first identifier, the second identifier, the third identifier, the fourth identifier, the seventh identifier, the eighth identifier, the ninth identifier, the tenth identifier, and the selection condition stored in the terminal, to communicate with the second base station through the secondary card by using the first 2R path or the second 2R path comprises:

when determining that the blacklist does not comprise an association relationship between the first identifier and the second identifier and the seventh identifier and the eighth identifier, or determining that the blacklist does not comprise an association relationship between the first identifier and the second identifier and the ninth identifier and the tenth identifier, determining to communicate with the second base station through the secondary card by using the first 2R path.

13. The terminal according to claim 12, wherein the determining to communicate with the second base station through the secondary card by using the first 2R path when determining that the blacklist does not comprise an association relationship between the first identifier and the second identifier and the seventh identifier and the eighth identifier, or determining that the blacklist does not comprise an association relationship between the first identifier and the second identifier and the ninth identifier and the tenth identifier comprises:

when determining that the blacklist does not comprise the association relationship between the first identifier and the second identifier and the seventh identifier and the eighth identifier, determining to communicate with the second base station through the secondary card by using the first 2R path, and determining to communicate with the first base station through the primary card by using the fourth 2R path; or when determining that the blacklist does not comprise the association relationship between the first identifier and the second identifier and the ninth identifier and the tenth identifier, determining to communicate with the second base station through the secondary card by using the first 2R path, and determining to communicate with the first base station through the primary card by using the fifth 2R path.

14. The terminal according to claim 9, wherein the selection condition comprises a blacklist and a whitelist, and the blacklist and the whitelist are pre-stored in the terminal; and the determining, based on the first identifier, the second identifier, the third identifier, the fourth identifier, the seventh identifier, the eighth identifier, the ninth identifier, the tenth identifier, and the selection condition stored in the terminal, to communicate with the second base station through the secondary card by using the first 2R path or the second 2R path comprises:

when determining that the blacklist does not comprise an association relationship between the first identifier and the second identifier and the seventh identifier and the eighth identifier, and determining that the whitelist comprises the association relationship between the first identifier and the second identifier and the seventh identifier and the eighth identifier, or when determining that the blacklist does not comprise an association relationship between the first identifier and the second identifier and the ninth identifier and the tenth identifier, and determining that the whitelist comprises the association relationship between the first identifier and the second identifier and the ninth identifier and the tenth identifier, determining to communicate with the second base station through the secondary card by using the first 2R path.

15. The terminal according to claim 14, wherein the determining to communicate with the second base station through the secondary card by using the first 2R path when determining that the blacklist does not comprise an association relationship between the first identifier and the second identifier and the seventh identifier and the eighth identifier, and determining that the whitelist comprises the association relationship between the first identifier and the second identifier and the seventh identifier and the eighth identifier, or when determining that the blacklist does not comprise an association relationship between the first identifier and the second identifier and the ninth identifier and the tenth identifier, and determining that the whitelist comprises the association relationship between the first identifier and the second identifier and the ninth identifier and the tenth identifier comprises:

when determining that the blacklist does not comprise the association relationship between the first identifier and the second identifier and the seventh identifier and the eighth identifier, and determining that the whitelist comprises the association relationship between the first identifier and the second identifier and the seventh identifier and the eighth identifier, determining to communicate with the second base station through the secondary card by using the first 2R path, and determining to communicate with the first base station through the primary card by using the fourth 2R path; or when determining that the blacklist does not comprise the association relationship between the first identifier and the second identifier and the ninth identifier and the tenth identifier, and determining that the whitelist comprises the association relationship between the first identifier and the second identifier and the ninth identifier and the tenth identifier, determining to communicate with the second base station through the secondary card by using the first 2R path, and determining to communicate with the first base station through the primary card by using the fifth 2R path.

16. The terminal according to claim 9, wherein the selection condition comprises a whitelist, and the whitelist is pre-stored in the terminal; and the determining, based on the first identifier, the second identifier, the third identifier, the fourth identifier, the seventh identifier, the eighth identifier, the ninth identifier, the tenth identifier, and the selection condition stored in the terminal, to communicate with the second base station through the secondary card by using the first 2R path or the second 2R path comprises:

when determining that the whitelist comprises an association relationship between the third identifier and the fourth identifier and the seventh identifier and the eighth identifier, or determining that the whitelist comprises an association relationship between the third identifier and the fourth identifier and the ninth identifier and the tenth identifier, determining to communicate with the second base station through the secondary card by using the second 2R path.

17. The terminal according to claim 16, wherein the determining to communicate with the second base station through the secondary card by using the second 2R path when determining that the whitelist comprises an association relationship between the third identifier and the fourth identifier and the seventh identifier and the eighth identifier, or determining that the whitelist comprises an association relationship between the third identifier and the fourth identifier and the ninth identifier and the tenth identifier comprises:

when determining that the whitelist comprises the association relationship between the third identifier and the fourth identifier and the seventh identifier and the eighth identifier, determining to communicate with the second base station through the secondary card by using the second 2R path, and determining to communicate with the first base station through the primary card by using the fourth 2R path; or when determining that the whitelist comprises the association relationship between the third identifier and the fourth identifier and the ninth identifier and the tenth identifier, determining to communicate with the second base station through the secondary card by using the second 2R path, and determining to communicate with the first base station through the primary card by using the fifth 2R path.

18. The terminal according to claim 9, wherein the selection condition comprises a blacklist, and the blacklist is pre-stored in the terminal; and the determining, based on the first identifier, the second identifier, the third identifier, the fourth identifier, the seventh identifier, the eighth identifier, the ninth identifier, the tenth identifier, and the selection condition stored in the terminal, to communicate with the second base station through the secondary card by using the first 2R path or the second 2R path comprises:

when determining that the blacklist does not comprise an association relationship between the third identifier and the fourth identifier and the seventh identifier and the eighth identifier, or determining that the blacklist does not comprise an association relationship between the third identifier and the fourth identifier and the ninth identifier and the tenth identifier, determining to communicate with the second base station through the secondary card by using the second 2R path.

19. The terminal according to claim 18, wherein the determining to communicate with the second base station through the secondary card by using the second 2R path when determining that the blacklist does not comprise an association relationship between the third identifier and the fourth identifier and the seventh identifier and the eighth identifier, or determining that the blacklist does not comprise an association relationship between the third identifier and the fourth identifier and the ninth identifier and the tenth identifier comprises:

when determining that the blacklist does not comprise the association relationship between the third identifier and the fourth identifier and the seventh identifier and the eighth identifier, determining to communicate with the second base station through the secondary card by using the second 2R path, and determining to communicate with the first base station through the primary card by using the fourth 2R path; or when determining that the blacklist does not comprise the association relationship between the third identifier and the fourth identifier and the ninth identifier and the tenth identifier, determining to communicate with the second base station through the secondary card by using the second 2R path, and determining to communicate with the first base station through the primary card by using the fifth 2R path.

20. The terminal according to claim 9, wherein the selection condition comprises a blacklist and a whitelist, and the blacklist and the whitelist are pre-stored in the terminal; and the determining, based on the first identifier, the second identifier, the third identifier, the fourth identifier, the seventh identifier, the eighth identifier, the ninth identifier, the tenth identifier, and the selection condition stored in the terminal, to communicate with the second base station through the secondary card by using the first 2R path or the second 2R path specifically-comprises:

when determining that the whitelist comprises an association relationship between the third identifier and the fourth identifier and the seventh identifier and the eighth identifier, and determining that the blacklist does not comprise the association relationship between the third identifier and the fourth identifier and the seventh identifier and the eighth identifier, or when determining that the whitelist comprises an association relationship between the third identifier and the fourth identifier and the ninth identifier and the tenth identifier, and determining that the blacklist does not comprise the association relationship between the third identifier and the fourth identifier and the ninth identifier and the tenth identifier, determining to communicate with the second base station through the secondary card by using the second 2R path.

* * * * *